US008495244B2

(12) United States Patent
Bonar et al.

(10) Patent No.: US 8,495,244 B2
(45) Date of Patent: Jul. 23, 2013

(54) SYSTEM AND METHOD FOR DYNAMIC AUTOMATIC COMMUNICATION PATH SELECTION, DISTRIBUTED DEVICE SYNCHRONIZATION AND TASK DELEGATION

(75) Inventors: Jeffrey G. Bonar, Delray Beach, FL (US); Bryan Tafel, Capital Federal (AR); Adrian Pekarek, Hollywood, FL (US); Subir Chhibber, Boca Raton, FL (US); Kenneth G. Tomazin, Boca Raton, FL (US); Karl Ginter, Beltsville, MD (US); Michael Bartman, Potomac, MD (US)

(73) Assignee: JumpStart Wireless Corporation, Delray Beach, FL (US)

( * ) Notice: Subject to any disclaimer, the term of this patent is extended or adjusted under 35 U.S.C. 154(b) by 776 days.

(21) Appl. No.: 12/563,720

(22) Filed: Sep. 21, 2009

(65) Prior Publication Data
US 2010/0124196 A1   May 20, 2010

Related U.S. Application Data

(63) Continuation-in-part of application No. 11/169,149, filed on Jun. 29, 2005, now Pat. No. 7,934,019.

(60) Provisional application No. 61/098,886, filed on Sep. 22, 2008.

(51) Int. Cl.
G06F 15/173    (2006.01)
G06F 15/16    (2006.01)

(52) U.S. Cl.
USPC .......................................... 709/239; 709/248

(58) Field of Classification Search
None
See application file for complete search history.

(56) References Cited

U.S. PATENT DOCUMENTS

| 6,430,624 | B1 | 8/2002 | Jamtgaard et al. |
| 6,768,726 | B2* | 7/2004 | Dorenbosch et al. ......... 370/331 |
| 6,990,534 | B2 | 1/2006 | Mikhailov et al. |
| 7,003,316 | B1 | 2/2006 | Elias et al. |
| 7,013,316 | B1 | 3/2006 | Hansen et al. |
| 7,542,456 | B2 | 6/2009 | Garg et al. |
| 7,822,816 | B2 | 10/2010 | Payne |
| 2002/0069192 | A1 | 6/2002 | Aegerter |
| 2002/0109706 | A1 | 8/2002 | Lincke et al. |
| 2002/0188643 | A1 | 12/2002 | Kennedy |
| 2003/0099256 | A1* | 5/2003 | Feinberg ....................... 370/473 |
| 2003/0162555 | A1 | 8/2003 | Loveland |

(Continued)

FOREIGN PATENT DOCUMENTS
EP      1335563 A2    8/2003

OTHER PUBLICATIONS

International search report and the written opinion of the international searching authority issued in corresponding PCT application PCT/US2009/057691 (Apr. 30, 2010).
EP Supplementary Search Report dated May 21, 2012.

(Continued)

Primary Examiner — Patrice Winder
(74) Attorney, Agent, or Firm — Nixon & Vanderhye P.C.

(57) ABSTRACT

Systems, software, and apparatuses that provide wired and wireless telecommunications under conditions where signal strength is poor or intermittent, the coordination and synchronization of data and workflows across various communication links under such conditions, especially intermittent or unreliable communications links, and the management of wireless mobile applications in such environments. The present invention technology herein relates to the fields of computer science, telecommunications, and data management.

48 Claims, 15 Drawing Sheets

U.S. PATENT DOCUMENTS

| | | | |
|---|---|---|---|
| 2003/0172113 | A1 | 9/2003 | Cameron et al. |
| 2003/0172138 | A1 | 9/2003 | McCormack et al. |
| 2003/0177408 | A1 | 9/2003 | Fields et al. |
| 2004/0043945 | A1 | 3/2004 | McDonough et al. |
| 2004/0240408 | A1 | 12/2004 | Gur |
| 2004/0267595 | A1 | 12/2004 | Woodings et al. |
| 2005/0165916 | A1* | 7/2005 | Cromer et al. ............... 709/220 |
| 2005/0243857 | A1 | 11/2005 | Hofstaedter et al. |
| 2005/0273488 | A1 | 12/2005 | Ryan et al. |
| 2006/0126620 | A1 | 6/2006 | Bonar et al. |
| 2006/0182101 | A1* | 8/2006 | Hoekstra et al. .............. 370/389 |
| 2007/0117586 | A1 | 5/2007 | Billmaier et al. |
| 2007/0174393 | A1 | 7/2007 | Bosschaert et al. |

OTHER PUBLICATIONS

"International Search Report and The Written Opinion of the International Searching Authority," issued in connection with copending PCT International application No. PCT/US05/22861 (Jun. 20, 2008).
Chee Chin Low et al., "H-trees: A Dynamic Associative Search Index for OODB," ACM SIGMOD, pp. 134-143 (1992).
Apple Computers, "Hypercard manual: Getting Started," Apple Computer, Inc., 1998.
Apple Computers, "Hypercard: Installation and new features," Apple Computer, Inc., 1998.
B. Badrinath, et al. "Handling Mobile Clients: A Case for Indirect Interaction." Proc. 4th Wkshp on Workstation Op. Syss, 1993.
Caceres, et al. "Effects of Mobility on Reliable Transport Protocols." Poznan, Poland: 14th Conf. on Dist. Comp. Systems, 1994.
Imielinski et al. "Wireless Mobile Computing: Challenges in Data Management." Comm. of ACM. vol. 37, Iss. 10. pp. 18-28, 1994.
Kistler et al. "Disconnected Operation in the Coda File System." New York: ACM Press, 1992.
Koyama et al. "Agent based mobile phone groupware system using location information." In Proc. Database and Expert Sys. Applications '02. pp. 37-41,2002.
Rodden, et al. "Places to Stay on the Move: Software Architectures for Mobile User Interfaces." Human Computer Interaction wl Mobile Devices, 1999.
Sholl, et al. "Using Hypercard to Rapidly Prototype Human-Computer Interfaces to CASE systems." Cambridge: IEEE Int'l Conf. on Systems, Man, and Cybernetics, 1989.
Wall Street Journal "New Software Beginning to Unlock the Power of Personal Computers." 1987. Available online: http:llwww.ihug. orgNVSJ87.html.
Wei, et al. "SAGE: a Hypercard-based GDSS." in Proc. 25th Hawaii International Conf. on System Sciences '92. vol. iv, pp. 14-22, Jan. 1992.
Wikipedia. "Hypercard" Available online: http://en.wikipedia.org/wiki/ Hypercard no author, Mar. 2006.
Wired. "Hypercard Forgotten But Not Gone" 2002. Available: http://www.wired.com/news/mac/0,2125,54365,00.html Leander Kahney.
"Case Study: Professional Lake Management's Field Service Reps Clean Up With Jumpstart Wireless' Dispatch Suite" (Sep. 2003).
Case History: Garrison Square Management Improves Productivity and Service With Jumpstart Wireless Corporation's D~spatchSuite(Sep. 2003).
"Connectivity=Productivity", South Florida Sun-Sentinel (May 27, 2002).
"New Version of Web-Based Jumpstart Wireless DispatchSuite Makes Power of Handheld Wireless Internet Communication Affordable to Mid-Size Businesses" (Jumpstart Press Release, Jan. 15, 2002).
"Hold the Phones Garrison Square Management Chose to Keep its Mobile Phones and Add On a Work Order and Management Solution" (Aug. 2002).
"Customized, Real-World Enterprise Solutions On Motorola Mobile Phones Gaining Momentum" (Motorola Corp. Press Release, Oct. 7, 2002).
"Jumpstart Wireless Nextel and Motorola Bring Internet Connectivity To Millions of Small and Medium Business Customers VIa Wreless Handsets" (Jumpstart Press Release Nov. 18, 2002).
"Dispatchsuite Frequently Asked Questions" (Jumpstart Wireless Website Jun. 13, 2003).
Products: Xora GSP TimeTrack, Corrigo mobile SaaS field service applications, Aligo Mobile Software Everywhere, eDispatch Taxi Dispatch System, Televigation/IeleNav, @Road, Onset, Adesso Instant Mobility Platform, Sendia, received Jun. 2006.
EP Search Report dated Aug. 1, 2012, for application title, "System and method for extending business systems to a mobile workforce".

* cited by examiner

SYSTEM AND METHOD FOR DYNAMIC AUTOMATIC COMMUNICATION PATH SELECTION, DISTRIBUTED DEVICE SYNCHRONIZATION AND TASK DELEGATION

CROSS-REFERENCES TO RELATED APPLICATIONS

The present application is a continuation-in-part of co-pending U.S. patent application Ser. No. 11/169,149 filed 29 Jun. 2005, and claims the benefit of provisional application No. 61/098,886 filed Sep. 22, 2008. Each of these prior applications are incorporated herein by reference in their entirety and for all purposes.

FIELD

The technology herein relates to systems, software, and apparatuses that provide wired and wireless telecommunications under, among other things, conditions where signal strength is poor or intermittent. The exemplary illustrative non-limiting technology herein provides for, among other things, the coordination and synchronization of data and workflows across various communication links under such conditions, including between intermittent or unreliable communications links, and the management of wireless mobile applications in such environments. The technology herein further relates more generally to the fields of computer science, telecommunications, and data management.

BACKGROUND AND SUMMARY

Wireless Communication Generally

Wireless communication ("wireless") allows two or more electronic devices to exchange information without the need for a physical connection (i.e., a wire or cable) between the devices. Wireless can be fixed or mobile/portable. Generally speaking, fixed wireless allows wireless communication from one fixed location to another fixed location or between a fixed location and a mobile/portable device. Mobile/portable wireless permits communication between a fixed (e.g., central) site and a movable device, and/or between two or more mobile/portable devices. The level of connectivity (e.g., the signal intensity and other relevant parameters) between two sites in a fixed wireless environment is typically fairly constant (assuming constant weather and other conditions), because neither site ever moves. But the level of connectivity in mobile wireless can vary significantly depending for example on the location of the wireless device, the relative location of any mobile wireless communication transmitters and receivers and/or transceivers, and any intervening obstacles such as trees, buildings, mountains, or other objects or phenomena that can cause multipath or other interference or otherwise change wireless signal propagation.

Mobile wireless devices (also referred to herein as wireless devices or mobile devices) include pagers, mobile phones, and combination devices that include the functionality of mobile phones, pagers, personal digital assistants (PDAs) as just some examples. These devices can allow the exchange of textual information (e.g., using pagers, cell phones, or PDAs) as well voice and data (e.g., using cell phones and PDAs). Many current wireless devices incorporate support for a plurality of communication interfaces, such as for example telephony data (e.g. GPRS, EDGE, etc.), wireless Local Area Network (LAN) (e.g. Wi-Fi), and short-range device interconnects (e.g. Bluetooth). A plurality of communication interfaces can allow optimization of communication path use by selection of communication path(s) with the best match (es) between transmission requirements and communication path characteristics and features, but such optimizations are not necessarily common, or done using predefined preferences supplied by device manufacturers. Devices that support only a single communication interface are generally not capable of such optimizations. Wireless devices have also recently been integrated with useful features such as global positioning system (GPS) access, cameras, and scanners (including scanners able to process radio frequency identification (RFID) and barcodes), and magnetic or optical data storage cards. These types of devices have enabled people to remain in contact with each other while traveling or working from multiple remote locations and facilitated a plurality of types of data collection. Moreover, the richness of the information exchanged between people has grown considerably in recent years due to the expanding integration and convergence of features just described.

Mobile wireless devices generally communicate using electromagnetic waves such as but not limited to radio waves. Transmitters send a signal from a wireless communication point-of-presence to a wireless device, while receivers process a signal received at a point-of-presence from a device. Transceivers both send and receive. In this context, a point-of-presence comprises one or more transmitters, receivers and/or transceivers that can communicate with a mobile wireless device. For example, a communication tower in a cellular telephone network and a wireless LAN connection at a coffee shop are non-limiting examples of points-of-presence. A central site in contact with a network of points-of-presence can control the communication between the device and the appropriate point of presence. Points-of-presence are sometimes spaced so that their coverage areas overlap to allow continuous communication as a device moves. As long as a connection is made between a point-of-presence and the mobile wireless device, information can be sent and received appropriate to the capabilities of the device. But in many environments such constant contact with a point-of-presence is not possible; because areas exist which are not in range of a point-of-presence, and variances of land, building materials, or other factors can interfere with the signal. As a result, a pager can be out of range for a few minutes or hours, mobile phone calls are cut off in mid-sentence, and data services only partially complete communications sequences and transactions, resulting in data loss. Current practice has resulted in a number of different services with various characteristics for connecting wireless devices to each other or to non-mobile devices or to the Internet.

Cellular Communication

Cell phone providers often supply data services to their subscribers as well as voice phone service. Examples of such data services include Circuit Switched Data (CSD), General Packet Radio Service (GPRS), and enhanced versions of it, such as Enhanced Data rates for GSM Evolution (EDGE) or Enhanced GPRS (EGPRS), as well as "next generation" systems such as Universal Mobile Telecommunications System (UMTS). Such systems operate over radio links to supply data connectivity between supported devices and the Internet or systems provided by the cell service company, such as Short Message Service (SMS). The implementation details of each of these services vary, but are transparent to most users. The most apparent difference is the bandwidth, or data rate, that each provides. Depending on the system in use, the data rate is currently between 9.6 Kbits/second for CSD and 16 Mbits/second for UMTS. For example, so-called 3G mobile communications standards allow simultaneous use of speech and data services and data rates of up to 14.0 Mbit/s on the downlink and 5.8 Mbit/s on the uplink. Faster technologies are in development. In some instances, these services are used directly by devices other than cell phones, such as PDAs, or indirectly by devices such as laptops though the use of adapter cards or the use of a tethered cell phone or other device as a data communications device.

Cellular data services support various data protocols, usually including TCP/IP, over the cell provider's data network and, often through a gateway, to systems on the Internet. Such connections can be slow compared to some wired technologies, and can also be expensive, with some providers charging a fixed monthly fee and others charging based on the number of bytes of data transmitted. Coverage for these services is sometimes more limited than coverage for voice phone calls through the same cell service provider, but is still generally available in most cities and along major routes between cities. Due to the addressing scheme(s) used for TCP/IP and the method(s) of implementation commonly used with mobile devices, where the device is often assigned a different network address each time it connects to the network, and in some cases even during a connection ("dynamic IP"), it is sometimes hard to connect with mobile devices from other devices using TCP/IP since the address of the device is not known and may change frequently. In some cases special arrangements can be made with service providers that do permit such connections, such as by assigning a specific and fixed network address ("static IP") to the device, but such practices are often not typical, and generally involve increased expense. TCP/IP connections thus generally originate from the mobile device, because only the mobile device is aware of its own current TCP/IP address and can include this in TCP/IP data packet headers as required by the TCP/IP protocol. In addition, some hotspot providers use a technique called Network Address Translation (NAT) to allow sharing a single IP address by all of the devices in the hotspot. As it is usually implemented, NAT prevents connection to devices using the hotspot from devices outside the hotspot, unless a device inside the hotspot first establishes a connection to a device outside the hotspot, and even then the connection to the device in the hotspot can be limited to specific protocols, such as File Transfer Protocol (FTP). Once created, connections are generally bi-directional, with data being sent to or from the mobile device, to or from a server device, or to/from another mobile device. These protocol and infrastructure limitations can prevent TCP/IP push mode connections to mobile devices and can reduce the responsiveness of the system as a whole when servers or other mobile devices have data to send to a mobile device.

In addition to, or instead of, TCP/IP, some mobile devices and the services that connect them support other data protocols, such as Short Message Protocol (SMS), or Multimedia Messaging Service (MMS). These protocols can have advantages over TCP/IP, such as the ability to send to a mobile device using push mode, and disadvantages, such as delayed transmission, limited message size, content limitations, and high cost (e.g. several cents per message). Delivery of data is often unreliable as well, such as with SMS and its "best attempt" delivery, where delivery is attempted, but is not guaranteed.

Peer-to-Peer Communication

When one non-server device sends data to another non-server device, the exchange is termed "peer-to-peer" (P2P). This is accomplished using various protocols and communication mechanisms, such as TCP/IP, Bluetooth, SMS, Ethernet, etc.; however, some mechanisms or protocols are more problematic for this use than others. For example, the dynamic address assignment used by many mobile TCP/IP-supporting devices results in their having a different TCP/IP address each time they connect to the Internet, and other devices have no way of knowing this address and so cannot initiate connection with them, thus preventing P2P connections using TCP/IP unless a system that both can connect to acts as a coordinator to supply address information to one or both devices. One common method of implementing such coordination is use of Dynamic Domain Name System (Dynamic DNS), where a device registers its address with a DNS server, allowing other devices to learn its address and initiate communication with it, but due to information caching, and the sometimes rapid change in address common with mobile devices which can move from one hotspot to another in a brief time, this solution is often not reliable and sometimes may not be usable at all. In addition to addressing issues inherent in some protocols, there are also issues of device discovery and authentication involved with P2P. Devices may in some contexts be asked to acquire information about the existence of other devices, as well as any methods or information necessary to establish communications with those other devices. A means of providing or obtaining this information would be useful.

Some devices can support connections using Bluetooth or other short-range device connections. Bluetooth can be useful for extending connectivity into areas which are shielded from technologies such as GPRS (i.e. inside structures such as factories or large buildings or underground in deep basements) as well as where Wi-Fi is not practical or desirable, such as connecting a portable device through a vehicle link where Wi-Fi's greater range could constitute a security concern, or in cases where devices need to exchange data and Bluetooth's peer-to-peer capabilities permit this, whereas Wi-Fi's TCP/IP addressing limitations for mobile devices can prevent it. Bluetooth also is often used as a link to devices that support methods for connecting to remote devices, such as dialup modems, Ethernet interfaces, Token Ring Adapters, or others. Such links can extend the communication options for Bluetooth-enabled devices by acting as the first or other link in a plurality of possible communication paths.

Bluetooth-enabled devices can connect and communicate wirelessly over radio links through short-range, ad hoc networks known as piconets. In one standard implementation, each device can simultaneously communicate with up to seven other devices within a single piconet, with one device acting as "master" and the others acting as "slaves." Each device can also belong to several piconets simultaneously. Piconets are established dynamically and automatically as Bluetooth-enabled devices enter and leave radio proximity. Radio proximity can vary from a foot or two to several hundred feet, depending on the class of the devices involved. Piconets also can be connected by systems acting as bridges between them. Such arrangements are known as "scatternets."

Bluetooth devices transfer data at a rate of 721 Kbits/second, using various protocols, including TCP/IP in some devices, using methods that are resistant to interference and which can include encryption of data and cryptographic identification of other devices. Not all Bluetooth devices support the same protocols, and many are special purpose devices, such as headphones or barcode readers, which do not support use of nodes or other externally supplied programming. Other Bluetooth devices are intended to act as network interfaces, however, and can support the connection of Bluetooth-enabled PDAs, computers, or other such devices to LANs or the Internet. It also is possible for two or more PDAs, laptops, or other Bluetooth-enabled devices to exchange data in a Peer-To-Peer manner. Exactly which protocols and functions of the Bluetooth or other standard are supported by a given device are determined by the manufacturer of that device and in some instances cannot be altered afterward in at least some devices.

Wi-Fi communication

Some wireless devices support connections to wireless LANs, such as those using Wireless Fidelity (Wi-Fi). Wi-Fi is a wireless technology brand owned by the Wi-Fi Alliance intended to improve the interoperability of wireless LAN products based on the IEEE 802.11 standards. The Wi-Fi Alliance is a consortium of separate and independent companies agreeing to a set of common interoperable products based on the family of IEEE 802.11 standards. A Wi-Fi device such as a laptop computer, cell phone, or PDA can connect to a LAN when in range of a wireless network access point (WAP) that is connected to the network. If the network is connected to the Internet, the Wi-Fi device can access the Internet through the network's gateway or other means. The area covered by one or more interconnected access points is called a "hotspot." Hotspots can cover as little as a single room or as much as several square miles by using overlapping access points. Hotspots are available in many businesses, homes, and public facilities (such as airports), and some localities have implemented Wi-Fi networks that cover entire towns, college campuses, etc.

Generally speaking, Wi-Fi also allows connectivity in peer-to-peer (wireless ad-hoc network) mode, which enables devices to connect directly with each other, although this capability is often disabled for security reasons. Ad-hoc wireless networks are advantageous e.g., when two or more devices share network connections between themselves, but do not require access to external servers or the Internet.

Wi-Fi can support bandwidths up to several or many Mbits/second, is inexpensive or free with most commercial hotspots charging a fixed fee for use, or using provision of free access as a way to attract customers, and has very little delay and good reliability. In many or most cases, the coverage is limited to a small area, and leaving the coverage area terminates connectivity, usually with little or no warning. In addition, as with TCP/IP over cell phone networks, the method of addressing used with Wi-Fi hotspots can make connecting to mobile devices from devices which are not on the hotspot's LAN impossible, and connections generally must be originated by the mobile devices. This can make server-initiated transmission modes unusable when sending to a mobile device using Wi-Fi, unless there is another way to reach the device, such as SMS, that is used to send, or to request that the mobile device initiate contact with the server using Wi-Fi. This use of a server-push-capable communication path to request the mobile device to initiate a connection to the server using a different communication path that is not server-push-capable is sometimes referred to as "cooperative-push." The server can employ any server-push-capable communication path to initiate a cooperative-push exchange.

Multiple Communication Interfaces

Some devices have the capability to support more than one communication interface. For example some devices can support two or more interfaces simultaneously. Other devices can support different interfaces at different times. Such implementations are typically determined by the design and configuration of the specific device. Devices that can support a plurality of communication interfaces typically manage the use of these interfaces in various ways. In some exemplary implementations, the device can automatically choose which interface(s) to use at a given time using configuration settings that define user preferences. In other devices, the choice of communication interface is made manually by the user, by application software, or by the design of the device or its operating system. Prior art systems, such as the Apple iPhone, from Apple Computer, Cupertino, Calif. as one example, provide device implementations that can automatically switch communication interfaces so as to maintain some form of communication in a manner that is transparent to application software running on the device. Other prior art systems do not switch communication paths transparently and may require application software to take certain actions to switch communication interfaces when a communication interface being used by an application loses connectivity. These actions may vary with the design or configuration of the mobile device, and can include such things as attempting to re-establish a connection so as to cause the device to discover communication interfaces with available connectivity, selecting a new communication interface from among those still available, and then re-establishing server connections, or other actions that are well known to those familiar with particular device implementations. Devices which detect loss of connectivity generally do so based on signal strength, polling or other characteristics of the connectivity link to the nearest point of presence, and do not necessarily detect losses of connectivity that happen in other segments of the connection, such as a breakdown in the point of presence's connection to the service provider's infrastructure, or the service provider's connection to the Internet. Losses other than signal loss do not necessarily result in failover to an alternate interface in most devices. This can adversely affect communication between a mobile device and disparate devices or servers.

Some devices that can support a plurality of communication interfaces do not necessarily switch between them until and unless there is a detectable loss of connectivity. Some such devices do not necessarily dynamically switch between available interfaces as interface connection availability changes. This can result in continued use of a less efficient communication interface even after a more efficient interface becomes usable. This can result in higher costs, slower data transmission, slower responsiveness for users, and other undesirable results.

When a device changes from one communication interface to another, the change can be disruptive to some applications. This can be most obvious when an application relies on communication interface functionality or characteristics that are not provided by the interface chosen to failover to. For example, interactive responsiveness (i.e. the amount of time between taking an action that requires communication to perform and seeing the results of that action) and required bandwidth are example such characteristics. Some applications, such as streaming video, or database access to image data, require both responsiveness and bandwidth to function. Different communication interfaces can have differing characteristics; for example, Wi-Fi can provide sufficient bandwidth, but EDGE may not. When a device is currently receiving streaming video in a Wi-Fi hotspot, and the device is moved out of the coverage area of the hotspot into an area without Wi-Fi service, the device can switch to using EDGE, but the streaming video application does not function with the same fidelity and features using EDGE as it did with Wi-Fi. In another example, intermittent tasks such as downloading e-mail messages do not necessarily require substantial bandwidth in most cases. An intermittently connected e-mail application is unlikely to be disrupted by such a change in communication interface, and can retry and communicate in the background to download larger or more email messages. Bandwidth is typically only one of many characteristics that can result in certain communications interfaces being preferable to others, or in certain applications being restricted as to choice of communications interface. Cost, reliability, out of band support, transmission delays, geographic distribution, and terms of service are examples of some of these. An ability to be aware of the available communication interfaces, their characteristics and features, and to select interfaces appropriate to the type of data to be transmitted or received is often useful to make the most efficient use of all available communication interfaces.

Current wireless applications are often more difficult and time consuming to use than mobile users prefer and can fail in unexpected ways when executed in an area with intermittent connectivity. The ability of a device to make use of multiple communication interfaces, simultaneously or in series over time, can reduce this problem's impact; however, current devices typically or often do not use, or do not make efficient use of, multiple communication interfaces.

Wireless Applications

Because of limitations imposed by current wireless protocols, and lack of built-in device support, the burden of providing reliable, efficient data transmission for wireless devices may fall on the programmer who must anticipate the problems associated with loss of connectivity, efficiency of various communication interfaces with respect to the type of data to be transmitted, or the wait for large blocks of data to download. But very often such consideration is not adequately given, due in part to the inexperience of many programmers with wireless applications and the tight release deadlines associated with many projects. Thus, programmers can create wireless applications that fail in unexpected ways when executed in an area with intermittent connectivity, make excessive use of available bandwidth, cost more than anticipated to use, do not make efficient use of available communication and storage capabilities, or require the user to cope with long data transmissions. In some cases, such problems are severe enough to prevent mobile users from using their devices and applications at all. The ability of a device to make reliable and easy use of multiple communication interfaces, simultaneously or in series over time, can reduce this problem's impact.

Another issue with wireless applications is synchronizing data held in the mobile device's storage with data maintained on servers or other devices. Some applications are created with the assumption that connectivity is maintained all or most of the time; and the applications simply access the needed data from the servers or other devices as needed. Because some classes of mobile devices frequently cannot connect with servers or other devices, important applications may be rendered unusable much of the time. Other applications are created with the assumption that communications are unavailable frequently, but that connectivity exists often enough to enable the applications to reach a required server or other device most of the time. Such applications may cache data as it is used, in an attempt to keep data that is likely to be needed again in the device's storage for use during the short periods when connectivity is not available. More extended periods of connection unavailability, or data use patterns that do not use the same data repeatedly, can reveal shortcomings in this solution. Better methods of using periods of connectivity to cache data that is likely to be needed during periods without connectivity would be useful to help reduce the impact of such communication outages on mobile device users.

A related problem is performing updates of locally cached data in an environment where connectivity can appear and disappear without warning. A method of synchronizing data stored on mobile devices, whether between the mobile device and a server or between two mobile devices, using a Peer-To-Peer or other connection, would be helpful to avoid use of outdated information. Many methods of synchronizing data stores involve comparing blocks of data, or values computed from blocks of data, such as checksums, to detect differences, and then transferring any data found to be different so as to reconcile those differences. Interruptions to such processes can result in the process having to start again when connectivity is re-established. Depending on how the process is implemented, and the amount of data involved, a large amount of bandwidth can be wasted by such repeated transmissions. These problems can be amplified when there are many devices needing to keep their data synchronized when connectivity between the devices is intermittent. Some possible solutions to this problem exist, such as the "Tubes" product of Adesso Systems of Boston Mass. Tubes is a network-based service that maintains data sets on a plurality of devices such that changes made to the data on any device are propagated to all of the other devices. Because data is maintained on each device, the data is available for use whether or not the device has connectivity. If connectivity is lost before synchronization is complete, the software automatically resumes the task when connectivity is restored.

Those skilled in the art are also familiar with the concept of mesh networking. Mesh networking employs one of two node connection arrangements: full mesh topology or partial mesh topology. In the full mesh topology, each node is connected directly to each of the others. In a partial mesh topology, some nodes can be connected to all the others, but other nodes are connected only to those nodes with which they exchange the most data. Connections can be wired or wireless. Briefly, mesh networks route data, voice and/or instructions between nodes and allow for continuous connections and reconfiguration around broken or blocked paths by passing data from node to node ("hopping") until the destination node is reached. Generally speaking, mesh networks differ from other networks in that the component parts can all connect to each other via multiple hops. Mesh networks were developed initially for military applications, and have received a great deal of attention and experimentation due to the additional capabilities and challenges they present. See e.g., Wang et al, Wireless Mesh Networks (Advanced Texts in Communications and Networking) (Wiley 2009) including Chapter 7 ("mobility management") thereof, incorporated herein by reference.

Systems for the Management of Distributed Applications

Many of the foregoing problems are addressed in applicant's co-pending commonly-assigned U.S. patent application Ser. No. 11/169,149, incorporated by reference. By way of non-limiting example, technology that has been commercially offered by the assignee Jumpstart provides a useful array of technology for managing distributed applications including for example methods of exchanging "nodes," commands, and other data between devices so as to provide a reliable method of interaction between users of different devices even when communications between the devices are unreliable, intermittent, have limited bandwidth, or when one or more of the devices have limited resources. The nodes can, by way of non-limiting example, comprise data and/or instructions that describe at least one action or at least one aspect of the process they are a part of, as well as information that allows for the processing, ordering, identification, transmission, and handling of the nodes themselves. The '149 application's descriptions of basic creation, handling, storage, transmission, structure, and processing of nodes is incorporated by reference here.

Nodes can be collections of data having defined configurations and varying content, which are created by, stored, and transferred between devices. Nodes can for example control the devices by controlling the processing of data and program instructions by the devices. The technology can be configured to manage multiple data types, including, but not limited to, text, image (both single images and sequences of images), signature information, data encoding sounds, data from input devices (e.g. barcodes, optical data, radio-frequency identification (RFID), and magnetic card scanners), information obtained from magnetic materials (e.g., from credit or identification cards), information being sent to a printing device, and information related to geographic location (e.g., global positioning system, "GPS") as well as other arrangements. According to one exemplary implementation of the technology, the management of such varying data types is implemented using defined node types but those with skill in the art will recognize that still other node types are defined and implemented using ordinary skill and knowledge.

As depicted in FIG. 1, an exemplary illustrative non-limiting implementation includes a TMC device (1300*a*) (a server) connected to a mobile wireless device (1110) through one or more wireless networks (1200*a*, 1200*b*). Nodes and Commands are retrieved from server Node Storage (1540) by the Node Manager (1570) and sent by the Dispatch Manager (1560) through a Communication Interface (not shown), over a wireless network (1200*a* or 1200*b*) to a Communication Interface (2210, 2220, or 2230) of the wireless mobile device. The wireless device's operating system, which manages the communication interfaces, sends the nodes to the Dispatch Module of the wireless mobile device (2310), which processes them and passes them to the Node Storage Module (2330), or the Display Module (2320), where they are stored or processed.

Despite the useful technologies Jumpstart has previously offered to the marketplace, there remains a need to provide benefits to situations in which wireless connectivity to a site is intermittent but nevertheless, local wireless access is available to users in the immediate vicinity of the site. For example, a construction site may include one or more trailers that each have Wi-Fi or other wireless communications available within the trailer but also extend to the immediate job site. Although wireless connectivity between the trailer(s) and a more permanent location (e.g., a central office) may suffer from intermittent connectivity, the local wireless communications may reach most, if not substantially all of, the job site and is accessed by workers using the devices and systems described above. In such cases it would be valuable to extend the services to such additional devices and to provide additional capabilities.

Exemplary illustrative non-limiting implementations described herein provide systems, apparatuses, software and other arrangements for enabling the exchange of "nodes," commands, and other data items between devices so as to provide a reliable method of interaction between a user of a first device and a user of a second device that can establish a local wireless connection even when communications between the wireless network and other more robust network devices are unreliable, intermittent, have limited bandwidth, or when one or more of the devices have limited resources. In some embodiments, the implementation of the technology provided herein is provided using a hosted service provider business model, in which wireless infrastructure, mobile devices, and the various integration servers are provided by a central facility that is used by users on an as needed basis. Providing the technology in this manner allows the users to focus on their business and not on the deployment and management of infrastructure components. The nature of the architecture permits multiple users from different companies to transparently share common infrastructure without interfering with each other. Alternatively, the technology is implemented using other models as will be familiar to persons having ordinary skill in the art, such as those wherein a single company owns the infrastructure and provides access to said infrastructure for their people.

In one exemplary illustrative non-limiting implementation of the technology herein, systems, software, and apparatuses enable transmission of data items between two or more devices using one or more transmission technologies (i.e., a communication path), either one at a time (e.g. sequentially) or more than one at a time (e.g. in parallel) and whether the transmission technologies provide for in-band and/or out-of-band transmissions; so as to allow applications to communicate in an environment where each communication path's availability changes unpredictably and where various communication paths have differing capacities, reliability, capabilities, and methods of operation. In some embodiments, coordination of transmitted data items is performed over the available communication paths such that data item synchronization between devices involves one or more communication paths that are available, either serially or in parallel, with one or more of the communication paths being intermittently interrupted, such that the data items (e.g. templates, nodes, or node stacks) helpful to implement at least an aspect of the system are communicated without loss or undetected duplication. Data items are intentionally sent by a first device using multiple transmission methods to compensate for unpredictable delays associated with some methods to reduce the transmission delay as perceived by the user as much as possible. The second device detects data items that are duplicated by the manner of transmission, and duplicate copies are eliminated as redundant.

Another exemplary illustrative non-limiting implementation of the technology described herein provides means to initiate transmissions from a first device to a second device ("push mode"), in contrast to prior art devices and systems that rely on the second device to poll a first device to initiate transmission of data items between first and second devices ("pull mode"). Use of "push mode" by an exemplary illustrative implementation of the technology herein is performed directly, where the first device initiates the transmission and sends data items using the same communication path used to initiate the transmission, or indirectly in "cooperative push mode," where the first device uses push mode to transmit a first portion of the data item(s), which is used by the a second device as a request for the second device to initiate a pull mode communication session to transfer a second portion of the data item(s) using the same or different transmission technology that can support moving the second portion of the data item(s), but which lacks characteristics required to support push mode for the entire data item or set of data items, or which have other desirable characteristics, such as large bandwidth, high reliability, or low cost. The first device, in some exemplary implementations, uses known information concerning the device type of the second device, in combination with a database of device capability information, to determine whether the second device supports push mode or any limitations that may exist on such ability where it exists. For instance, some device types do not accept push mode connections while a voice phone call is in progress or while certain applications are executing. Other device types do not have these limitations. Likewise, the push mode characteristics of a first communication path can differ from the push mode characteristics of a second communication path. For example, an SMS message can be delivered seconds or hours after it is sent, or not delivered at all, with no notification to the sender, while a TCP socket transmission will either succeed or fail within seconds, with the transmitting system being informed of the success or failure almost immediately. The exemplary illustrative implementation of the technology herein can use pull mode, push mode, cooperative push mode or any combination thereof when appropriate communication paths are available. The exemplary illustrative implementation herein can result in alternative communication paths being available for use; each maintaining its own particular characteristics (e.g. cost, bandwidth, push mode support, transmission delay, reliability, availability, etc.). The exemplary illustrative technology herein provides means to manage multiple communication technologies so as to, optionally, dynamically optimize one or more communication aspects for the device, such as cost, throughput, reliability, availability, transmission delay, interactive responsiveness, or others by using one or more communications technologies at a time, switching between available communications technologies as appropriate, using disparate communications technologies for those functions that each is best suited for, sending data items redundantly using a plurality of communication paths, each of which can make use of a different device communication technology, or by other means that will be apparent to those skilled in the art. These extended capabilities can, for example, allow devices to switch to an alternative communication path when communication using a particular communication path is lost, or to increase total throughput by using multiple communication paths simultaneously.

In other exemplary illustrative non-limiting implementations, a communication path, established by means of a supported and available communication technology, is configured to specify additional mechanisms for its management and use. For example, the data items sent over a communication path are encrypted, compressed, or protected from tampering or damage through the use of checksums or other mechanisms. Such additional optional mechanisms are used for some portions of a communication path and not for others or for an entire communication path from a first device to a second device. A plurality of such optional mechanisms are used simultaneously; for example, when a checksum is computed and added to the data items, the data items and checksum are then compressed and transmitted, with one segment of the communication path performing encryption and decryption of the compressed data items and checksum to prevent disclosure in transit over that segment.

The data item transfer provided by the exemplary illustrative technology herein is carried out using one or more communication technologies, such as wireless telephony using GPRS/Edge, EVDO, wireless networking using 802.11 (Wi-Fi), or by other wireless and wired means, by the devices. In some exemplary illustrative non-limiting implementations, the devices are standard computers, such as server, desktop or laptop computers, wireless portable devices such as cell phones, PDAs, or other such devices, emulated devices, or any combination of any number of these.

Using the various communication methods described above, the exemplary illustrative technology herein provides additional capabilities and functions, such as permitting Peer-to-Peer (P2P) data item exchange, delegation of tasks from a first device to a second device with, or without, the assistance of a server, announcing an available task to a plurality of devices, collecting responses, selecting one or more devices to assign the task to from among those responding affirmatively, and assigning the task to the selected device(s), propagation of task completion, or task cancellation data items along a chain of delegations, synchronization of catalog data items between devices with or without the intervention of a server, and security templates that permit flexible specification of limitations and permissions for use of data items, sets of data items, or communication methods by devices. The ability to manage complex node structures using non-direct client-server architectures are not present in the useful technologies Jumpstart has previously offered to the marketplace and significantly extend the utility and applicability of devices for managing node-based task, information collection, and other tasks. Additional exemplary illustrative non-limiting features and advantages include:

Use of multiple communication paths, whether one at a time or more than one at a time, and regardless of differing characteristics, such as speed/bandwidth, reliability, cost, protocol, transmission medium, or other characteristics, of each communication path, for the transfer of messages from a first device to a second device. Plural communication paths increases the likelihood of a device being able to establish communication with either servers or other devices when communication path availability is not continuous, varies from location to location, or is made available using different means at different times or places. In particular, it addresses the movement of node-based structures over the most advantageous available communications path, and extends the ability of the devices to operate in various operating conditions. E.g.

Methods for deciding which of a plurality of available communication paths to employ for a given data item at a particular time. With each communication path having different capabilities, costs, inherent limitations based on the current device location, security restrictions, and/or delivery speed and guarantees, coupled with the selection of the nodes and catalogs to transfer, it becomes a challenge to pick an appropriate path for a given set of nodes (with an associated priority, size, type, etc.) that is efficient enough for use on portable devices with limited resources.

Use of plural communications paths to transport plural copies of one or more node structures essentially in parallel. Plural communications increases the chances of enough of the node structure to permit effective use of the node structure being received at its destination despite possible disruptions in communication paths, and reduces the transit delay to that of the fastest communication path used without requiring knowledge of which communication path is the fastest at the time. However, it adds complications of having to eliminate duplicate copies and to reassemble the node structure at the receiving device.

Use of a first communication path to transport a first portion of a node structure and a second communication path that is at least in part different from the first communication path to transport a second part of the same node structure, which enables the devices in communication to switch communication paths without requiring retransmission of the already-sent portion of the message, as well as sending parts of a node structure in parallel over a plurality of communication paths so as to increase apparent bandwidth and reduce total time required for reception of the node structure at the receiver. The receiver has the capability to recognize the parts of a given node structure, to reassemble them in the proper order, to deal with possible redundant reception of node structure parts, regardless of how many different communication paths are used to transmit it. It also adds complications by requiring the transmitting device to select the parts of the node structure to transmit by each communication path.

Optional dynamic switching of communication paths to increase the use of preferred communication paths over less preferred communication paths. Such switching enables the device to make optimal use of the available communication paths as communication paths become available or fail. Optimal use can refer to speed of transmission, reduction of costs, increased responsiveness to the device user, greater security, or other factors. Again, this requires the device to be able to select the portions of the node structure to transfer by each path.

Out Of Band (OOB) transmission, where data items are sent at times, in orders, or by means other than a preferred communication path (e.g. sent using MMS over GPRS instead of using TCP/IP over Wi-Fi, or sent between scheduled polling times). OOB transmission enables increases in responsiveness for users, and more timely transmission of high priority data.

Priority messaging, where transmission methods are determined in part by characteristics of the node structures, or part of the node structure, to be sent. Node transmission priority is a factor in deciding which of a plurality of available communication paths to use, whether to dynamically switch communication paths, whether to send data OOB, and what mode of transmission is permitted for sending the data item. Prioritization of transmission of node structures, in whole or in part, can enable reduction in costs, increased responsiveness in interactive tasks, and flexibility in implementing tasks.

Detection and elimination of duplicate node structures, whether duplicates occur accidentally or intentionally. Dynamic switching of communication paths can result in duplication of node structures or node structure portions as seen by the receiver, and methods are provided for dealing with this. These methods also deal with the potential for updated versions of node structures to be sent after prior versions of those same node structures have been sent, and for these to arrive at the receiving device in any order or with any timing.

A "push mode" transmission model in which a sender contacts a receiver and initiates transfer of messages. This enables an "asynchronous" communication model that can result in shorter communication delays and improved responsiveness for device users over the prior periodic polling, or "pull mode" transmission model. Reduction of bandwidth use is also possible through the elimination of polling requests when there is no data to be transmitted, and with some communication paths this can result in costs reductions.

A "cooperative push mode" transmission model in which a sender contacts a receiver and sends a message containing a command that requests that the receiver initiate a pull mode session to transfer one or more nodes and/or node structures. The sender's request and the receiver's pull mode session can occur over different communication paths. Cooperative push mode transmissions permits asynchronous transmission over communication paths that do not support push mode, and is effective at accelerating the transmission of important portions of a node structure. The push mode request can be sent OOB, sent over a plurality of communication paths at once to ensure delivery, and make use of any other supported capability for transmission of one or more nodes and/or node structures. One of the challenges in cooperative push mode style transmissions is the identification of the node and/or node structures to be moved so that the receiver can request them.

A "Peer-to-Peer" (P2P) node transmission model for sending nodes and/or node structures between two devices where either can initiate communication, and either or both can transmit nodes and/or node structures to the other. This capability allows devices to interoperate without a requirement that each device has access to a server, permits a plurality of devices to share the communication path resources of any particular device, and thus improves overall connectivity and efficiency in environments of limited communication connectivity. Challenges of P2P environments revolve around the unique identification of nodes so that node structures can be updated and reported back along a plurality of communication paths and topologies without the loss of the device(s) to recognize the unique instances of the node structures for reassembly and subsequent use of the node structures.

An "Announcement and Acceptance" (A&A) mechanism for identifying one or more users willing to accept assignment of one or more identified tasks, and then providing the tasks to them. This capability relies on a broadcast capability, where a node and/or node structure can be sent to a plurality of devices. Such broadcasts can be done using a plurality of different communication paths or communication path types, and can be simulated by sending individual transmissions to each device where a one-to-many transmission capability is not supported by a communication path. The A&A mechanism provides challenges in resolving the selection and acceptance of tasks represented by nodes and node structures, and the subsequent selection, prioritization, transmission over available communication paths, and subsequent reassembly and use reporting activities.

A task delegation method for transferring a task represented by a node or node structure from a first device to a second device, with or without the assistance of a server. By enabling task transfer without a requirement for a server to mediate the transfer, efficiency is improved in scenarios where server communication can not be established or maintained for one or both devices (such as when there is a communication path failure). Methods are required for tracking task ownership for eventual notification of the server or other devices, and for limiting transfer of tasks between devices even when a server is not involved. Such methods must function regardless of what pattern of device to device or device to server communication paths exist during the time the task is active. Additional methods are required for encoding nodes by a first device for transfer to a second device, and for decoding the nodes after reception by the second device so that they can be functionally incorporated into the second device.

A task cancellation distribution method for notifying appropriate devices of the cancellation of a task. This method supports the complexities resulting from task delegation and task delegation done between devices without the intervention of a server. Such methods must function regardless of what pattern of device to device or device to server communication paths exist during the time the task is active, and often require higher priority selection of the cancellation information over other node transmission requirements.

A catalog synchronization method for identifying and resolving differences between catalogs of a first device and catalogs of a second device. Such methods must support resolution of differences between catalogs of two or more devices when the devices are not in communication with a server, and regardless of the order of updates applied to a device. Limitations on transfer of catalog data to particular devices or classes of device must be maintained even when a server is not involved and the transfer is between devices.

Provision of a flexible security model that permits limitation of access to, use or modification of, a data item, a set of data items, a device or server. Such limitations apply to relaying of data items by a first device that has a communication path to a server or a third device for a second device that does not have such a communication path.

A system for enabling the exchange of "nodes," commands, and other data items between devices so as to provide reliable methods of interaction between a user of a first device and a user of a second device that can establish a local wireless connection even when communications between the wireless network and other more robust network devices are unreliable, intermittent, have limited bandwidth, or when one or more of the devices have limited resources.

A method for enabling the exchange of "nodes," commands, and other data items between devices so as to provide reliable methods of interaction between a user of a first device and a user of a second device that can establish a local wireless connection even when communications between the wireless network and other more robust network devices are unreliable, intermittent, have limited bandwidth, or when one or more of the devices have limited resources.

BRIEF DESCRIPTION OF THE DRAWINGS

These and other features and advantages will be better and more completely understood by referring to the following detailed description of exemplary non-limiting illustrative embodiments in conjunction with the drawings of which.

DETAILED DESCRIPTION

Definition of Terms

Figure 1:
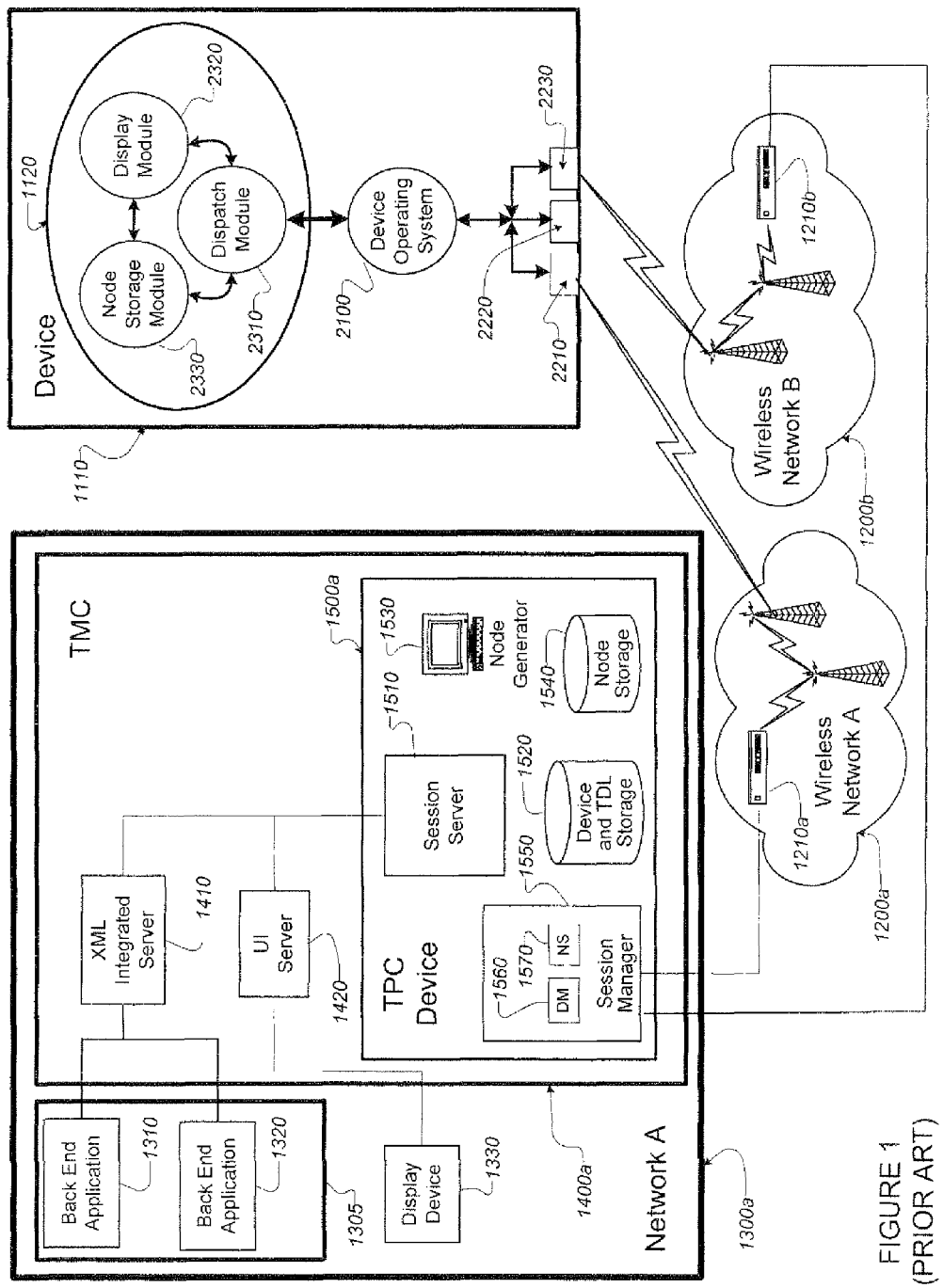
FIG. 1 depicts a schematic diagram of a network comprising a server device, a client device, and network connections between them in accordance with the technology described in commonly-assigned U.S. patent application Ser. No. 11/169,149 incorporated herein by reference.

| | |
|---|---|
| OOB | "Out Of Band." A data item transmission over a non-preferred communication path, e.g., one using a connectionless protocol rather than a connection-based one, performed at a time other than a scheduled polling interval, or in an order other than the order data item transmission was requested, such as when high priority data items are sent ahead of low priority data items. |
| Data Item | A data object required for proper functioning of the exemplary implementation (e.g. a node, a node stack, a catalog, a task, or a combination of these). |
| Device | A "device," as used herein is, in one exemplary illustrative non-limiting implementation, a computer that is configured to include a Dispatch Manager (as described below) further comprising at least one protocol manager and at least one communication interface. Multiple instances of protocol managers and communication interfaces are provided in some exemplary device implementations. In operation, messages are transmitted from a first device to a second device over one or more communication paths. The configuration of hardware and software in a device controls aspects of the operation of programs and data items on the said device to allow the efficient transmission of messages between devices, even in the absence of a robust communication path between the devices. Furthermore, a device is either a mobile device, e.g. one that moves with its user and is connected using wireless technologies, or a device having a fixed location (e.g., a desktop computer or a server or a computer embedded in another mechanism like a vending machine or pressure monitor), or an emulated device. Mobile devices can use wired connections some or all of the time, they can support wireless connections, or both. |
| Catalog | A Collection of similarly structured data items (e.g. Data Table, Part List, Job Code List, Cost Code List, Completion Code list) |
| Command | An ordered arrangement of bytes, some of which have particular values, which are sent from a first device to a second device with the intention of causing the second device to take a desired action. |
| Message | An ordered arrangement of bytes comprising one or more Data Items and/or Commands, information describing transformations performed on the Data Items and/or Commands (e.g. compression, encryption, or |

| | |
|---|---|
| | encoding), information, information permitting recognition of duplicate copies of a given Message as duplicates, and, optionally, information for the detection and/or correction of alterations to the bytes comprising that Message or their logical ordering. |
| Message Segment | A fragment of a Message accompanied by information permitting the reassembly of all fragments comprising a given Message into that Message and describing the number of such Message fragments required to reassemble the complete Message. |
| Communication Path | An implementation of a technology, or combination of technologies, that permits sending Messages or Message Segments from a first device to a second device. |
| Pull Mode | A transmission model in which a receiver contacts a sender and requests transfer of Messages. |
| Push Mode | A transmission model in which a sender contacts a receiver and initiates transfer of Messages. |
| Cooperative Push Mode | A transmission model in which a sender contacts a receiver and sends a Message containing a Command that requests that the receiver initiate a Pull Mode session. The sender's request and the receiver's Pull Mode session can occur over different Communication Paths. |
| P2P | "Peer-To-Peer." Used to refer to a Message transfer model between two devices where either can initiate communication, and either or both can transmit Messages to the other. |
| Task | A discrete unit of work to be performed on a device, defined by one or more Data Items. |
| LAN | "Local Area Network." A LAN consists of two or more devices which are located near each other and connected by means of one or more networking technologies, such as Ethernet, Wi-Fi, Token Ring, etc. |
| DNS | "Domain Name System." An Internet system comprising a distributed database used to convert human-readable addresses, such as "anycompany.com" into a TCP/IP binary address usable by Internet software for sending data items. |
| Node | A "node," as used herein, is a data item similar to the nodes defined by U.S. patent application No. 11/169,149, as extended herein with additional included data fields and node types as described below. |
| Security Specification | An ordered arrangement of bytes, some of which have particular or limited ranges of values, which are associated with a data item, set of data items, device or server and used to specify permissions and/or restrictions on access to, use or modification of, the data item, set of data items, communication path, device or server. |

Overview

The current exemplary illustrative non-limiting implementation provides communications systems and devices with important and heretofore unavailable capabilities including, but not limited to:

Use of multiple communication paths, whether one at a time or more than one at a time, and regardless of differing characteristics, such as speed/bandwidth, reliability, cost, protocol, transmission medium, or other characteristics, of each communication path, for the transfer of messages from a first device to a second device.

Optional dynamic switching of communication paths to increase the use of preferred communication paths over less preferred communication paths.

Out Of Band (OOB) transmission, where data items are sent at times, in orders, or by means other than a preferred communication path (e.g. sent using MMS over GPRS instead of using TCP/IP over Wi-Fi, or sent between scheduled polling times).

Priority messaging, where transmission methods are determined in part by characteristics of the data items to be sent.

Detection and elimination of duplicate messages and data items, whether duplicates occur accidentally or intentionally.

A "push mode" transmission model in which a sender contacts a receiver and initiates transfer of messages.

A "cooperative push mode" transmission model in which a sender contacts a receiver and sends a message containing a command that requests that the receiver initiate a pull mode session. The sender's request and the receiver's pull mode session can occur over different communication paths.

A "Peer-to-Peer" (P2P) message transmission model for sending messages between two devices where either can initiate communication, and either or both can transmit messages to the other.

An "Announcement and Acceptance" (A&A) mechanism for identifying one or more users willing to accept assignment of one or more identified tasks, and then providing the tasks to them.

A task delegation method for transferring a task from a first device to a second device, with or without the assistance of a server.

A task cancellation distribution method for notifying appropriate devices of the cancellation of a task.

A catalog synchronization method for identifying and resolving differences between catalogs of a first device and catalogs of a second device.

Provision of a flexible security model that permits limitation of access to, use or modification of, a data item, a set of data items, a device or server.

The devices described herein include wireless devices, wired devices, emulated devices, server (TPC) devices and other devices. Aspects of the exemplary, illustrative technology are equally applicable to all classes of devices that experience intermittent or other connectivity, such as for example laptops and PDAs that are intermittently connected to a company LAN, mobile devices that are sometimes located where wireless signals are not available, or fixed location devices that do not have reliable communications availability. In addition, it will be appreciated by those with skill in the art that any arbitrary number of devices can communicate with each other in accordance with the technology herein as described herein.

Data items are transferred between devices using communication paths. Communication paths can consist of any communication technology supported by the devices, and can include, without limitation, traditional cellular or other wireless telephony data (e.g. GPRS, EDGE, EVDO, SMS), localized wireless networks (e.g. Wireless Fidelity (e.g. Wi-Fi, 802.11x) or Bluetooth), wired data mechanisms (e.g. Ethernet, PSTN, serial or parallel data cables, dialup modems, DSL, etc.) or any combination of these with or with additional or other protocols having the capability to transfer messages, or message segments, from one device to another. A communication path comprises implementations of one or more communication technologies, used in sequence or parallel, effective to transfer messages, or message segments, from a first device to a second device. Communication paths can differ in speed/bandwidth, protocol, reliability, availability, cost, or other characteristics. Various implementations of the exemplary illustrative non-limiting implementation can restrict or promote use of particular communication paths by data item type, data item size, data item priority, by security specification permission or limitation, or based on any other characteristic as determined to be proper by those having skill in the art. Additional description of communication paths and their use appears below.

An exemplary, illustrative non-limiting implementation of the technology herein is provided using a hosted service provider business model, in which wireless infrastructure, mobile devices, and the various integration servers are provided by a central facility that is used by users on an as-needed basis. Providing the technology in this manner allows the users to focus on their business and not on the deployment and management of infrastructure components. The nature of the architecture permits multiple users from different companies to transparently share common infrastructure without interfering with each other. Alternatively, the technology is implemented in a traditional model, where a single company owns the infrastructure and provides access to said infrastructure for their staff and devices. Still other suitable models will be apparent to persons having ordinary skill in the art.

An exemplary illustrative non-limiting implementation of the technology herein enables transmission of messages, or message segments, between devices using a plurality of communication paths, whether one at a time (e.g. sequential use of a plurality of communication paths), more than one at a time (e.g. use in parallel), and over non-server terminated communication paths. In addition, the improved system supports transmission technologies that provide for in-band and/or out-of-band transmissions, so as to allow communication in an environment where each communication path's availability changes unpredictably and where various communication paths have differing capacities, reliability, capabilities, and methods of operation. Coordination of transmitted messages is performed over the available communication paths such that synchronization between devices can involve one or more communication paths that are available, either serially or in parallel, with one or more of the communication paths being intermittently interrupted, such that the data items and/or commands required to implement at least one aspect of the system are communicated without loss or undetected duplication. A first device can intentionally duplicate particular messages by sending using multiple communication paths to compensate for unpredictable delays associated with some communication paths, to reduce the effects of message loss by some communication paths, to reduce the transmission delay as perceived by the user as much as possible, or for any other purpose. Messages or data items that are duplicated by the manner of transmission are detected by the second device, and duplicate copies are eliminated as redundant.

Figure 2:
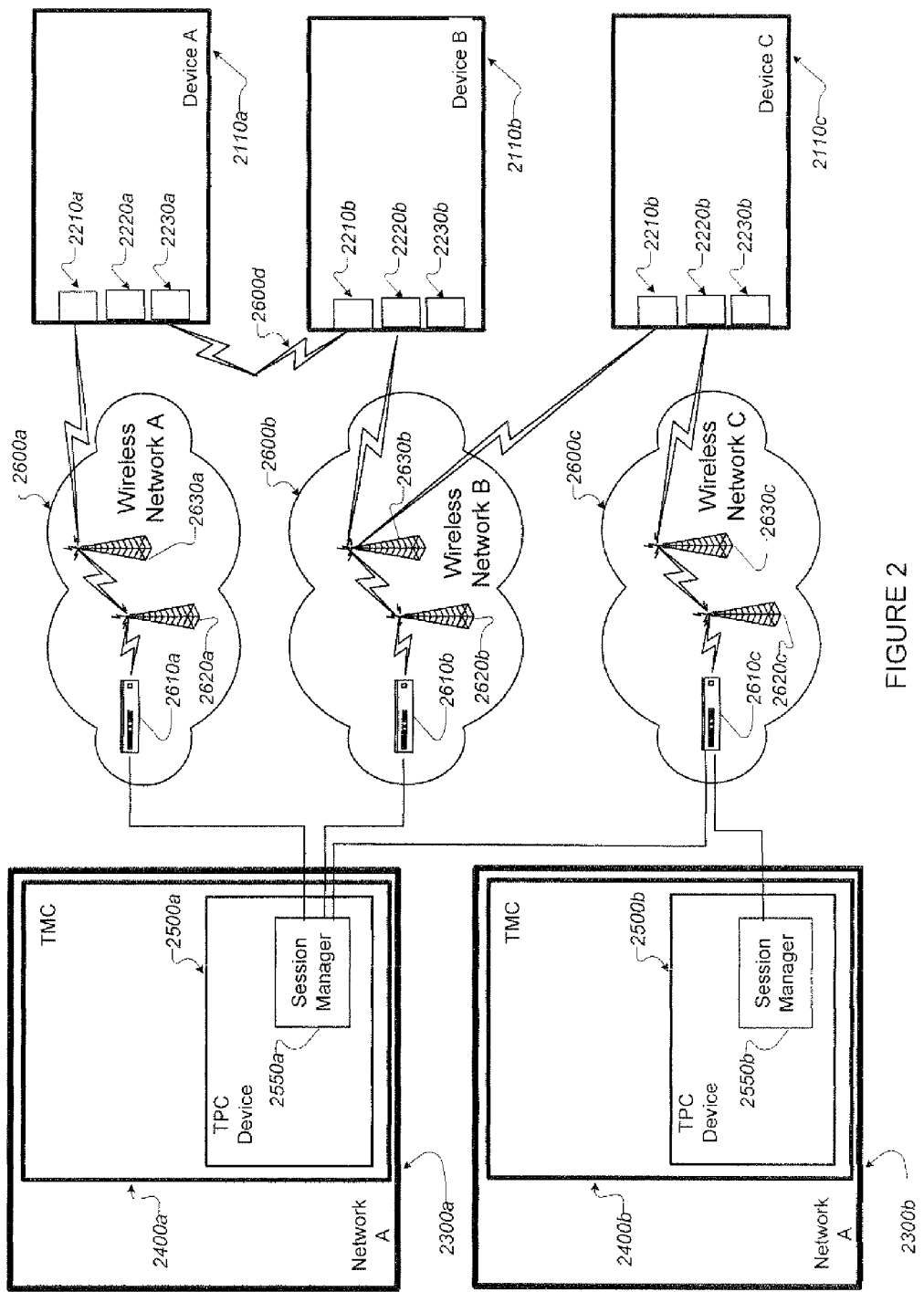
FIG. 2 depicts a schematic diagram of a device and network arrangement comprising two server devices, three mobile client devices, and network connections between them.

As depicted in FIG. 2, the server devices (2500a & 2500b) (e.g. TPC devices) and the wireless mobile devices (2110a, 2110b & 2110c) of the current exemplary illustrative non-limiting implementation can connect with each other in a plurality of ways. For example, a server device (2500b) can connect through a single communication path (2600c), such as a telephony-based EDGE communication path, to a wireless mobile device (2110c). Alternatively, a server (TPC) device (2500a) is connected to a plurality of wireless mobile devices (2110a, 2110b & 2110c) through a plurality of communication paths (2600a, 2600b & 2600c) such as EDGE (2600c), Wi-Fi (2600b), and SMS (2600a). Furthermore, a server (TPC) device (2500a) is connected to a plurality of wireless mobile devices (2110b & 2110c) through a single communication path (2600b). Additionally, a wireless mobile device (2110c) is connected to a plurality of server (TPC) devices (2300a & 2300b) using one or more communication paths. In yet other exemplary, illustrative non-limiting implementations, a first wireless mobile device (2110a) is connected using one or more Peer-to-Peer (P2P) technologies to a second wireless mobile device (2110b) using a P2P communication path (2600d), such as Bluetooth or Wi-Fi in ad hoc networking mode. Use of available communication paths can be restricted based on security templates, to control which types of data are sent over each. For example, sending a catalog of part numbers over a publicly shared Wi-Fi connection is acceptable, but sending personally identifiable employee payroll data is not. In such a case, the security specification for the Wi-Fi communication path for a device would specify that it has a low security level, and the security specifications for part number data and payroll data would specify that they require low security and high security, respectively. The part number data's security requirements would match the security level of the Wi-Fi path, and that data could be sent on the Wi-Fi path, but the payroll data's requirement for high security would prohibit it being sent over the Wi-Fi path and it would be held until an appropriately secured communication path becomes available, such as a wired Ethernet connection, or an encrypted short range Bluetooth link, to a payroll system.

In addition to supporting a plurality of communication paths, an exemplary illustrative non-limiting implementation of the technology described herein provides means for a first device to initiate transmissions from a first device to a second device ("push mode"). As will be understood by persons having ordinary skill in the art, the use of "push mode" as defined and described herein is performed when the first device initiates the transmission and sends one or more messages using a communication path. Upon receipt, a second device receives these transmissions and uses their contents and either operates upon them (e.g. "commands") or stores them for subsequent use (e.g. as with nodes or catalogs). Alternatively, the devices operate in "cooperative push" mode, where the first device uses push mode to transmit a first portion of the data item(s) that is used by the a second device (e.g. as a command, or a data item(s) referencing additional data items) as a request for the second device to initiate a "pull mode" communication to either a first device or a third device to transfer a second portion of the data item(s) using the same or a different communication path. The selection of communication paths to use is made based upon one or more characteristics of the respective communication paths and the data items to be moved over them, e.g. choosing the communication path(s) that can support moving the second portion of the data item(s), but which lacks characteristics required to support push mode for the entire set of data items, or which have other desirable characteristics, such as large bandwidth, high reliability, or low cost. An exemplary illustrative implementation of the technology herein can use pull mode, push mode, cooperative push mode, or any combination or plurality simultaneously when appropriate communication means are available.

In some situations, it is necessary for a first device to involve the participation of the user of the second device in order to initiate push mode transmission. For example, if the second device has been placed in a sleep mode, or if the second device is not currently located where the push mode transmission technology can function, the user is prompted to activate or relocate the second device, through means such as a page or SMS message, causing the second device to invoke the device's push mode communication (so called "push registry"), vibrate, play a generated or recorded voice message, or other appropriate and available signal, or some combination of these or other prompts as will be apparent to those of ordinary skill in the art.

The exemplary illustrative implementation herein also provides for use of alternative communication paths, each with its own characteristics (e.g. cost, bandwidth, push mode support, transmission delay, reliability, availability, etc.). The exemplary illustrative technology herein provides means to manage multiple communication paths so as to, optionally, dynamically optimize one or more communication aspects for the device, such as cost, throughput, reliability, availability, transmission delay, interactive responsiveness, or others by using one or more communication paths at a time, switching between available communication paths as appropriate, using disparate communication paths for those functions that each is best suited for, sending data items redundantly using a plurality of communication paths, or by other means that will be apparent to those skilled in the art. These extended capabilities can, for example, allow devices to switch to an alternative communication path when communication using a particular communication path is lost, or to increase total throughput by using multiple communication paths simultaneously.

The exemplary implementation supports many new connection paths and connection path topologies, in addition to new methods of operating within the exemplary architecture. Some examples of these new techniques are described below.

In some exemplary illustrative non-limiting implementations, a communication path is configured to specify additional mechanisms for its management and use. For example, the data items sent over a communication path are encrypted, compressed, or protected from tampering or damage through the use of checksums or other mechanisms. Such additional optional mechanisms are used for some portions of a communication path and not for others or for an entire communication path from a first device to a second device. A plurality of such optional mechanisms are used simultaneously; for example, when a checksum is computed and added to the data items, the data items and checksum are then compressed and transmitted, with one segment of the communication path performing encryption and decryption of the compressed data items and checksum to prevent disclosure in transit over that communication path segment. In some exemplary implementations, security specifications are used to determine the use of data protection mechanisms such as encryption or tamper checks. For example, when sending with high security, data is encrypted and checked for tampering. When sending data items with low security, such means are dispensed with to reduce computational overhead. By use of encryption, tamper checks, or other methods of data protection, the effective security level of a communication path can be raised. For example, a publicly shared Wi-Fi hotspot is a low security communication path due to the chances of the data being intercepted by others, but if data is strongly encrypted, data that requires moderate, or even high, security can be sent over such a path.

Using various available communication paths, the exemplary illustrative technology herein provides additional capabilities and functions, such as enabling Peer-to-Peer (P2P) message exchange, Out-of-Band communications, delegation of tasks from a first device to a second device with, or without, the assistance of a server (TPC) device, announcement of an available task to a plurality of devices, collecting responses, selecting one or more devices to assign the task to from among those responding to the announcement, and assigning the task to the selected devices, and synchronization of catalog data items between devices with or without the intervention of a server (TPC) device.

The current exemplary illustrative non-limiting implementation is implemented over any data transfer technology, or combination of technologies, that permits sending blocks of digital data between devices (communication paths). Some exemplary, non-limiting examples include TCP/IP protocol over GPRS, EDGE, Wi-Fi or Ethernet, SMS or MMS over telephony data communication paths, and Peer-to-Peer links, such as Bluetooth or Wi-Fi "ad hoc" networking, but those having skill in the art can readily see that other technologies could be substituted, whether these technologies currently exist or are developed in the future.

Example Security Specifications

Exemplary implementations support a flexible and extensible security capability involving the use of "security specifications." A security specification is an ordered arrangement of bytes, some of which have particular or limited ranges of values, which are associated with an entity, such as a data item, set of data items, device or server and is used to specify permissions and/or restrictions on access to, use or modification of, the associated entity.

Security specifications are associated with entities in various ways. With some entities, such as some data items (e.g. nodes), the security specification is embedded into the entity as a normal aspect of such entities. With other entities, such as communication paths, users, or devices/servers, the security specification is located separately from the entity and associated with it by name, ID, or other reference that permits the applicable security specification for the entity to be located or identified. When not embedded in the entity, security specifications are stored in locations such as catalogs, BLOB nodes, external databases, files, or other locations as determined to be appropriate by those having skill in the art. The method used to locate an externally located security specification for a given entity depends on the storage location and method chosen. For example, if the security specification for an entity such as a user, device, or communication path is stored in a relational database, the security specification is stored with the entity ID as the key to the record containing the security specification, and use of the entity ID permits retrieval of the security specification. Other methods of storage and retrieval will be obvious to those with skill in the art.

Security specifications are created in a variety of ways. When a security specification is embedded into an entity such as a node, the security specification is generated by the method that generates the entity, such as by from specifications in the FDL that creates a node, as part of the node creation process. In some exemplary implementations the security specification is created separately from the entity, whether from FDL specifications or otherwise, and inserted into the entity as a separate step. When a security specification is created separately from the entity it is associated with, the method of creation of the security specification can make use of FDL specifications, use a software application capable of creating security specifications from other inputs, such as user command line options, graphical user interface widgets (e.g. buttons, text fields, check boxes, radio buttons, drop-down lists, menus, etc.), descriptions of the security specification in other formats, such as text, XML, or SQL, through the use of scripts or templates, or by reference to existing security specifications, or a combination of any or all of these. For example, a security specification that is to be stored in a relational database, such as MySQL, can be created based on user inputs through a graphical user interface that are used to generate a command line invocation of a script that creates an SQL command from a stored template of an SQL command, which resulting SQL command is used to cause the MySQL database software to create the security specification record in the MySQL database.

Exemplary security specifications comprise a plurality of elements, including the ID of the associated entity (when the security specification is not embedded into the entity), a security level specification for the associated entity, security tags possessed by the associated entity, and zero or more rules that describe the tag or tags that must be possessed by a second entity for the second entity to be permitted to possess, use, modify, transfer, or perform other actions to or with the associated entity.

Figure 15:
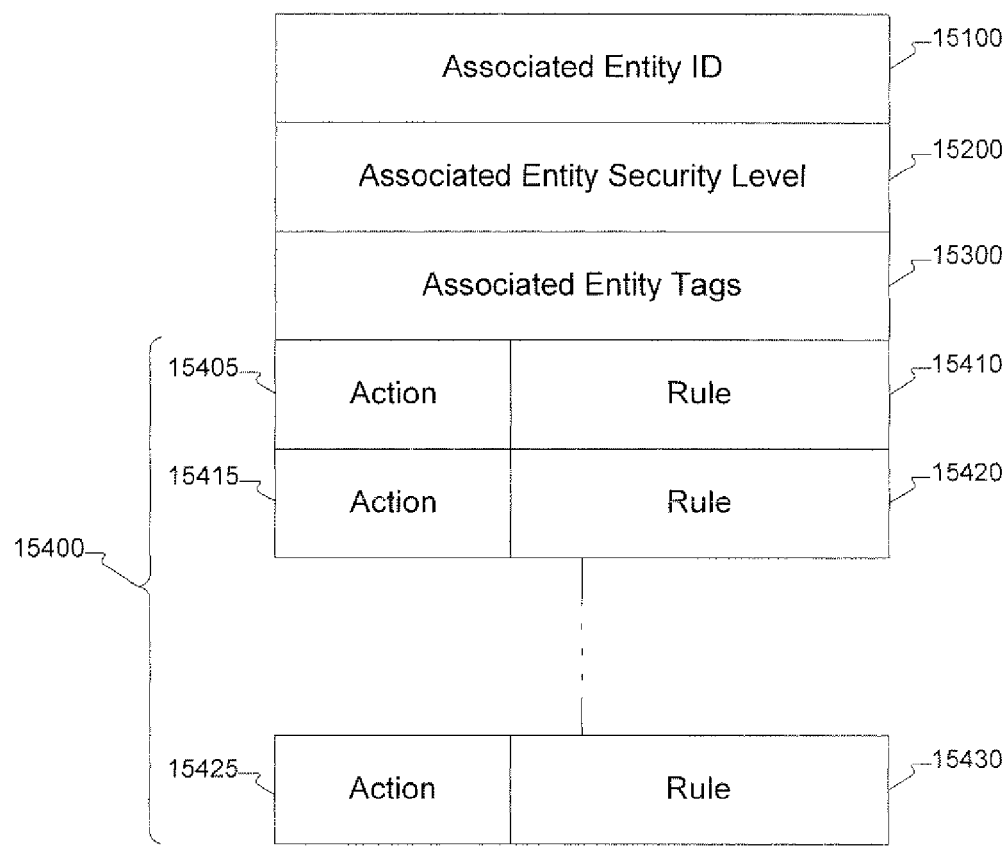
FIG. 15 depicts an exemplary illustrative non-limiting Security Specification.

An exemplary security specification is shown in FIG. 15. The items that comprise the exemplary security specification include an optional Associated Entity ID (15100), Associated Entity Security Level (15200), Associated Entity Tags (15300), and an optional section of action/rule combinations (15400), comprising zero or more action/rule pairs (15405/15410, 15415/15420, 15425/15430).

The Associated Entity ID (15100) is present in security specifications that are stored separately from the associated entity, and is optionally present in security specifications that are embedded into the associated entity. The Associated Entity ID (15100) is used to identify the entity associated with a particular instance of a security specification. The Associated Entity ID (15100) can comprise a device or server ID, communication path designation, user name or login ID, a node ID, catalog ID, or other entity identifier as may be determined to be useful by those having skill in the art.

The Associated Entity Security Level (15200) specifies a general security classification for grouping security specifications, regardless of security specification details, as described by the Associated Entity Tags (15300) or action/rule pairs (15400). In some exemplary illustrative implementations the Associated Entity Security Level (15200) is a numerical value with larger values indicating higher security level, and smaller values indicating lower security level. In other exemplary illustrative implementations, the Associated Entity Security Level (15200) is one of a fixed set of security level indicators, such as "high," "medium," or "low," having an assumed hierarchy with some indicators specifying higher levels of security and some other indicators specifying lower levels of security. Regardless of the implementation chosen, security specifications with higher levels of security are considered to be compatible with security specifications having lower levels of security when the receiving entity possesses the higher security level, but not when the receiving entity has the lower security level. These restrictions ensure that data can pass to a more secure entity, or over a more secure communication path, than required, but can not pass to a less secure entity, or over a less secure communication path, than required by the security specification of the data. For data to be transferred, the security specifications of the sending entity, the receiving entity, the communication path used, and the data being transferred must all be compatible.

The Associated Entity Tags (15300) are used for specification of finer-grained security access permission than that provided by the Associated Entity Security Level (15200) item. Associated Entity Tags (15300) comprise zero or more "tags." A tag is a numerical, text, or other data object that has a particular meaning in the context of an exemplary implementation. An arbitrary number and types of tags can be included in a security specification's Associated Entity Tags (15300) item. These are used to provide the associated entity with a specific set of permissions or restrictions when combined with the action/rule pairs (15400) of a second security specification as described below.

A security specification can comprise zero or more Action/Rule pairs (15400). Rules (15410, 15420, & 15430) in the security specification of a first entity are used to specify the Associated Entity Tags (15300) that must be included in, or that can not be included in, a security specification of a second entity for the second entity to be considered compatible with the first entity for purposes of carrying out a specified action (15405, 15415, & 15425). Actions (15405, 15415, & 15425) comprise a number, text, or other data object that has a particular meaning in the context of an exemplary illustrative non-limiting implementation, and are used to specify various actions that can be taken, such as possessing a particular data item, transferring a data item to another device, executing a set of nodes, updating catalogs on a device, etc. The specific set of actions that can be specified is implementation dependent. Rules (15410, 15420, & 15430) specify the tag or tags that must be, or must not be, in the second entity's Associated Entity Tags (15300) item for the second entity to be compatible with the first entity. Rules are Boolean expressions that permit arbitrary specification of tag combinations or lack of tags, in ways that are well known to those of skill in the art. For example, a rule can specify that a second entity must possess the "MAINTENANCE" and "MANAGER" tags, but can not possess the "DIRECTOR" tag in order to be compatible for purposes of carrying out the associated action, which might be transfer of a machine's maintenance required alarm. Such a rule would prevent sending such an alarm to the director of maintenance, but would permit sending it to another manager in the maintenance division, who could then, for example, create a task and assign it to a worker to service the machine.

Action/Rule pairs (15400) and the Associated Entity Tags (15300) that drive the rule evaluations are only checked if the Associated Entity Security Levels are compatible. They can not be used to override restrictions on compatibility specified by the security level assigned. They can be used to provide finer-grained management of compatibility within compatible security level relationships, for instance to allow a manager to receive data about the employees they supervise from the human resources system, but not to permit the manager to receive data about employees they do not supervise, or to allow a worker to cancel a task assigned to the worker without permitting the worker to cancel other tasks. By careful use of security level assignments, tags and action/rule pairs for various entities, any arbitrary pattern of data movement and use, data movement methods and data movement or use restrictions can be established.

Example Communication Methods

In addition to the Pull mode of operation supported by exemplary prior art devices, exemplary devices can support Push mode, Cooperative Push mode, Out of Band Transmission, and Communication Path Switching.

Peer-to-Peer Communication

As described previously, Peer-to-Peer (P2P) communications involve direct connection between two or more devices without a requirement for a server or other device to enable communications. A plurality of technologies exist that can support this mode of connection, such as Bluetooth, and Wi-Fi in "ad hoc" mode. In some embodiments, P2P is used to permit transmission of messages and message segments between devices without the need for any connection to a server, such as to permit a first device to send data items representing a unit of work to a second device. This is advantageous in many ways, such as for permitting a supervisor to re-assign a task to a subordinate, or for a worker to pass a task to a co-worker.

P2P communications also are advantageous for a device with an available communication path to a server device to act as a "data item cache" for mobile devices that do not have such connectivity; for example, a first device having a high-speed connection path, such as a wired Ethernet connection, is sent data items, which are held for a second device or other devices that do not have connectivity to a server due to location or environmental factors such as signal shielding. The second device or other devices can connect to the first device by means of a P2P technology, such as Bluetooth or Wi-Fi in "ad hoc" mode, to transfer the data items to the second device or devices. Data items that must be sent to a server device from the second device or other devices are sent to the first device. The first device transfers the data items to the server by means of another communication path, or other connection as determined to be appropriate, such as by the methods described below.

When communication is initiated between devices using P2P, the devices must have a method of recognizing and locating each other. In some exemplary implementations, this is accomplished though information being distributed to devices in the form of catalogs. Catalogs containing Bluetooth known device IDs, ad-hoc Wi-Fi network names and addresses, as well as device authentication materials, and other information useful for locating, connecting with, and authenticating between devices using P2P communication methods are distributed and updated by servers and stored by devices until needed. Alternatively, when a first device recognizes communication paths, such as ad-hoc Wi-Fi networks or Bluetooth devices, the first device's user can be prompted to authorize use of said communication paths, to specify characteristics to assign to such paths (e.g. weighting factors used to dynamically select communication paths), or to provide authentication materials required to use said communication paths (e.g. username, password, or credit card number). Security specifications for communication paths are supplied by servers in most cases. When there is an appropriately privileged security specification associated with a user, the user also can supply security specification information for communication paths or other entities.

Push and Cooperative Push Modes

Figure 3:
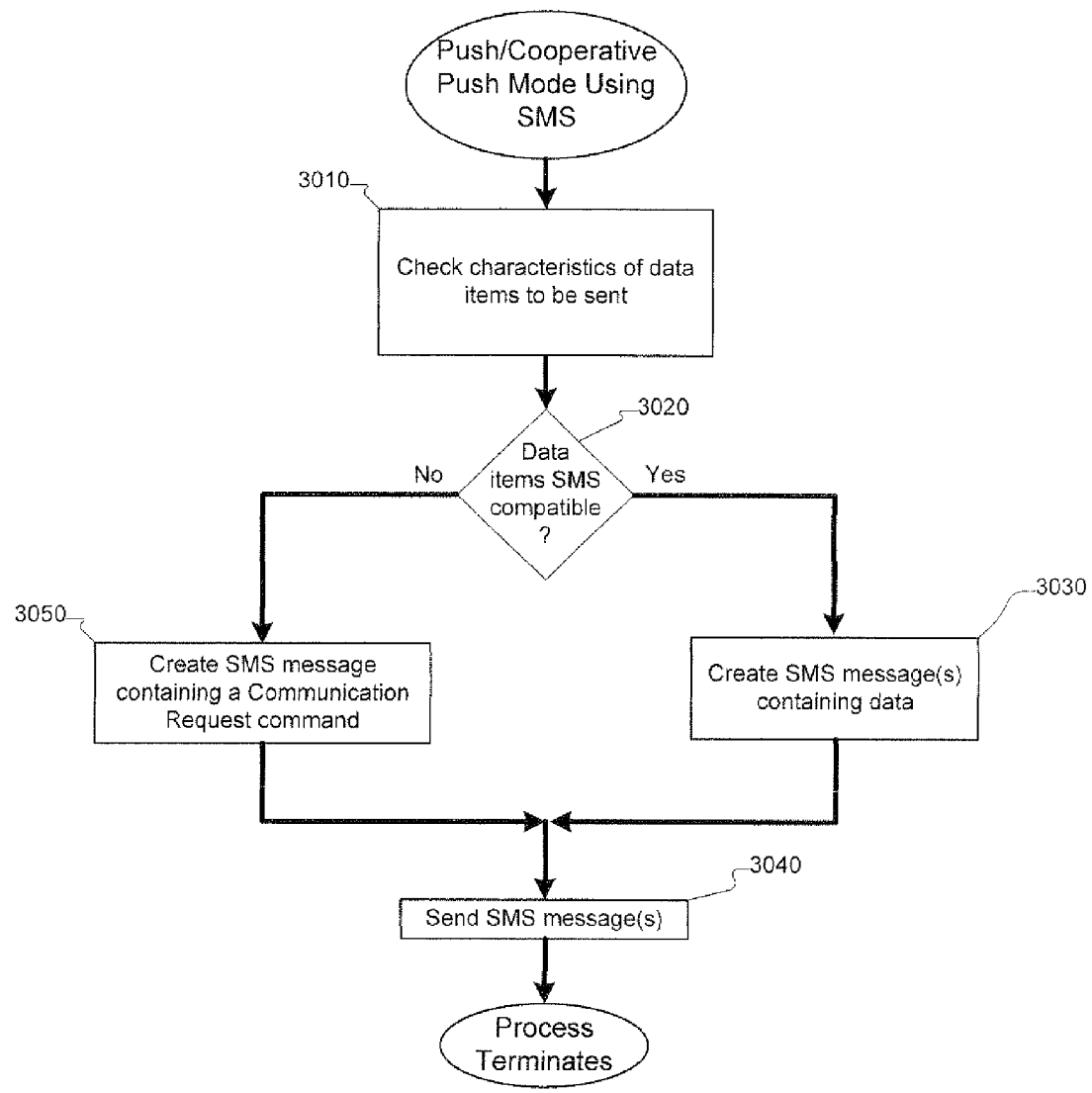
FIG. 3 comprises a flowchart depicting exemplary illustrative non-limiting use of Push mode to both send data items and to send commands so as to implement Cooperative Push mode communication.

As depicted in the flowchart of FIG. 3, Push mode is used both to send data items and to send commands so as to implement Cooperative Push mode communication. The exemplary procedure described involves sending data items to an exemplary device which is capable of receiving SMS messages and which is capable of establishing a Wi-Fi link when located in a Wi-Fi hotspot. The exemplary device is either not located in a Wi-Fi hotspot at the time the data items must be sent, its IP address is not known to the sender, or there is a firewall, router, or other component that blocks connections to the device.

In one embodiment, the first step in sending the data items to the device is to determine the characteristics of the data items to be sent (3010). SMS has a very limited bandwidth and a message size limitation that can require breaking large transmissions into a series of segments and sending each segment in a separate SMS message. Because SMS can involve costs that vary with the number of messages sent, limiting the number of data items sent using SMS is desirable in many cases.

If the data items to be sent are small enough to fit into a single SMS message, or for other reasons it is determined that the data items should be sent using SMS (3020), one or more SMS messages containing the data items are constructed (3030) and sent to the device (3040), completing the process.

Figure 4:
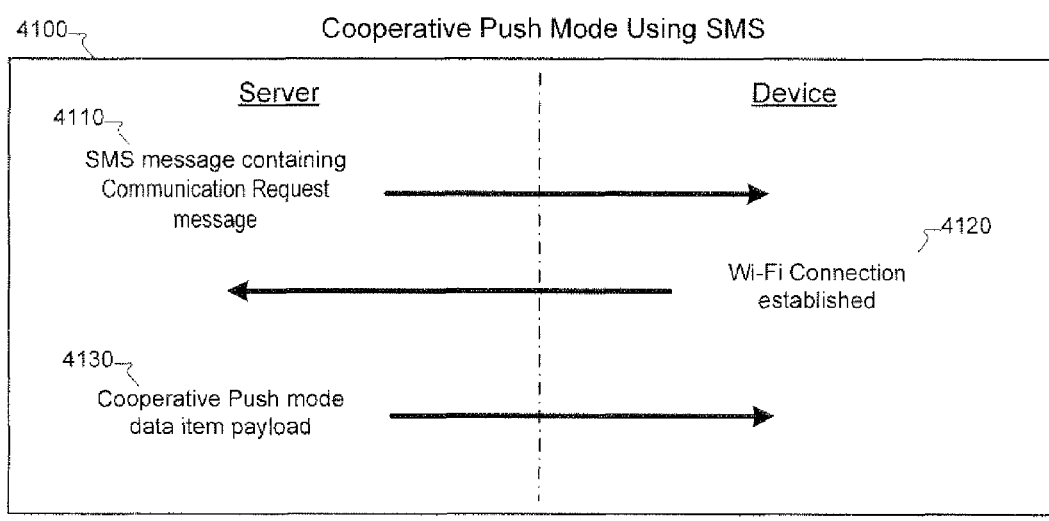
FIG. 4 depicts exemplary illustrative non-limiting device and server interactions in a Cooperative Push Mode communication using SMS.

If the data items to be sent are determined to be inappropriate for sending using SMS (3020), Cooperative Push mode is used rather than Push mode, and a Communication Request command (described below) is constructed and placed into an SMS message (3050), which is then sent to the device (3040), which completes the process. In the later case, the actual data items are transmitted when the device responds to the Communication Request command and performs a Pull mode communication session. This is described schematically in FIG. 4 (4100), where the Communication Request message is sent from the server to the device (4110). The device responds by establishing a Pull mode connection over an appropriate communication path, such as Wi-Fi (4120), and the server sends the waiting data items to the device using this communication path (4130). As will be apparent to those of skill in the art, the use of SMS to convey the Communication Request command is exemplary only, and any communication path capable of push mode to the device could be substituted. For example, MMS messages, existing P2P or Wi-Fi connections, TCP/IP over any available interface (e.g. TCP packets though a socket connection, UDP packets, multicast or broadcast packets using IPv6 or IPv4 methods, or other protocols over Wi-Fi, Bluetooth links to wired Ethernet interfaces, dialup modems using SLIP, PPP or other protocols).

As with any form of communication, a first device (whether server, mobile device, or other device) must have information telling it how to contact a second device. In some exemplary implementations, a first device is configured with required data about a second device's address, communication paths supported, etc., whether by a user of the device or by a server device periodically updating it with current address and other necessary data items, using catalogs or other means. In other exemplary implementations, a first device obtains required information about a second device from a known service, such as Lightweight Directory Access Protocol (LDAP) or Domain Name System (DNS), or by broadcasting a request and receiving a response from the second device or a disparate device, such as with Address Resolution Protocol (ARP). In some exemplary implementations address and other required information is provided to servers manually, through operators entering data items, while in other exemplary implementations devices automatically update servers with current information about their addresses and other required information using methods such as Dynamic DNS, catalog updates, or other methods as determined to be effective by those having skill in the art. Devices can use a plurality of information sources to determine address or other necessary information about disparate devices, such as using DNS to determine TCP/IP addresses and a stored catalog for SMS addressing information.

Out of Band Transmission (OOB)

Multiple communication path capability provides additional opportunity for Out Of Band (OOB) transmissions, where data items are exchanged through a communication path other than a preferred path, or at a time other than a scheduled polling period or routine contact. In some embodiments, OOB is used to provide high priority transmissions, such as emergency alerts, software or data item updates, coordination of tasks between users, or other time critical matters that should not wait for a device to connect at its next polling interval, or when the user is next at a point of presence where service for the preferred communication path is available.

In other embodiments, OOB also is used to implement Push Mode transfers, where a server initiates a connection to a client. Not all communication paths permit use of Push Mode due to their inherent design limitations, and some of these communication paths are likely to be preferred or primary use paths, due to their large bandwidths (e.g. Wi-Fi, wired Ethernet, etc.). In this scenario, a command that requests an immediate Pull Mode connection is sent OOB over a communication path that permits Push Mode (e.g. SMS or MMS). The receiving device then initiates a Pull Mode session with the server to transfer the required data items over a preferred connection selected as described previously. In some exemplary implementations the application software can request the user to make such a connection possible by moving to a hotspot, connecting to a wired Ethernet port, etc. as soon as is practical.

As will be appreciated by persons having ordinary skill in the art from the foregoing, OOB as enabled by an exemplary illustrative non-limiting implementation is useful in situations where a device has a limited capacity for connecting over preferred communication paths, is currently connected in a way that exhausts that capacity, but high priority messages must be sent to it from a device that is not currently connected to it. For example, if a device is limited to a single Bluetooth connection at a time and is currently connected to a server and exchanging messages, a second server with a high priority message for the device would not be able to connect to the device over Bluetooth to deliver it. In this scenario the server could send the message OOB using SMS or MMS, and thus bypass the Bluetooth connection limitation.

Some communication paths are not capable of Push Mode transmission due to their design and the way they are commonly implemented. For example, the Internet uses the TCP/IP protocol, which requires that a connecting device specify the network address of the device to be connected to. Server devices typically have fixed addresses that are known, or learned through systems such as the Domain name System (DNS), by other devices, which enables the other devices to initiate a connection to the server. Non-server devices, including most mobile devices, are not usually given fixed addresses, but request temporary addresses as needed (through such means as Dynamic Host Configuration Protocol (DHCP) when they are connected to the network. As a result, such devices cannot be connected to, because their addresses are not known, but they can connect to server devices or other devices that do have known addresses. Communication paths where any device can be connected to are capable of Push Mode transmissions, and, as has been previously described, even a limited capability communication path can be used in Push Mode to request that another device initiate a Pull Mode session over a more capable communication path that does not support Push Mode itself.

Communication Path Configuration

To enable use of communication paths by devices, such as those that use P2P technologies, certain commercial Wi-Fi hotspots, or others, the devices using such communication paths must be configured with any addressing, device ID, encryption keys, authentication information, or other data required to locate, connect with, and establish trusted communication between the devices over the communication path. Such configuration information is included in the devices by their manufacturer, added by the users of the devices, sent from server devices (e.g. as configuration messages or catalog data items), be a normal aspect of the particular communication technology used, or any combination of these. Updates to configuration information are made by the users of the devices, sent from server devices, be a normal aspect of the particular communication technology used, or a combination of these. For example, with Bluetooth P2P communication, the establishment of a Bluetooth piconet involves the exchange of information that enables devices participating in the piconet to calculate the pattern of radio frequency changes that is used by the members of the piconet, and so maintains contact with them. Such information exchange is a normal part of the Bluetooth technology protocols. In another example, devices joining an "ad hoc" Wi-Fi network may need network name data (e.g. "SSID") and access information (e.g. "WAP keys") to enable identification of other members of the network and permit communication with them. Such information must be provided to devices by means other than the "ad hoc" Wi-Fi network, such as by a user entering the information into the device configuration or a server sending the configuration information to the device. In non-P2P scenarios, such as the use of a commercial Wi-Fi hotspot, configuration information can consist of account login and password values, or other forms of identification and authentication, or, in the case of SMS, the phone number of the disparate device that is to be contacted.

One exemplary, non-limiting example of a method of collecting and distributing network access information such as Wi-Fi SSIDs and related authentication materials is for this information to be stored in a catalog and the catalog distributed to all devices that are granted access using the specific network accesses. For example, a mobile device may receive a catalog of connection information supporting wireless "hot spots," including sets of SSIDs and related access keys (e.g. WAP keys, account/password pair) that are usable by a Session Manager to establish a connection using a specific communications technology. Differing communications technologies can have different catalogs (e.g. a catalog for each technology) or a single catalog can contain information for a plurality of communication technologies. In addition, different users can have differing catalog(s) provided to their device, depending upon the access rights and connectivity to be granted to the specific user/device. In one implementation, these communication technology catalogs are maintained on a common server (TPC) device, and are distributed to mobile devices on an as-needed basis. Pre-use distribution and caching of these catalogs permits their contents to be used when the mobile device is in the field, and enables the device's seamless transition between supported communication paths. Alternatively, a device can query a common server device for a particular communication technology's catalog when this technology is identified as being active in a particular location. The response to the query is for the server device to send one or more catalogs, or one or more data items comprising portions of one or more catalogs to the requesting device.

In an alternative exemplary, non-limiting example, the catalog distribution mechanism is used to distribute the known device ID's, user ID's, and authorization materials of known devices and users. A mobile device, when identifying a second mobile device on a Peer-to-Peer network or other network that does not rely on a connection to a server device, can use the device ID and authorization materials to establish a communication path between the two devices. For example, if Fred's device has a device ID of 1, and a required authentication string of "secret," Sue's device can receive a catalog comprising a catalog element identifying Fred, Fred's device ID (e.g. 1), and the authentication materials (e.g. "secret"). Fred could receive a copy of the same (or a different) catalog that identifies Sue, Sue's device ID (e.g. 2), and the required authentication materials (e.g. "Sue's secret"). Upon recognizing a device on a network as device 2, Fred's device can look up the user (Sue), and determine if there are messages to be sent to Sue's device. If so, Fred's device can create a communication path between Fred's device and Sue's device, using the authentication materials (e.g. "Sue's secret," and "secret") to allow the endpoints to ensure that the other device is authentic and authorized to initiate the connection. In some alternative embodiments, selected elements of the catalog of users, devices, and authentication materials are forwarded to specific devices. By limiting the catalog elements distributed to devices, the distributed catalog elements are used as a form of authorization for a first device to connect to a second device. Connection attempts where both devices do not have both catalog elements for themselves and the connecting device fail due to a lack of authentication materials. This technique is advantageous for Peer-to-Peer connections such as those created using Bluetooth and ad-hoc Wi-Fi. Security specifications can be used to further limit the types of data, specific data items, or communication paths that may be used to transmit data between devices independently of the authentication method just described. For example, even after Fred and Sue's device have exchanged secrets and recognized each other, Sue's device can still be prohibited from sending certain data, such as profit margin data or payroll information, that bears a high security level or that is restricted to particular recipients, to Fred's device due to lack of matching security specification requirements between the devices, or due to the level of security associated with the communication path between them.

In addition to connection and access configuration, each communication path also is configured with additional information or settings to specify characteristics (such as speed, cost, or reliability) of and functions (such as push mode or large message size) supported by each communication path, preference settings used to determine which communication path to use under various conditions of availability, data item priority, or other factors, or other communication path configuration as deemed appropriate by those having skill in the art.

When a mobile device is operating using transient communication addresses, such as an IP address assigned using a Wi-Fi access point, the current communication address is required by disparate devices so they can contact the first mobile device using the current communication address. In one embodiment, the server (TPC) device updates a catalog of device communication addresses upon receipt of a message from a mobile device. The updated catalog element(s) are distributed to other devices on an as-needed basis. Alternatively, the mobile device, when establishing a connection to communication technology that assigns transient communication addresses, can update its own catalog element stored on the device and then synchronize that catalog element with a server device (or any other device with which it is communicating). This permits two devices to establish a low-bandwidth connection using a Peer-to-Peer communication path, exchange transient communications addresses for current high-bandwidth networks that they are currently connected to, and then establish a high-bandwidth communication path between the devices. In yet another embodiment, when a mobile device receives a transient communication address, it can update a central service using a standard dynamic addressing protocol such as DDNS. This eliminates the need to synchronize catalogs elements with transient communication addresses, but limits the available communication paths to those that are resolved using the standard dynamic address protocol.

Communication Path Switching

As described above, all communication paths are subject to disruption and loss of connectivity. Loss of connectivity can happen at multiple points along the path. The device can experience a failure in its communications hardware, there can be a loss of connection at the signal level (such as when leaving a Wi-Fi hotspot), some part of the communications infrastructure can be unavailable (e.g. a disruption of service at the cell provider, a connectivity outage in the Internet, an overloaded SMS server, etc.) or the server the device is communicating with could be unavailable (e.g. power failure, system maintenance, software errors, etc.). Loss of connectivity on one communication path does not necessarily mean that all communication paths for a device are unavailable. When a device has multiple communication paths available to it, and one or more of them become unusable for any reason, the device can have the option of switching to a communication path that retains availability. Devices also can switch communication paths without loss of connectivity so as to optimize use of available communication paths and improve such aspects as speed, reliability or responsiveness, or decrease such aspects as cost, or delay. Devices can re-evaluate their use of available communication paths only when a failure occurs, periodically on a configurable or hard-coded basis, when a new communication path becomes available, any combination of these, or other options as determined to be proper by those having skill in the art.

Some exemplary devices support auto-selection of communication paths, where communication path switching is done without action on the part of the user and, in some implementations, no action on the part of the application software. Such exemplary devices are designed such that the device operating system selects the communication path and the application software always uses the currently selected communication path, and changes communication paths as the device directs. Such switching is transparent to the user or the application software in some exemplary implementations, and is detectable to the user or the application software in other implementations.

In other exemplary devices, the communication path used by default is determined by the operating system of the device, but the application software can override this and use alternative communication paths through use of mechanisms supplied as part of the operating system by its manufacturer.

For example, in some embodiments switching is done as a failover response to loss of connectivity on an existing communication path, or switching is done at any time that an alternate communication path is determined to be preferable to the communication path currently in use (path optimization). In some situations, where the communication path failure is not due to factors local to the device, even an Auto-Switching device can require an application to force a switch to a different communication path. For example, if the device is using a Wi-Fi communication path and a change is made to the Wi-Fi configuration of the hotspot firewall which results in blocking of access to the address of the server the device is connected to, the device still detects the Wi-Fi signal and is able to send and receive TCP/IP packets, and so does not auto-switch to an alternate communication path, despite the fact that the device cannot use the Wi-Fi connection to reach its server. In such a scenario the device's application software can re-establish a communication path to its server by forcing a switch to an alternate communication path, such as GPRS or EDGE.

In some embodiments, the method for switching communication paths as a result of communication path failure involves several stages. First, the loss of connectivity is detected. Second, an alternate communication path is selected. Third, connectivity over the new communication path is established. In more specific embodiments, when path optimization is in use, the device performs the second step in this process, selecting a communication path or paths, and if the path(s) selected are different from the currently preferred path(s), the device initiates communication path switching so as to make the selected path(s) the currently preferred path(s).

As will be appreciated by those persons having ordinary skill in the art, detection of connection loss is straightforward for some communication paths, and difficult for others. For example, when using connection-oriented protocols, such as TCP packets over a TCP/IP communication path, whether this is done using Wi-Fi, Bluetooth, or some other means, there are acknowledgements returned when packets are received by the destination system and failure to receive an acknowledgement, after repeated re-transmissions, indicates loss of the connection. In this case, it does not matter where along the path the failure occurs, there is still a detectable loss of connection. With other protocols, such as UDP packets over TCP/IP, or SMS, there is no acknowledgement as part of the transport protocol and if the problem is not local to the device, it is not detectable unless the application level protocols include some form of feedback to detect communication problems. For example, if UDP or SMS is used to send a message from a server to a client, the client can send a UDP or SMS message back to the server when the message is received, acknowledging that the message arrived. If the message is lost in transit, there is no acknowledgement packet and the server can re-send the message after a suitable time has elapsed as determined by a suitable mechanism, such as a clock chip, loop counter, or programmable interrupt facility. If the acknowledgement packet is lost in transit, the server again re-sends the message and the client can receive an additional copy and acknowledge receipt again. This continues until the message has been received and the server has gotten acknowledgement of the message being received, or until there have been enough unsuccessful attempts for the connection to be considered unavailable. Duplicate messages and nodes are detected and ignored by means described below. When a communication path is determined to be unavailable, a failover path switch is performed, if there is an appropriate alternative communication path available.

Even when a protocol includes a feedback mechanism to indicate delivery success or failure, there are delays before a loss of connection is detected. For a TCP connection, this can require several minutes before a lost connection is detected, with a number of retransmission attempts occurring before the connection is determined to be unavailable. Problems with the device hardware or loss of signal can, in at least some instances, be detectable by the device's operating system and reported to applications regardless of the protocol in use. Whether through error reporting by the hardware or device operating software, or through excessive time passing without an acknowledgement being received, or by some other means as commonly practiced by those having skill in the art, a loss of connectivity is eventually recognized.

When a loss of connectivity has occurred, the device can retain data items that are waiting to be sent until connectivity is restored, or it can switch to another communication path that has, or might have, connectivity. The device can do both, retaining some data items for later transmission, and sending other data items over communication paths that have connectivity. The decision as to whether to retain data items for a later transmission attempt or to send them over alternate communication paths is made based on factors such as the priority of the data items, cost of the alternate communication paths, capabilities of the alternate communication paths, or on other factors as determined to be proper by those having skill in the art.

Devices also, in some exemplary implementations, switch communication paths proactively, without loss of availability of the current communication path, such as when a more preferred communication path becomes available, or when characteristics of data items to be transmitted, such as priority, permit use of a communication path that would otherwise not be selected for use. For example, if a device is connected by a communication path using GPRS, because that was the most preferred available communication path at the time the connection was established, and the user moves the device into an area where a more preferred communication path is available, such as a Wi-Fi hotspot, the device can establish a new connection over the more preferred communication path and terminate the less preferred path, even though it remains available. This is done to reduce costs, improve speed or reliability, or for any other reason. In another exemplary implementation, if data items have been awaiting transmission for an excessive period of time (e.g. as determined by configuration settings) the priority of those data items are raised. The new priority value of the waiting data items can result in an alternate communication path being selected, which would otherwise not have been selected at that time, and a switch to that communication path made to allow the waiting data items to be transmitted.

In scenarios where none of the available communication paths are in use, due to none being acceptable based on the configuration of the device, a change in the priority of the data items to be transmitted, in the device's communication path configuration settings, the security specifications associated with the communication path or the data items to be sent, or other change that results in a previously unacceptable communication path becoming acceptable, the device can use the newly acceptable communication path without switching from a different communication path.

Similar factors are involved when determining which alternate communication path to switch to, whether in fail-over mode or for path optimization. A device can have a priority scheme built into it that is used to choose an alternate communication path, or it can do so dynamically using rules to balance various factors (such as, without limitation, cost, speed, reliability, user preference, features supported (such as Push Mode), or the number and type of data items to be transferred), or it can ask a user to make the choice. The decision is made by the device operating system in some exemplary implementations, or is left to the application software in other exemplary implementations. In implementations where the device operating system makes the communication path decision, it still is possible to force use of a particular communication path by altering device configuration settings so as to disable those that are more preferred by the operating system.

In one possible exemplary implementation, each communication path characteristic, such as cost, speed, and reliability, is assigned a selection priority adjustment value. Selection priority adjustments are larger for factors that are important and smaller for factors that are less important, with irrelevant factors assigned a zero adjustment value. A selection priority score for each available communication path is calculated by adding adjustments together, with desirable characteristics' adjustment values being treated as positive and undesirable characteristics' adjustment values being treated as negative, and the communication path(s) with the highest selection priority score is(are) selected for use. By proper selection of selection priority score adjustment values, which will be familiar to those persons having ordinary skill in the art, the communication path chosen is controlled so as to maximize or minimize the impact of any characteristic or feature, to force selection of a given communication path if it is available, or to prevent use of a given communication path or, alternatively, to prevent use unless there are no alternatives. In some exemplary implementations, a separate initial calculation is made to compare the communication path capability or characteristic requirements of impending transmissions with the capabilities of the available communication paths, and those communication paths that do not support the required capabilities, such as Push Mode, are removed from consideration before the selection priority scores are calculated.

Figure 5:
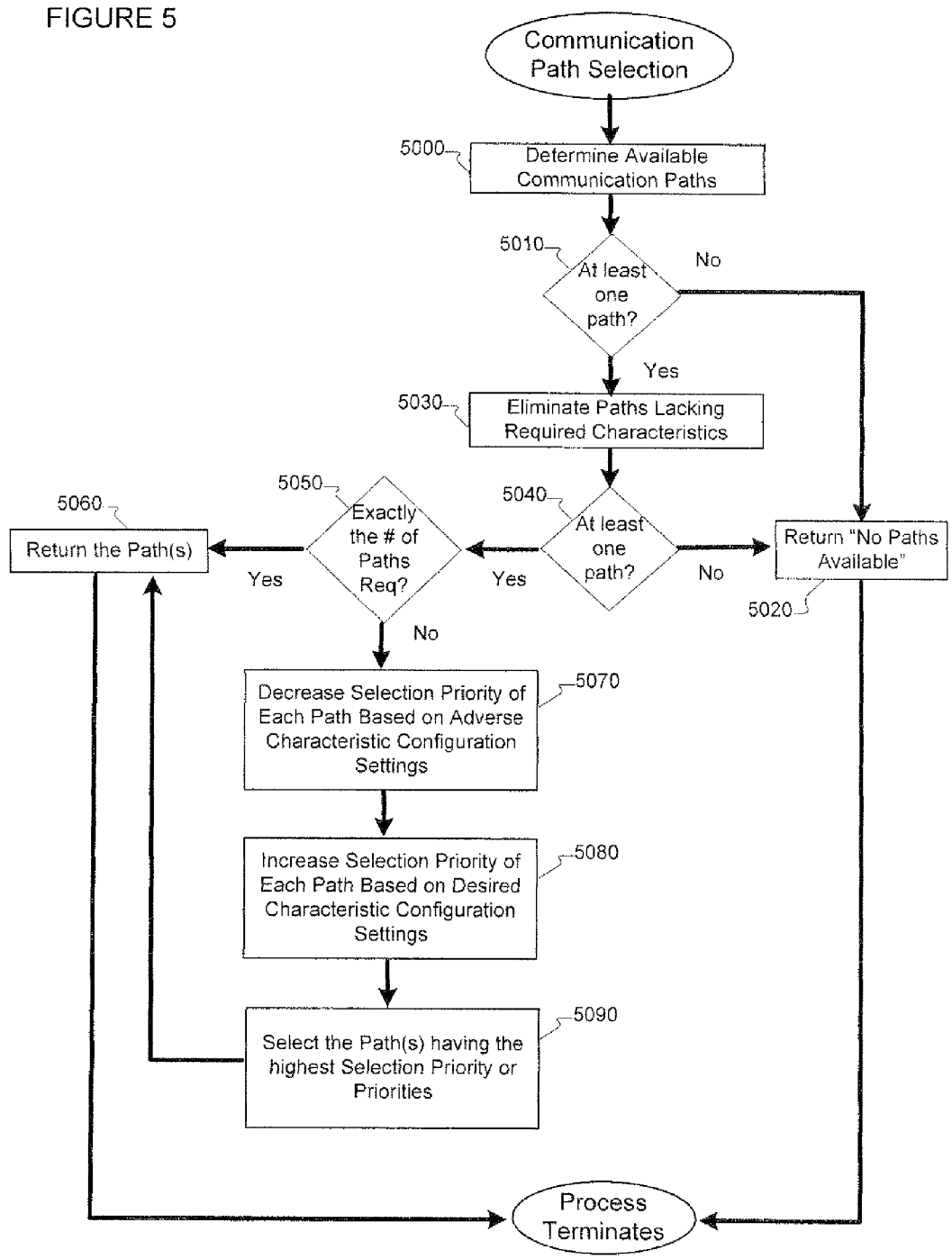
FIG. 5 comprises a flowchart depicting an exemplary illustrative non-limiting implementation of a method for selecting a communication path.

One exemplary process for selecting one or more communication path(s) for use is depicted by the flowchart of FIG. 5. The process begins by building a list of all currently available communication paths (5000). In some exemplary devices this consists of all of the communication paths supported by the device, such as SMS, EDGE, and Wi-Fi. In other exemplary devices it is possible to determine whether or not an interface is detecting a signal, and eliminate those communication paths that use an interface that is not currently receiving a signal (e.g. if the telephony data interface has no signal, neither SMS nor EDGE communication paths are available). In some exemplary devices it is possible to test a communication path for connectivity, such as by sending an ICMP "echo" packet (a "ping") to a known TCP/IP address over Wi-Fi and waiting for a response. As was previously noted, connectivity can be present in one part of a communication path and not present in other parts, thus preventing use of the communication path. For example, detection of a Wi-Fi signal and a response to a "ping" sent to a service provider do not mean that a server or other device is reachable through Wi-Fi. In creating the list of currently available communication paths, the device includes substantially all paths that cannot be positively determined to be unavailable. For this purpose, a device can maintain a list of communication paths that have been recently determined by the device to be unavailable through lack of receipt confirmations for previously transmitted data items. This prevents a preferred communication path that appears, from the presence of a signal, return of "pings," or other means, to be available, but that has failed to allow transfer of data items in the recent past (where "recent past" is a time period determined by configuration settings or designed into the device or the application software). Elimination of such communication paths from consideration permits selection of a less preferred, but potentially more usable, communication path that would otherwise not be chosen.

Communication paths that do not possess the required security specification characteristics to be useful to transmit waiting data are considered unavailable for purposes of selecting a communication path. When the purpose of the path selection is to perform a pull mode session (e.g. to poll a server for waiting data or messages), security specification characteristics are not used to eliminate communication paths, though in some exemplary implementations they are used to treat some communication paths as more preferred than others (e.g. paths with higher security levels are given increased preference over those with lower security levels).

If the list contains no available communication paths (5010), the process ends with a "no paths available" result (5020). In this case, the device cannot communicate at the current time and location. Some exemplary devices can alert the device user to this situation so that the user can move the device to a location where additional communication paths are available. Exemplary devices also can repeat the selection process periodically until an available communication path appears.

If the list of available communication paths contains at least one communication path, the next step in the selection process is to eliminate all communication paths from the list that do not support all required capabilities (5030). For example, if a push mode transmission is required, any communication path that does not support push mode is removed from the list of available communication paths. Once the elimination of such communication paths is complete, a check is again made that the list contains at least one communication path (5040). If not, the process ends with a "no paths available" result (5020). If the elimination of paths lacking required capabilities resulted in the list containing exactly the number of communication paths required (this is typically one, but some exemplary devices can use more than one communication path at a time and thus can require selection of a plurality of communication paths), the list of paths is returned and the process is complete.

If the list of available communication paths contains more paths than are required, it is necessary to select the most preferred path(s) from the list. In an exemplary embodiment, each path in the list is given an initial selection priority value of zero. The selection priority value of each path is then adjusted downward for each undesirable characteristic that is associated with the path, by an amount determined by configuration settings for that characteristic (5070). For example, if low bandwidth is considered undesirable, and has an adjustment value of three, then the selection priority value is decreased by three for all communication paths in the list which have a characteristic of low bandwidth. Selection priority values are signed numbers and can be negative. Such decreases in selection priority are also cumulative in that if low bandwidth and unreliability are both considered undesirable, with adjustment values of three and five respectively, a communication path that has low bandwidth and is unreliable (e.g. SMS) would have its selection priority value decreased by eight.

The selection priority values are then increased for each characteristic associated with a path that is desirable, by an adjustment amount determined by configuration settings for that characteristic (5080). For example, if low cost is considered desirable, and has an adjustment value of six, then the selection priority value is increased by six for all communication paths in the list which have a characteristic of low cost. Such increases in selection priority are also cumulative in that if low cost and high bandwidths are both considered desirable, with adjustment values of six and four respectively, a communication path that has low cost and high bandwidth (e.g. Wi-Fi) would have its selection priority value increased by ten.

The selection priority adjustments just discussed alternatively are performed in some exemplary implementations as a single step using signed adjustment values, as will be apparent to those with skill in the art.

Once the selection priority adjustments are complete, the communication path(s) with the highest selection priority values are selected (5090) and returned (5060) and the process is complete.

The choice of characteristics to include in the configuration, the assignment of characteristics to each communication method supported by a given device, and the priority increase and decrease values chosen for each characteristic can be used to adjust the preference for communication paths under different circumstances to any extent required. An example of a typical scenario is a device capable of three communication methods: GPRS, Wi-Fi, and Bluetooth, located at a public Wi-Fi hotspot in a major city, where both GPRS (both TCP/IP and SMS protocols) and Wi-Fi are available, but Bluetooth is not. The user has configured the device settings to prefer high bandwidth (−10, +3), low transmission delay (−1, +5) and low cost (−1, +1), meaning that if a communication path is low bandwidth, decrease priority by 10, but if it has high bandwidth, increase priority by 3, and similar adjustments for transmission delay and cost. GPRS-TCP/IP is set as having low bandwidth, low transmission delay, and high cost. GPRS-SMS is set as having low bandwidth, high transmission delay, and high cost. Wi-Fi is set as having high bandwidth, low transmission delay, and low cost. Bluetooth's settings are not relevant as it is not available. Both available communication paths have identical security specification characteristics, so this is not a relevant factor in deciding between them. The device is not currently in need of push mode, so the lack of support for this capability is irrelevant as well. The calculation results in the following scores for each method: GPRS-TCP/IP (−6), GPRS-SMS (−12), and Wi-Fi (+9). The Wi-Fi communication path is selected for use.

In another possible exemplary implementation, the preference score total for a communication path must exceed a specified figure for the communication path to be used, and the priority of the data items to be sent, or the time elapsed since the last connection is added to the total score as another factor. In this manner, a communication path that is too costly to use under normal circumstances is selected for use if there is a great enough need (e.g. high priority data items waiting or a need to poll for updates within a given period of time) and no better communication path is available. In some exemplary implementations, data item priority can vary with the type of data item. For example, a user's response to a request might be given a very high priority, as might an emergency alert notification, while a request to pre-fetch image data items or to request a check to see if a given set of nodes have available updates would be given a lower priority. In one exemplary implementation the priority values are associated with the node type, while in another exemplary implementation the priority is specified by the sending software at the time the data item is submitted for transmission, or recorded in the data item itself as part of the self-descriptive data of the nodes that comprise it, or dealt with in other ways as determined to be proper by those having skill in the art.

In alternate exemplary embodiments, selection of the most preferred communication path, or paths, is not done as described above, but is performed using a more complex method, for example, one involving artificial intelligence techniques, such as goal-seeking rule-based systems, inference methods, neural networks, and pattern recognition using historical data concerning communication path availability, user selections, or other data. Combinations of these or other methods can also be used. An exemplary method of this type involves use of a "preference function". A "preference function" is implemented that computes a "preference value" for each pending data item if sent over each available communication path. The preference function uses parameters describing available communication path capabilities, the size of the data item to be sent, the priority of the data item, recent history of transmission time delays for available communication paths, communication path costs (in some scenarios this can be adjusted for location, time of day, data item size, total data sent in a given time period, or other factors), or other parameters as will be well understood by those having skill in the art. After computing a preference value for each data item and communication path combination, any communication path with a computed preference value that crosses a specified threshold is selected for sending the associated data item. Preference value is recomputed as the parameters used to compute it change. This method allows an arbitrary number of different factors to be combined to reach a decision about which available communication path, or paths, are preferred for sending a particular data item at a specific time, so as to optimize selected factors, such as cost, speed, delivery delay, or others. This method permits use of more complex preference functions than simple weighting factors as described above. By comparing the computed preference value to other thresholds, this method can also be used for resolving other decisions, such as when to send data items Out Of Band, not just how to send them.

Once an alternate communication path has been selected, communication must be established over it. For some communication paths, such as SMS, which are connectionless, this is simply a matter of using the new communication path for future transmissions, though in some cases data items might require reformatting to be compatible with a communication path's format restrictions. For other communication paths, which rely on establishing a connection before sending data items, switching communication paths requires that a new connection be established before data items are sent. In some devices this task is dealt with transparently to the application software by the device operating system. In other device implementations the application software is required to handle this task. In either case, the application software is required to complete handshaking tasks, such as provision of authentication data or re-establishment of session context, prior to resumption of data item transmission.

In some embodiments, the mechanism used to cause a switch in communication path by an application is determined by the design of the exemplary device. Various methods are currently in use by different device manufacturers and additional methods are both possible and likely in future devices. In some exemplary devices, such as the Blackberry, an application specifies the communication path to be used for a given connection by appending parameters to the address (URL) of the device being connected to and passes this to a connection object's "open" method. To switch communication paths on such a device, the application closes the existing connection and opens a new connection using different parameters that specify the alternate communication path. In other exemplary devices, different connection methods are used for each communications method supported by a device, and application software can use the methods required by the existing communication path to close that connection, and use the methods required by the new communication path to open a new connection on it. In still other exemplary device implementations, the selection of a communication path is under control of the device user through physical controls or operating system utility software, and application software must interact with the user to request a change to a different communication path.

The ability to send messages and message segments over any appropriate communication path, without loss of functionality, and to switch communication paths in the middle of sending a segmented message without disrupting the process, allows the devices to maximize throughput and minimize response delay by selecting the fastest available communication path at any given time, to improve reliability by failing over to an alternate communication path when the one in use loses connectivity, to minimize cost by selecting an appropriate communication path for the type of data item being sent, and to improve functionality by permitting communication paths to be chosen and used based on their capabilities, such as when Push Mode is required and not all available communication paths support this method of operation.

Multi-Path Data Routing

With some exemplary device implementations it is possible to use more than one communication path at once. For example, a device can send or receive SMS while also exchanging data items over Wi-Fi, or transferring data items with a Bluetooth link while also connected through a wired Ethernet port. All of the issues and solutions described above for single communication path use, including switching communication paths when connectivity is lost, methods of selection of appropriate communication paths from the available options, etc. apply to the use of multiple communication paths. Multiple communication path use adds additional capabilities and issues that must be considered, however.

With multiple communication paths in simultaneous use, the total bandwidth of the device is increased, with data items being sent over all usable communication paths. The Node Store on the receiving system stores all data items that arrive intact, while eliminating any duplicates and so merges them, regardless of the communication path they arrived through. Because there is no difference in node structure or content once received, it makes no difference which communication path a given data item was sent through, and communication paths can lose connectivity or gain connectivity over time and messages continue to be sent and received over any other communication path that retains connectivity and meets requirements for characteristics, priority requirements or other factors as described herein.

The sending device can use a number of different procedures for selecting which data items to send through each communication path. Examples of possible procedures include sending the next data item in a queue over the first communication path which becomes free to accept data items, matching data item characteristics with communication path characteristics (e.g. sending large data items over high bandwidth communication paths and small data items over low bandwidth communication paths, or sending data items that must be sent in Push Mode over communication paths that support Push Mode and not over communication paths that do not support Push Mode), sending data items in priority order with highest priority data items being sent before lower priority data items, sending data items that are being sent in response to Pull Mode requests over one communication path and reserving another communication path for Push Mode exchanges, or any combination of these procedures or others as are determined to be appropriate by those skilled in the art. Procedures are selected to maximize throughput, improve responsiveness for the user, minimize costs, maximize flexibility for application developers, or for any combination of these or other purposes. In some exemplary implementations, a method based on the priority adjustment method described above is used to determine which communication paths to use. Once the priority values for each available communication method have been determined, those which have scores above a configured value are used. Those below the configured value are not used. Alternatively, those having scores below a configured value are not used unless there is a need for communication (messages waiting to be sent or it is time for a scheduled poll) and no methods with higher scores are available. In some exemplary implementations, the user must explicitly authorize use of communication methods with scores below the configured threshold. This provides an opportunity to make another communication method available instead, such as by relocating the device into a Wi-Fi hotspot, connecting it to a wired Ethernet interface, or through other means.

If all available communication paths tend to be unreliable or occasionally incorporate large delays until delivery occurs, the same data item can be sent over more than one communication path to maximize the chances of delivery and to minimize the time until delivery occurs. Duplicate delivery is likely in this scenario; however the duplicate detection and handling procedure described above deals with this problem and eliminates duplicates before they are stored. In some exemplary implementations, sending duplicate data items in this manner is limited to high priority data items, with lower priority data items being sent though only one communication path, with the application level protocol dealing with lost or corrupted data items in the manner described previously.

Example Devices

Figure 6:
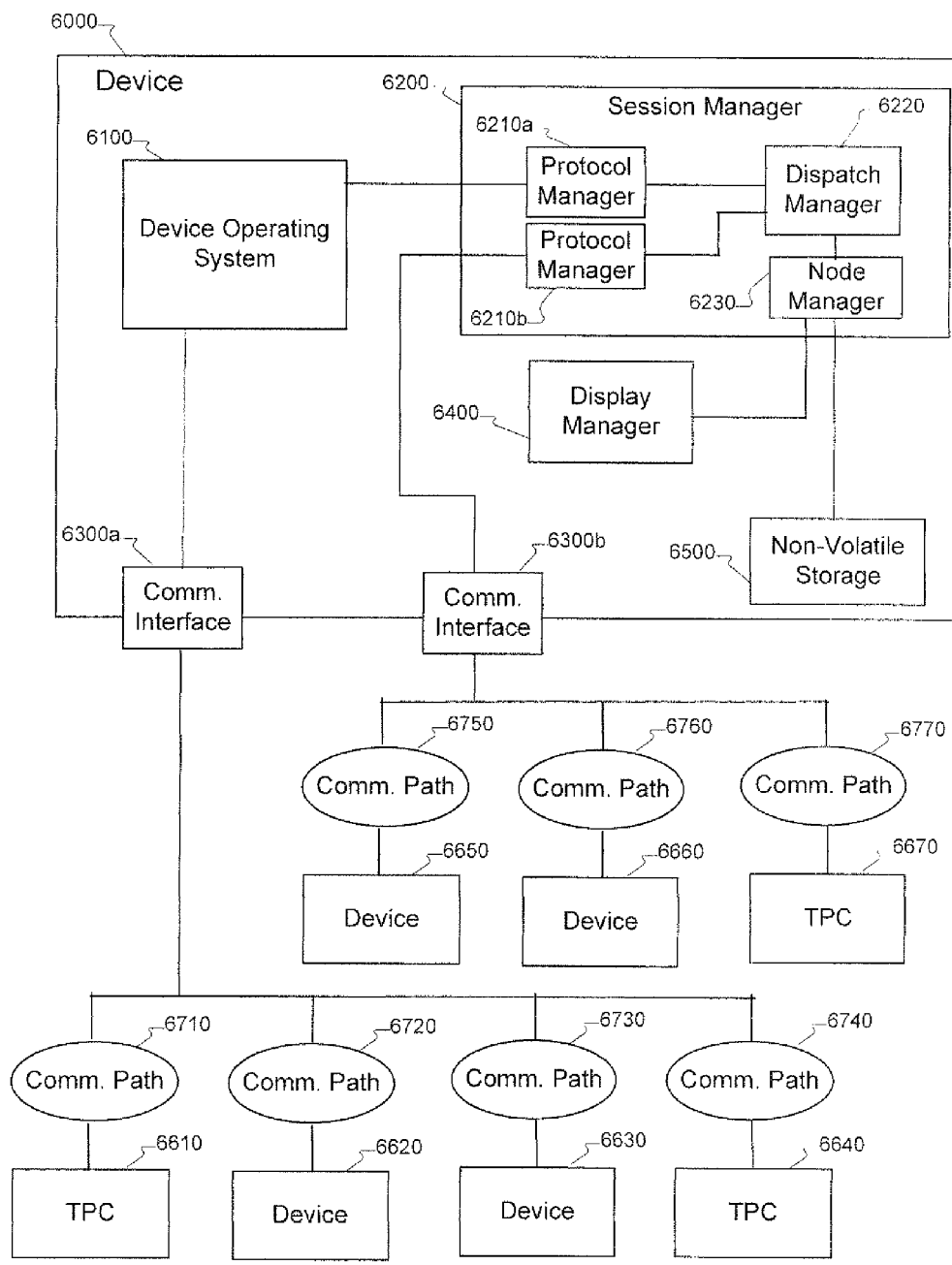
FIG. 6 depicts a schematic diagram of an exemplary illustrative non-limiting device having a plurality of communication paths available to a variety of other devices, through a plurality of communication interfaces, in accordance with the exemplary illustrative non-limiting technology herein.

FIG. 6 illustrates exemplary, non-limiting implementations of the communications portions of devices compatible with a communication system architecture such as the exemplary architecture presented in FIG. 1, in which a first device (6000) communicates with one or more other devices (6610, 6620), through a particular instance of a communication path (6710, 6720). Each such device includes one or more communication interfaces (6300a, 6300b), which are capable of accessing at least one of a set of available communication technologies. Exemplary devices further comprise a Dispatch Manager (6220), which in turn further comprises at least one Protocol Manager(s) (6210a, 6210b), at least one Session Manager (6200), and node store and cache (6500). The Protocol Managers are provided on the device to alter data item format and content as required by the implementation of the communication technologies used by the communications interfaces (6300a, 6300b). Device 6000 processes application tasks specified using computer program code devices (herein called "nodes") that are configured to be transmitted from a first device for receipt and processing on a second device.

Session Manager

A Session Manager component manages the activities of the Protocol Managers, and makes decisions as to whether to accept connections from other devices, how to route data items, and provides related functionality to the device.

When an exemplary, non-limiting implementation of a device supports use of a plurality of communication paths, a mechanism is supplied as part of the Session Manager that selects one or more communication paths for use from among those that are available. This is referred to herein as the "selection algorithm." Each communication path has characteristics that are used by the selection algorithm to establish a preference for the use of one or more communication paths and avoids the use of one or more other particular communication path(s). The selection algorithm can also use characteristics of the messages to be sent, such as priority, size, or the time the messages have been waiting for transmission, as factors in selecting a preferred communication path or paths. For example, if there is a very large message to be sent, such as a video clip, it is preferable to send it over a communication path having a large bandwidth, such as Wi-Fi, and not to send the message over a bandwidth-limited communication path, such as SMS or MMS. If one communication path allows unlimited use for a fixed cost while another charges a fee for each transmission, it is desirable to use the fixed cost path preferentially, and use the fee per transmission path only when the fixed cost path is unavailable, or to avoid use of the fee per transmission path entirely, or limit its use to high priority messages. In another example, where push mode transmission is required, a communication path that supports this mode must be used, and communication paths that cannot support this mode due to their methods of implementation cannot be used. In some cases, it is advantageous to use multiple communication paths in cooperative push mode, where an available communication path that supports push mode, but that is otherwise a poor choice for the transmission, is used to send a request, such as a message comprising a communication request command with a cooperative push mode sub-function, to the recipient device. This request message prompts the recipient device to initiate a pull mode connection with the requesting device using an appropriate communication path, over which the requesting device can transmit the message.

When a device has one or more messages to transmit, but the communication path in use is not appropriate for any reason, the device can store the message(s) until an appropriate communication path becomes available. If one or more of the messages have a sufficiently high priority, and there is an appropriate communication path available, but not currently in use, the device can, in some exemplary implementations, be configured to switch communication paths and send the waiting message or messages. In some exemplary implementations the user is requested, by appropriate means, such as an SMS message or a voice message, to move the device to a location where an appropriate communication path is supported at the earliest convenience so that transmission can be accomplished.

In some exemplary implementations, there are priorities associated with some transmissions which are incorporated into the preference calculation when deciding whether to use a given communication path. For example, a high priority transmission can result in use of a non-preferred communication path if it is the only one available, or if it has characteristics that are advantageous for the particular transmission (such as support for Push Mode) while other available communication paths do not have the required characteristics. In devices that support simultaneous use of multiple communication paths, such high priority transmissions can be done OOB while lower priority transmissions use the preferred communication path or are delayed until the preferred communication path becomes available. Transmission priority values are established by configuration settings, by input from users when requesting a transmission, by the design of the transmission procedures, or by other means as determined to be proper by those with skill in the art. Transmission priority values are associated with a transmission by the procedures implementing the transmission request through means such as function parameters, referenced data structures, or other commonly used methods. Transmission priority values are conveyed by use of priority values incorporated into the messages being transmitted, by associating priority values with such messages through indirect means (e.g. by putting high priority transmissions into high priority transmission queues and lower priority transmissions into lower priority transmission queues), or by any other appropriate mechanism.

There are other characteristics that can make use of a given communication path for particular purposes impossible. For example, with Wi-Fi communication paths devices connected through the Wi-Fi service are typically given a different network address each time they connect to the service, which makes sending of data items to a Wi-Fi connected device impossible until the Wi-Fi connected device establishes a connection (Pull Mode). Other devices have no way of reaching the Wi-Fi connected device at other times. However, with some other communication paths, such as SMS or MMS, devices have fixed addresses and are reachable by any other device that has access to the address (push mode). Some communication paths are selected for use when the operation to be carried out requires characteristics supported by that communication path, even though other communication paths are preferred for the bulk of data item transmission.

When there are a plurality of available communication paths, devices can select one or more to use, and can switch between them either when the preferred path or paths become unavailable (path loss switching), or at other times so as to optimize various aspects of the communication, such as speed, responsiveness, cost, reliability, or others (optimization switching). Detailed descriptions of some exemplary methods for detecting path loss, determining preferred path, etc. are provided below.

Different communication paths can be used in conjunction to carry out particular operations that would be impossible to perform using them individually. In one exemplary illustrative implementation, a device has both Wi-Fi and SMS capability. Wi-Fi connectivity has a large bandwidth and unlimited data transfer for a fixed cost, but operates only in localized areas called "hotspots," and only in "Pull Mode," where the mobile client device must initiate the connection. SMS connectivity has a small bandwidth, and has a fee associated with each transmission, but has much wider service availability and can operate in "Push Mode," where the server or the client can initiate communications. In a situation where a server device needs to transfer data items to a client device at a time when the client device is not connected and would not normally initiate a connection, the server device can use SMS to send a message containing a command to the client in Push Mode that results in the client device initiating an OOB connection to the server over Wi-Fi, which then is used to transfer data items over the faster and less costly Wi-Fi connection. In some exemplary implementations the message sent over the SMS communication path can result in the user being requested to move the device to a location where Wi-Fi service is available if the device was not already located in a Wi-Fi Hot Spot.

Push Mode also is used in some exemplary illustrative implementations to implement announcement and acceptance (A&A). A&A is a process where there is a task to be performed, and a plurality of users that may be available to perform the task, but exactly which user or users are available, willing, and able is unknown. The process involves sending announcement messages to one or more devices associated with one or more users selected as likely candidates for performing the task due to location, job function, by name, or other means, collecting user responses, returning them to the requesting server, and selecting one or more of those responding affirmatively to perform the task. Performance of the task can involve additional A&A interactions, downloading data items associated with one or more tasks, using pre-cached data items already present on a device, or other processes.

In some exemplary illustrative implementations, normal functioning involves devices polling server devices at intervals, or whenever there is a need to request updated data items or to send response nodes, or when the device detects the availability of certain kinds of communication paths. For example, once every ten minutes, whenever the user enters data items for transmission, or whenever there's a Wi-Fi communication path available. This is adequate in most situations, but there are times when a server device has data items that need to be sent to a device at a time when the device is not connected to the server, or when a second, non-server, device has data items or other data to transfer to a device (P2P). For example, when there are updated versions of nodes available that have previously been sent to a device and a need for the device to be synchronized so as to acquire the updated nodes as soon as possible, such as when catalog data items are changed, or when a supervisor's device has a task, represented by a set of nodes, that must be transferred to a worker's device to reassign the task. In such situations the use of push mode is required, but using it as described previously, to trigger a pull mode connection, may not be possible or optimal. For example, if the device is not able to make use of any of the communication paths that it is configured to use for pull mode connections, it can delay responding to the trigger until such a communication path becomes available. When the need to synchronize the device is urgent, or if pull mode cannot function without the updated nodes (e.g. to update price information on order forms, or the server address information has changed), then the nodes that need to be updated are sent in push mode or cooperative push mode. This transmission can be made over a communication path other than the one preferentially used for such transfers (e.g. over SMS or MMS rather than Wi-Fi or Bluetooth) despite increased costs or the time required to transmit the data items.

In some exemplary implementations, a device is limited to a single connection at a time over a given type of communication path, and use of OOB transmission using a different communication path is used to implement additional connections or to increase overall bandwidth. Because some communication paths can at times include unacceptable delays in transmission or be unreliable or intermittent, it is sometimes desirable to send a given data item by several communication paths at once. Such redundancy increases the chances of timely reception of data items at the receiver, but also can result in duplicate transmission. Because nodes have unique node IDs and version information, the receiver can recognize such duplications and discard them, or recognize an out of date node that was delayed in transmission and discard it.

For devices to exchange messages or message segments, they must have information as to which communication paths are supported, what recipient specification information to provide, and in some exemplary implementations, additional information such as authentication credentials, encryption keys, polling schedules, or other information required to gain access to the communication path, route data items to the intended recipient, and send them in the required form. Devices are initially configured by their manufacturers, users, or others, with sufficient information to permit them to connect with at least one server and exchange data items and commands with that server. Optionally, devices are configured with additional initial configuration information. Devices can acquire additional communications configuration information that specifies information required to exchange data items with other devices from the initially configured server(s), and thereafter from the other devices. Additional information acquired can include device IDs, device user names, communication paths supported by other devices, data routing information such as TCP/IP addresses, cell phone numbers, or Bluetooth device information, authentication information such as Wi-Fi hotspot login account and password information, server addresses for services such as SMS, DNS, or e-mail, scheduled polling interval or time data, communication path preference configuration data, data priority configuration data used to adjust communication path use based on priority of data waiting for transmission, or other information related to communication between devices.

Protocol Manager

In the transmit and receive descriptions above, reference is made to the processing of the exemplary Protocol Managers of the current exemplary illustrative non-limiting implementation. Protocol Managers are used to make communication path-specific modifications to data items to be transmitted and to reverse these modifications upon reception. Modifications are necessary for some communication paths to cope with limitations on data representations, message sizes, or other characteristics of transmitted data items.

Figure 7:
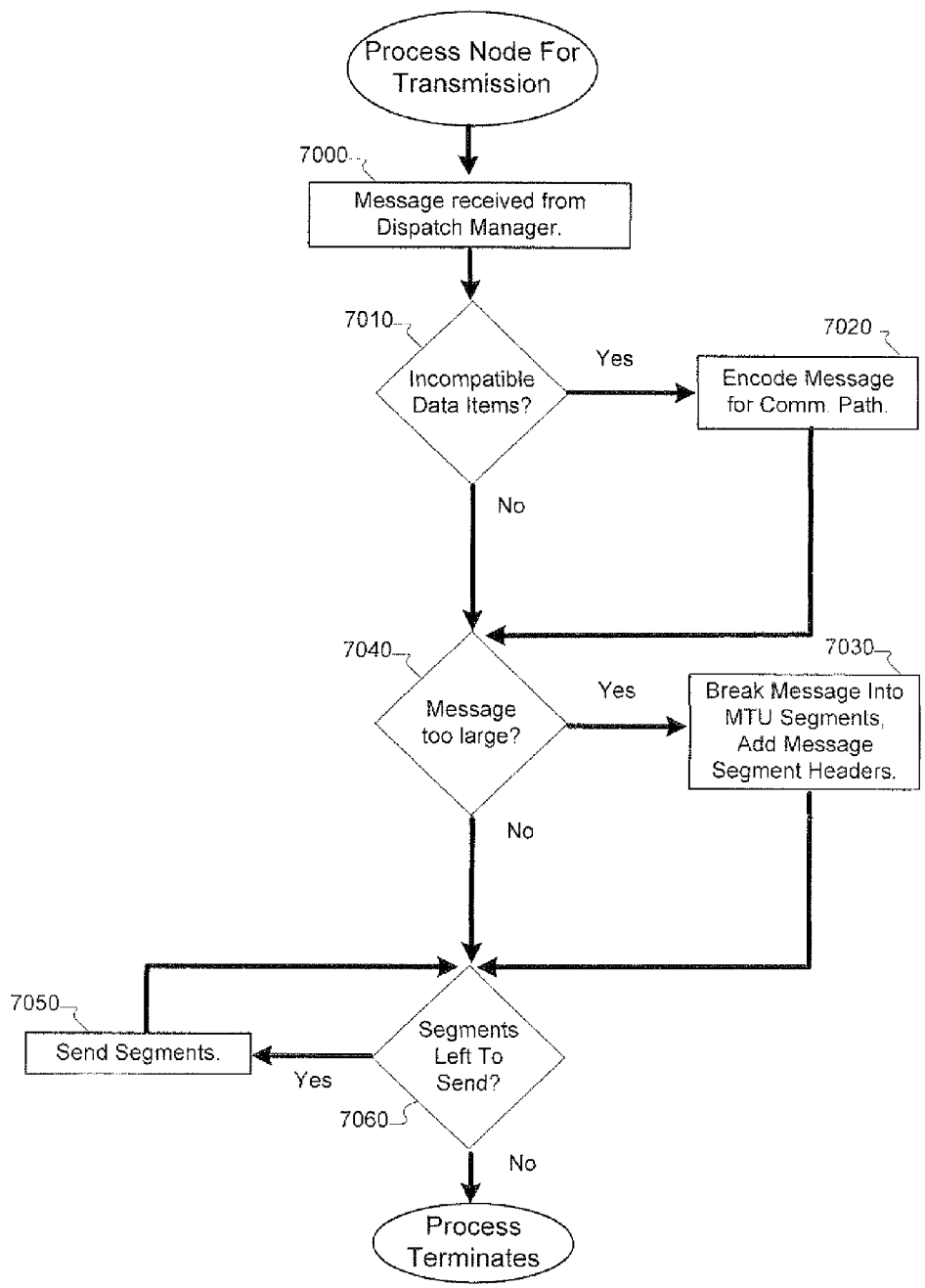
FIG. 7 comprises a flowchart depicting an exemplary illustrative non-limiting implementation of a Protocol Manager's processing of a message for transmission.

FIG. 7 is a flowchart depicting the processing done by a Protocol Manager for data items being transmitted by a Dispatch Manager. The Dispatch Manager passes the Protocol Manager a data block containing data to be transmitted (7000). The Protocol Manager checks the data bytes for compatibility with the communication path supported by the Protocol Manager (0710).

If there are incompatibilities (7020), the data block is encoded so as to remove the incompatibilities. Methods of encoding data are well known by those having skill in the art, and can include techniques such as "escaping" problematic bytes, using tag bytes to identify problematic byte locations, and substituting bytes which are compatible and which identify the problematic byte values.

If the resulting data block is too large to be sent as a single transmission over the communication path associated with the Protocol Manager (7040), the data block is divided into segments which are no larger than the Maximum Transmission Unit size for the communication path, even after adding segment header data that allows segments to be re-assembled into the original data block by the receiving Protocol Manager (7030).

While there are segments or a data block left to send (7060), send them (7050), after which the process terminates and control returns to the Dispatch Manager.

Figure 8:
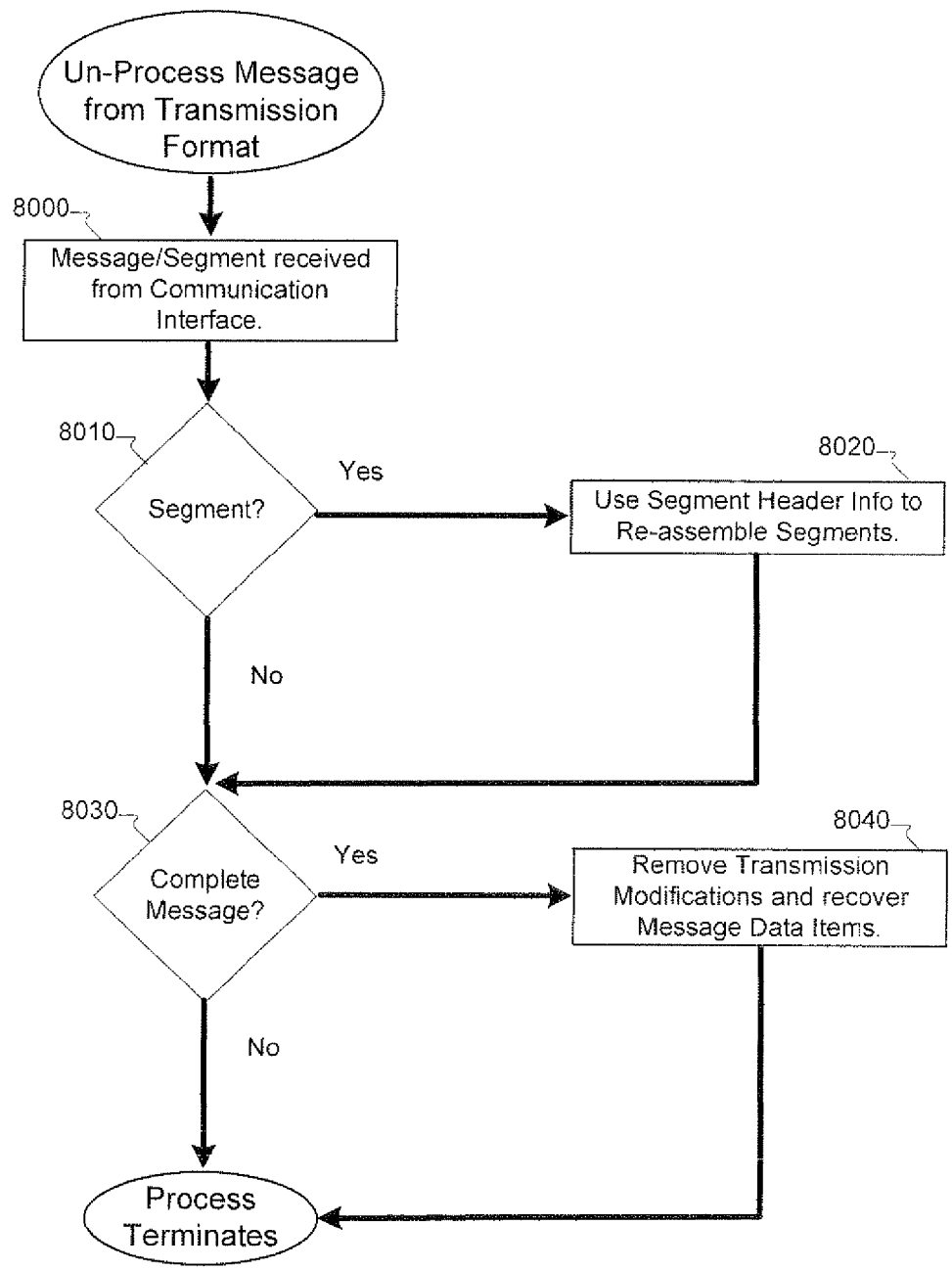
FIG. 8 comprises a flowchart depicting an exemplary illustrative non-limiting implementation of a Protocol Manager's processing of a message being received.

FIG. 8 is a flowchart depicting the processing done by a Protocol Manager being used to process data items by a receiving Session Manager. The Protocol Manager is given a message or message segment as received through the Communications Interface (8000). If it is given a segment of a larger message (8010), the Protocol Manager adds the segment to a message buffer, associating it with any previously received segments of the same message (8020).

If there is now a complete message, either because a complete message was received or because all segments of a larger message have now been received (8030), the Protocol Manager removes any transmission modifications that were made by the sending Protocol Manager, such as encoding of problematic data bytes, compression, encryption, or others, and recovers the original data block (8040). This data block is passed to the Dispatch Manager for further non-communication path-dependent processing, and the process terminates.

After data items are received, they are checked to eliminate duplicate nodes, and if found to be unique or updates to existing nodes (as described herein), they are placed in the device's Node Store. This permits data items to be sent over any available communication path or over a plurality of communication paths simultaneously, and allows switching between various communications paths as needed without creating a need for any component other than the Dispatch Manager to be aware of the communication path(s) in use or available for use. This simplifies implementation of the Node Store and data item processing components.

Node Stores and Caches

Referring back to the embodiments illustrated by FIG. 6, the Node Store (6500) supports the storage and access of data items sent to the device, data items waiting to be sent from the device, and commands waiting to be sent from the device. Data items are stored in a format appropriate for the device. Some data items comprise nodes. Nodes can represent user data elements, user interface instructions (visual and interactive behavior), and executable business logic. In the preferred exemplary illustrative non-limiting implementation, the Node Store honors node attributes as related to storage, and encrypts, compresses, or applies other protections.

In one alternative exemplary illustrative non-limiting implementation, data items are stored as ASCII strings in a flat file similar to the form in which they are transferred over the communications network (but without segmentation, special character handling, compression, or encryption filtering applied). In this exemplary illustrative non-limiting implementation, the flat file is sequentially searched in order to locate or replace a specific node or specific field in a node. In an alternate exemplary illustrative non-limiting implementation, nodes are stored in a database indexed by the node identifier. Preferably, a cache of data items, whether nodes or other types of data items, is maintained in local memory to improve the performance of operations supported by this module.

Regardless of the storage format, the Node Storage Module provides an interface to store, update, and access data items from the Dispatch and Display Modules. Preferably, the operations supported by this interface include replacing stored nodes with new nodes; adding or replacing a set of nodes; deleting a node, obtaining a specific node; finding the parent, next, or child node of a given node; obtaining one or more fields in a given node; and modifying one or more fields of a given node.

Data items are held in and managed by Node Stores while awaiting transmission or after being received by a device. Node Stores can use a variety of means to store, maintain, retrieve, delete and manage nodes. Data items in Node Stores are unique within that Node Store and any duplicate copies of data items are not accepted for storage. Data item uniqueness is determined in some exemplary systems through such means such as comparing Node ID and Node Version information of nodes that comprise each data item. In such exemplary systems, nodes with identical Node IDs, but higher Node Version values are considered "updated nodes" and replace nodes with matching Node IDs but lower Node Version values. Other means of comparing node uniqueness can be implemented, as will be apparent to those with skill in the art.

Nodes are also kept in Node Stores while waiting for transmission, waiting for processing by a device, post processing by the device, or when being stored for possible future use. Node Stores are implemented in many ways, such as, without limitation, "flat files," ISAM files, relational or other databases, in-memory data structures, as web browser "cookies," or in any other manner that permits storage of nodes in a way that preserves their contents and logical structure and permits determination of which nodes are stored, and retrieval of specific nodes as needed. Node Stores are implemented in different ways on different devices as long as the Node Store permits the necessary storage and retrieval operations on the nodes so stored. Node stores can be shared between devices if the devices are so configured, using synchronized database technologies.

Data items are held in Node Stores while waiting for transmission due to other data items being sent ahead of them (e.g. the other data items have higher priority for transmission, or were queued earlier), due to available communication paths not being appropriate for the delayed data items (e.g. the data items are large and are to be sent at a low priority, and the available communication paths are either slow and expensive), due to there being no available communication paths, due to the data items being queued between device polling intervals, or due to other factors. Data items waiting for transmission are stored in a single Node Store, regardless of which communication path they are to be sent over. Data items received by a device are stored in a single Node Store regardless of which communication path they arrived through. Node Stores can incorporate additional data about data items they contain that is not a part of the stored nodes themselves. This data can include such information as which device a specific data item is to be sent to, the version of that data item, when a data item was entered into the Node Store, which devices a given data item was sent to and when, the number of attempts to transmit a data item that have been made without success, or any other data that those having skill in the art deem to be pertinent and appropriate for the functioning of the system or its monitoring.

Mobile client devices can improve responsiveness to their users by maintaining as many data items as device resources permit in their Node Stores, where the maintained data items have a likelihood of being required in the future. Indications of such likelihood include, but are not limited to, being a part of an application in current use, being part of an application that is used frequently, containing data items which are required by a plurality of applications (e.g. server addresses, company logos, address book information, parts list, price list, billing code list, etc.), or being tagged in a way that indicates that they should be retained if possible. Maintaining such data items in the device's Node Store reduces the number of data items that must be transmitted in subsequent transmissions, and increases the likelihood that the device can perform its required functions during periods when no communication path is available. By transmitting such data items to the device at times when an optimal communication path for their transmission is available, the need to transmit them later over a less optimal communication path is avoided. Node Stores manage their contents through mechanisms well known to those with skill in the art, such as aging, prioritization, queuing, etc.

When it is predicted that particular data items are likely to be needed by a particular device prior to that need manifesting, and the device currently has an appropriate communication path for transmitting the particular data item available, some exemplary implementations can proactively send the data items that are predicted to be useful or needed to a device. Alternatively, a device can "pre-fetch" those data items in anticipation of their being needed at a time when an appropriate communication path is not available. An example of when such a need is foreseen is the sending of image, sound, or form definition data items required by one or more nodes that define a given task. Another example of foreseeing data item requirements is a server that maintains a list of tasks to be performed at particular times or at particular intervals. Yet another example of foreseeing data item requirements is acquiring data items that are required by a plurality of tasks. Such a server can look ahead at tasks scheduled to be performed and proactively send those data items required to perform the tasks to the scheduled device. Device resource limitations can limit how much data is handled in this way, but typical caching algorithms well known to those with skill in the art are used to manage the available resources advantageously for the device. Example algorithms include Least Recently Used (LRU), Most Recently Used (MRU), Least Frequently Used (LFU), or Adaptive Replacement Cache (ARC) methods. Optionally, the caching method chosen for an exemplary implementation can consider factors such as the expense or difficulty of re-acquiring data items (e.g. large nodes, such as image or sound data which are sent over high bandwidth communication paths that have limited availability vs. small nodes such as short text strings or commands that are sent over any communication path), the number of other nodes that reference a given node, or other factors. Additional examples of when such processing can improve efficiency, reduce costs, or otherwise be beneficial include updating frequently used data items or nodes listed by a plurality of Group Nodes or which form catalogs such as those containing server addresses, address books, or other data.

To address the duplication of nodes sent over a plurality of communication paths, and for other purposes, nodes each have a unique ID and version information defined as part of their structure. The node version information should not be confused with the FDL version information of the exemplary implementation's message format. The node version information specifies the version of the particular node so that the node is recognized as updating a node of the same node ID, being identical to a node of the same node ID, or being superseded by a node of the same node ID. The node version information, in some exemplary implementations, consists of a timestamp, an incrementing or decrementing numeric value, or other appropriate value, either alone or in combination with other information such as server identifiers, or manufacturer codes. In some exemplary implementations, the node version information can consist of a separate field within the node, or a combination of fields within the node, such as the concatenation of a serial number combined with user or catalog ID value. When a device receives a node, it can search its Node Store to determine if it already has a node with that node ID. If it does not have a node with that node ID, the new node is not a duplicate and is stored for use. If there is already a node with that node ID in the Node Store, the Node's version information is compared to determine which node supersedes the other, and the older node is deleted and the newer node stored for use. If both the node ID and version information are the same, the nodes are identical and the duplicate node is deleted. The communication path used to transmit the node has no effect on this procedure. Only the data contained in the node is necessary to determine the uniqueness of a node, or whether it has been superseded by a new version, not the method of transferring it to the device. If one node was sent over Wi-Fi, while another copy of the same node was sent through SMS or over a Bluetooth link, the node ID and version information are still present and are used to determine whether the nodes are duplicates or which supersedes the other if they have identical node IDs. Switching communication paths does not interfere with moving data items between devices and detecting duplicate transmissions.

The elimination of duplicate nodes prior to, or as part of the step of placing them in the Node Store allows a given data item to be transmitted over a plurality of communication paths simultaneously so as to reduce the delay in getting the data item to the receiving device, without requiring any information about the current delays incurred by the various communication paths. The communication path with the shortest transmission delay available at the time the data item is sent gets the data item to the receiving device, and data items sent over all other communication paths are treated as duplicates upon arrival, and ignored.

Node Stores also are used to hold response nodes containing user data provided in response to node processing until such time as these nodes are transmitted. Node Stores can track the time that such data items have been waiting for transmission and alert users to a lack of appropriate communication paths if this delay exceeds a specified threshold. The user then can arrange for an appropriate communication path by moving the device to a hotspot, changing configuration settings to allow an otherwise inappropriate communication path to be used, or in some other manner allowing a connection to be made and the data items to be transmitted. Alternatively, the device can take other actions upon exceeding a transmission delay threshold, such as choosing an alternative, perhaps more expensive, communication path for one or more nodes.

Exemplary Node Extensions and Additions

The details of the nodes of the current exemplary illustrative non-limiting device are described in U.S. patent application Ser. No. 11/169,149, but have additional attributes and types as described below.

One exemplary illustrative non-limiting implementation makes use of this capability to define new node types, or to extend the structure of nodes that were previously defined by other exemplary illustrative implementations, as needed to accomplish the additional purposes of the current exemplary illustrative non-limiting implementation. For instance, one example of the current illustrative non-limiting implementation can create a node type to be sent to a device so as to cause the device to make an inquiry of its user without disrupting the normal flow of the application in use, and a second node type to return the response of the user. Either or both nodes are sent in-band via a preferred communication path, via an alternate communication path, or using an Out-of-Band communication path. One use of such a capability is used to broadcast a task announcement to multiple devices simultaneously, possibly using a plurality of communication paths, and return responses indicating whether the task is acceptable or not (A&A) so as to allow scheduling of the task for one, or more, of the accepting users and not scheduling it to those refusing or not responding within a specified time period, according to logic defined by the particular implementation. Additional description of this aspect of the exemplary illustrative non-limiting implementation appears below.

Additional Exemplary Node Attributes

In the preferred exemplary illustrative non-limiting implementation, each node specifies a Node Version value. A first node, which should supersede a second node in device node stores, should have the same Node ID value as the second node, and a Node Version value, which is greater than the Node Version value of the second node. In situations where both nodes are present on a device, such as when a second node has been created as an update to a first node and sent to a device that has previously received the first node, the device can determine which node to store, and which node to delete, by comparing Node ID and Node Version values and deleting the older node in favor of the one with the higher Node Version value. The ability to determine which node is valid when more than one node with a given Node ID is present is required, such as in situations where nodes are sent using a plurality of communication paths simultaneously to reduce transmission delay and more than one of the copies is delivered to the device.

The preferred exemplary illustrative non-limiting implementation also includes a Node Transmission Priority value for each node. Node Transmission Priority is used to adjust the transmission order of nodes, with nodes having higher transmission priority being sent before nodes having lower transmission priority, to assist in determining which communication path is appropriate for sending nodes or to allow use of communication paths for high transmission priority nodes that would not be selected for use if only low transmission priority nodes were waiting to be sent, to allow sending high transmission priority nodes over a plurality of communication paths simultaneously, or for other purposes as deemed appropriate by those having skill in the art. In some exemplary implementations, some nodes are sent ahead of other nodes based on node type, such as "delete node" nodes being sent ahead of other nodes to ensure that nodes are deleted prior to nodes being inserted in node stores. Doing this reduces resource use on devices with limited storage capabilities. In such implementations, ordering transmission by node type supersedes ordering based on Node Transmission Priority.

Some exemplary illustrative non-limiting implementations include a Node Cache Priority value for each node. Node Cache Priority is used as a consideration by Node Stores when determining which nodes to retain and which nodes to purge when all other factors are equal. Node Cache Priority is only one factor that is considered when making such decisions.

Additional Exemplary Node Types

Some exemplary illustrative non-limiting implementations include a "Distribution List Node" node type, which contains a list of devices, or a reference to a catalog of devices, and a list of contact methods for each device, or references to one or more catalogs containing contact methods for each device. Contact methods include not only the communication paths that are supported by each device, but any associated address, authorization, authentication, encryption, or other information required to make use of the communication path when contacting that device. Optionally, Distribution List Nodes can contain information about the users of the devices they list (e.g. name, shift, job category, supervisor's name, etc.), and/or about the devices themselves (e.g. device type, location, etc.). Distribution List Nodes are useful for any procedure where a plurality of devices and contact methods must be specified, such as when limiting delegation for a task to a particular set of devices or synchronizing catalogs, especially when this is done using a P2P technology, such as Bluetooth or "ad hoc" Wi-Fi where a server is not available.

Some exemplary non-limiting implementations provide an "A&A" node type useful for implementing the Announcement and Acceptance capability, described below. The A&A node is created by the UI of a server or by use of an Application Programming Interface (API) designed to allow creation of A&A nodes by various software systems other than the UI of the server. An A&A node contains an FDL specification for a task, or a reference to such a specification, a "candidate list" comprising devices that are to be offered the task (in the form of a Distribution List Node), specification of the number of accepting devices required, specification of a procedure to be used to select the required number of devices from among those responding affirmatively, specification of an action to be taken if the number of devices responding affirmatively is less than the number of accepting devices required, and an optional specification of a maximum time to wait for responses. Processing of the A&A node involves sending an announcement message to each device in the "candidate list," waiting, optionally with a timeout if the wait becomes too long, while the devices present their users with the announcement and collect an affirmative or negative response and return this to the server, selection of the required number of affirmatively responding devices and generation of nodes from the FDL and queuing of the resulting data items for each selected device, or implementing the specified action if the number of affirmatively responding devices is smaller than the number required.

Some exemplary illustrative non-limiting implementations include a "Catalog Synchronization Node," which is used to check the contents of a catalog on a first device against the contents of a catalog on a second device and permit the resolution of differences such that both devices have catalogs containing the same data items, with that data items being the most recent available to either device. Some exemplary implementations permit association of a Distribution List Node with a Catalog Synchronization Node to specify a plurality of devices that might have copies of the catalog and require synchronization. Such Distribution List Nodes can permit a first device to synchronize the catalogs of one or more second devices through Peer-To-Peer methods. This is useful in scenarios where the second devices do not have available communication paths to a server.

Exemplary Node Structure

The table below describes the fields making up the structure of a node as defined by one exemplary, non-limiting, implementation. Where the descriptive text of a field is identical to that of U.S. patent application Ser. No. 11/169,149 it has been omitted for clarity. Only additions and extensions to the structure or use described by U.S. patent application Ser. No. 11/169,149 are included in the descriptive text for each field below. All field names and types have been retained for context, however.

| 1 | NodeType | Number(2) | Distribution Node - Specifies communication path information for a list of devices, and optionally associated user and device information. A&A Node - Specifies information required to permit a server to conduct an A&A procedure with one or more devices. Catalog Synchronization Node - Specifies information allowing one catalog to be compared to another catalog, on different devices, such that the two catalogs are made to contain the same data items, with the resulting data items being as current as possible. |
|---|---|---|---|
| 2 | ParentID | Number(4) | |
| 3 | PreviousSibling | Number(4) | |
| 4 | CompletionStatusFlag | Number(1) | |
| 5 | CompletionStatusFlagRule | Number(1) | |
| 6 | SendReportWhenOpened | Number(1) | |
| 7 | SendReportWhenAllComplete | Number(1) | |
| 8 | ListboxSequenceNumbering | Number(1) | |
| 9 | ListboxCheckboxesDisplayed | Number(1) | |
| 10 | CheckboxesSingleChoice | Number(1) | |
| 11 | LeafRadioButtonDefault/ LeafTimeStampNodeAllowOverride/ ListIsReusable | Number(1) | |

-continued

| | | | |
|---|---|---|---|
| 12 | TextEntryNullIsAllowed | Number(1) | |
| 13 | DateOfRecord | Number(10) | |
| 14 | LabelSize | Number(1) | |
| 15 | TextEntrySize | Number(1) | |
| 16 | DefaultTextEntry | Varchar(20) | |
| 17 | ItemTextOnParent | Varchar(25) | |
| 18 | NodeTitle or Title Text | Varchar(75) | |
| 19 | NodeText or Body Text | Varchar or BLOB | |
| 20 | NodeVersion | Number(12) | Version of the node. Used in conjunction with NodeID to determine which node to retain when duplication of nodes must be resolved. Format = YYMMDDhhmmss |
| 21 | NodeID | Number(6) | ID of this node. Used in conjunction with NodeVersion to determine which node to retain when duplication of nodes must be resolved. |
| 22 | TransmitPriority | Number(1) | Priority given to this node, or a minimum priority given to any transmission containing this node, when this node is sent from a first device to a second device. |
| 23 | CachePriority | Number(1) | Priority given to this node when determining which nodes to retain in a node store and which nodes to delete. Higher priority values result in greater tendency to retain nodes when possible. I.e. nodes with lower CachePriority are deleted first, all else being equal. |
| 24 | Protection | Security Template | Specifies permissions required to possess, use, transfer, or alter this node. |
| | End of record delimiter | Char(1) | "*" |

Exemplary Message Extensions

The exemplary illustrative non-limiting implementations may include the message types and formats described in co-pending U.S. patent application Ser. No. 11/169,149 as well as extensions to permit implementation of additional capabilities and features as described below.

Configuration Data

Configuration data representing communication paths and the address, authentication, security specifications, priority, preference, and other data associated with them, as well as other data used to control aspects of communication or other device behavior is sent using an Update Device Setting message (type 3). The Update Device Setting message updates a set of preferences or configuration settings on the device. Each record for this message type comprises the fields as described in U.S. patent application Ser. No. 11/169,149 with the following additional parameters and associated attributes:

Parameter (2-digit number)—the parameter to update.
  06—Communication Path Selection Preferences (specified as a string containing an XML description of the preferences).
  07—Communication Path Characteristics
  08—Dynamic Path Selection
Value (character string)—the new value for the parameter.

The value associated with the "06" parameter comprises a character string containing an XML description of the Communication Path Selection Preferences to be set or changed. For example:

```
<?xml version="1.0" encoding="ISO-8859-1"?>
<CPATHSELPREF>
    <DESIRED>
        <BANDWIDTH NAME="high">+5</BANDWIDTH>
        <BANDWIDTH NAME="medium">+2</BANDWIDTH>
        <BANDWIDTH NAME="low">0</BANDWIDTH>
        <RELIABLE NAME="high">+3</RELIABLE>
        <RELIABLE NAME="low">0</RELIABLE>
    </DESIRED>
    <ADVERSE>
        <COST NAME="high">-10</COST>
        <COST NAME="low">-5</COST>
        <COST NAME="free">0</COST>
    </ADVERSE>
</CPATHSELPREF>
```

The value associated with the "07" parameter comprises a character string containing an XML description of the Communication Path Characteristics to be set or changed. For example:

```
<?xml version="1.0" encoding="ISO-8859-1"?>
<CPATHCHAR>
    <PATHTYPE NAME="GPRS">
        <BANDWIDTH>medium</BANDWIDTH>
        <RELIABLE>high</RELIABLE>
        <COST>low</COST>
        <PUSHMODE>0</PUSHMODE>
    </PATHTYPE>
    <PATHTYPE NAME="Wi-Fi">
        <BANDWIDTH>high</BANDWIDTH>
        <RELIABLE>high</RELIABLE>
        <COST>free</COST>
        <PUSHMODE>0</PUSHMODE>
    </PATHTYPE>
    <PATHTYPE NAME="SMS">
        <BANDWIDTH>low</BANDWIDTH>
        <RELIABLE>low</RELIABLE>
        <COST>high</COST>
        <PUSHMODE>1</PUSHMODE>
    </PATHTYPE>
</CPATHCHAR>
```

The value associated with the "08" parameter comprises a character string containing a "1" if Dynamic Path Selection is to be activated, or a "0" if Dynamic Path Selection is to be deactivated.

For Update Device Setting messages, the Dispatch Module determines the device settings provided and modifies the given settings with the new values.

Communication Request

The Communication Request message (type 9) is sent to request various communication-related actions be undertaken by the receiving device, such as cooperative push, "send back" (ping), "keep connection" (keep-alive), or others. A Communication Request message may include the following fields of information.

- Request Type (2-digit number)—the type of request being made.
- Requesting Device Address (character string)—the address of the requesting device.
- Request ID (12-digit number)—the requestor-relative ID of the request in YYMMDDHHMMSS format.
- Request Priority (3-digit number)—the priority of the request. Equivalent to Node Transmission Priority.
- Associated Data (character string)—data associated with the particular Request Type.

In the exemplary implementation, the Request Type field can contain one of the following values:
- 01—Cooperative Push
- 02—Ping Request
- 03—Ping Response
- 04—KeepAlive For Cooperative Push requests, the Requesting Device Address contains the address of the requesting device on the communication path used to send the request. The Request ID is the time at which the request was sent. The Associated Data string contains a list of addresses for various communication paths that the requestor can be reached using, and, in some exemplary implementations, additional information about each communication path, such as the address of the requestor on that communication path, the protocol to use, etc.

For Ping Requests, the Requesting Device Address is the address of the requesting device on the communication path the request was made using. This is also the address and communication path that are used to send the response message over, if possible. The Request Priority can limit use of some communication paths in some situations, depending on communication path settings and selection preferences. The action requested is that a Ping Response message be sent to the requesting device. The Ping Response message has the same field values as the Ping Request message, with the exception of the Request Type, which is Ping Response ("03") and the Requesting Device Address, which is the address of the responding device.

KeepAlive messages are sent to keep a communication path from closing due to idleness and to notify other devices that the requesting device is still connected. The Requesting Device Address is set as for the other request types, and the other fields are not used. Other than recording the receipt of the message for tracking connectivity, no action is required on the part of the recipient of a KeepAlive request message.

Task Delegation

The Task Delegation (type 10) message body defines a set of materials corresponding to a single task encoded in a device independent manner, where node references have been made relative to the task in such a way that the receiving device can convert node linkages as required to process the nodes while preserving the same arrangement and ordering of the task's nodes as specified in the Task Delegation message.

In some exemplary implementations, the record format for the Task Delegation message is optimized to remove any fields set by the receiving device. In particular, the CompletionStatusFlag should always be 0 (incomplete) and the Response Text should always be empty. In this exemplary illustrative non-limiting implementation, fields such as these are not included in messages sent over the communications network so as to optimize the available space. Instead, such fields are inserted automatically after the device receives the message as part of the processing of the Task Delegation message.

Exemplary Catalog Synchronization

Figure 9:
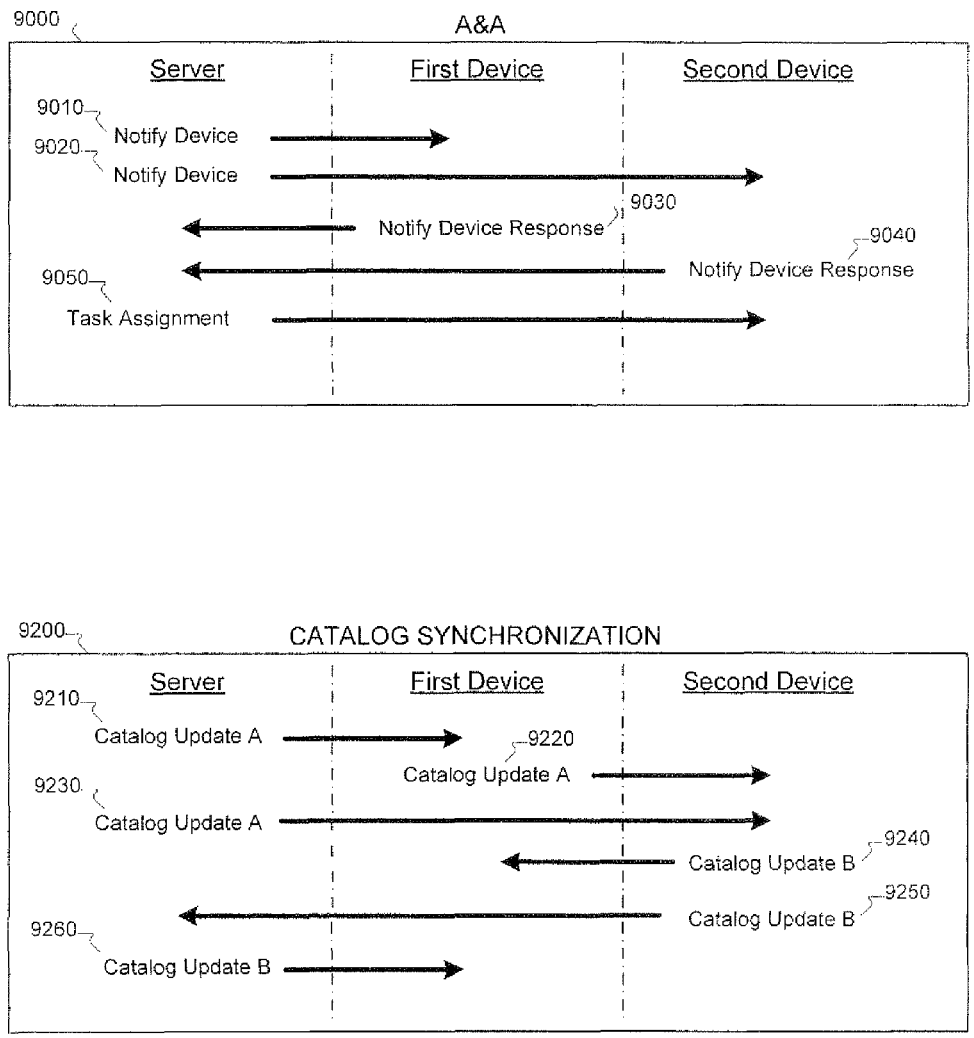
FIG. 9 depicts exemplary illustrative non-limiting message flows for the Announcement and Acceptance (A&A) and Catalog Synchronization processes.

As depicted in FIG. 9, Catalog Synchronization (9200), can involve update messages being sent from servers to a plurality of client devices (9210 & 9230), between a first device and a second device (9220), and from a client device to a server (9240). In the exchange depicted, a server sends catalog update A to a first device (9220) that is in contact with a second device. The server is not aware of this P2P connection. The catalog update A message includes a Distribution Node specifying that the First Device and the Second Device should receive this update. The first device updates its own catalog and sends the catalog update A to the other devices in the Distribution Node list (the second device) to ensure that the devices remain synchronized (9220). The first device does not send the catalog update to the server, as that is where the first device received catalog update A from, and thus is assumed to have it already. In some exemplary implementations the server is not included in the Distribution Node list.

Meanwhile, the server has also sent catalog update A to the second device (9230). The redundancy of updates to the second device is handled as described elsewhere in this document, and is allowed to ensure that at least one copy of the update arrives at the second device, and with a minimum of delay.

When the second device receives catalog update A (9220 or 9230), it finds that the data items contained in the update are out of date, perhaps due to a recent change in the address of the second device, or loss of availability of a communication path to the second device, or for any other reason. The second device creates catalog update B and sends it to the first device (9240) and to the server 9250). The server then sends catalog update B to the first device (9260), according to the Distribution Node included in catalog update B.

Exemplary Announcement and Acceptance

A&A consists of sending a task announcement simultaneously to a plurality of devices associated with users who are candidates for performing the task and collecting responses from them, or, optionally, who respond within a time limit, so as to determine which users are willing and able to accept the announced task. Candidate users are specified by the task creator or an external system, and are identified based on current location, job category, work schedule, current task load, experience level, recent task loading, an explicit listing by the creator of the task, or by any combination of these or other criteria as determined to be proper by those having skill in the art. The selection of candidate users and the determination of which devices are associated with those candidate users ("candidate user's devices"), is performed by automated systems having access to required data sources, such as Node Stores, databases or user interfaces, by the user who creates the task, or a combination of these. An appropriate number (as determined by the task creator) of those responding affirmatively is selected and assigned the task. Push Mode is not required to allow Announcement & Acceptance to be used, but it can enhance the process by reducing the delay required to transmit an announcement to all candidates.

Figure 10:
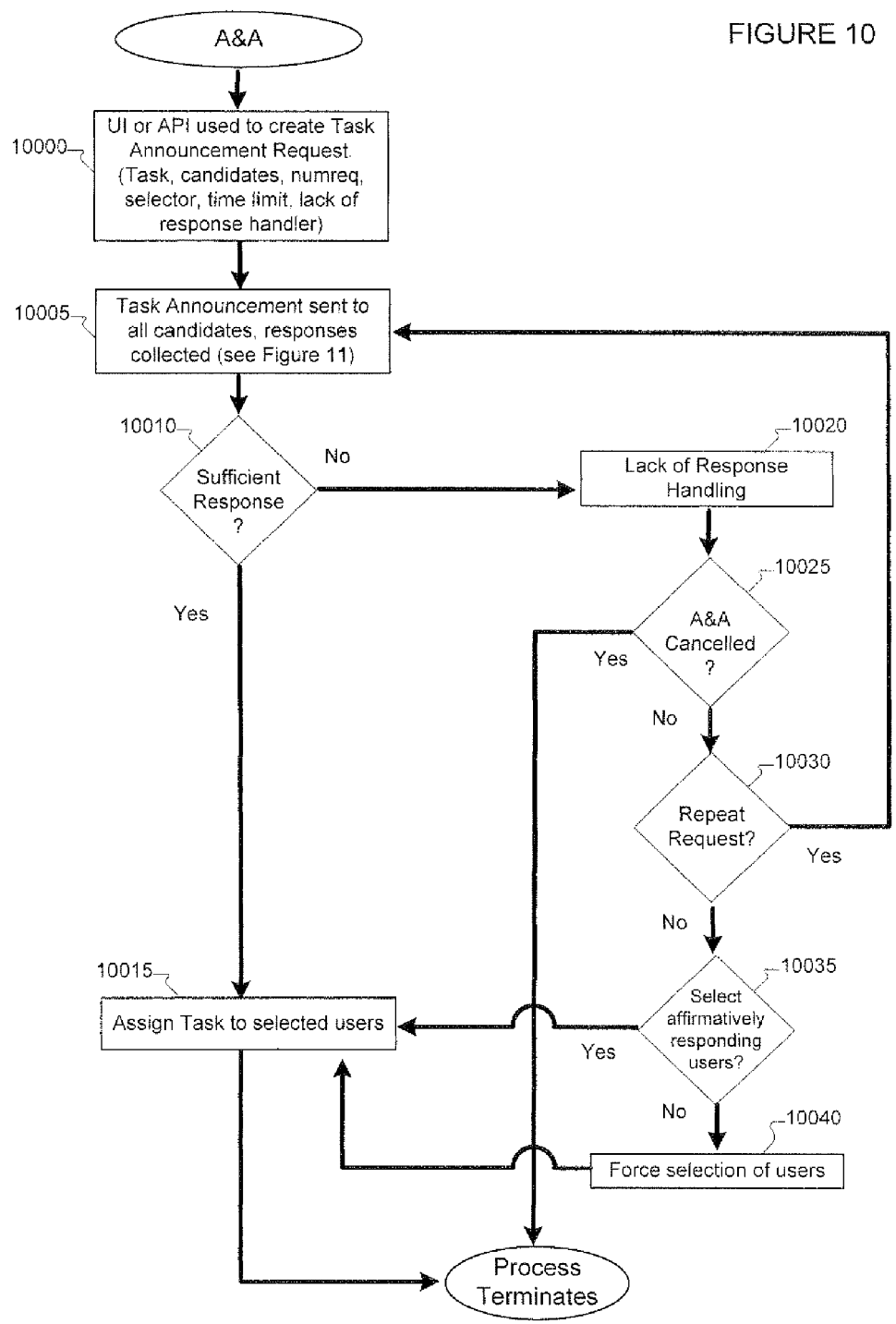
FIG. 10 comprises a flowchart depicting an exemplary illustrative non-limiting implementation of a method for performing an A&A procedure and dealing with a lack of sufficient affirmative responses.

As depicted in FIG. 10, the A&A process is initiated, in some exemplary implementations, by interaction with the User Interface (UI) of the server or by external program interaction through a defined Application Program Interface (API). Whether the interaction is by way of the UI or an API, the required information is provided (10000), comprising the task to be assigned (e.g. provided as an FDL specification, a reference to such a specification), or a reference to a task hard-coded into the system), a description of the users who are candidates to perform the task that permits identification of the devices to deliver the task announcement to so that a Distribution List Node can be created to refer to them, the number of users required for the task, the method to be used to select the required number of users from among those responding affirmatively, an optional maximum time to wait for responses to be returned, or a time at which to stop waiting, and an action to take if the number of affirmatively responding users is smaller than the required number of users.

The method used to specify users who are candidates for performing the task can consist of a list of employees with check-boxes for selection, a pull-down menu of job categories, a form to be filled out with various fields specifying detailed requirements such as location, job skills, work shift, experience level, or others, or any combination of these or other methods well known to those skilled in the art. Alternatively, an external system, comprising various data bases, software systems and user interactions, is used to create a list of users and associated data which is provided through the API for use in the A&A procedure. In some exemplary implementations the external system can provide all of the inputs required to initiate and complete the A&A process automatically as part of a complete business method, such as a "purchase order—work order—accounts receivable" system.

The method used to select the required number of users from among those responding affirmatively is specified as one of several automatic methods, such as "first to respond," "least number of tasks already assigned," "most experienced," "closest," "least recently tasked," etc., or a manual method involving display of the list of affirmative responders to the task creator, and input of the users to select made by that person. If the number of affirmative responses is equal to the required number of users specified when the A&A process was initiated, no selection is required and the responding users are automatically selected. In some exemplary implementations, confirmation of the selection of these users is required using a manual method as described previously.

Action to be taken if the number of affirmatively responding users is smaller than the required number of users is specified as cancellation of the A&A request, assignment of the task to the user(s) who responded affirmatively, assignment of the users who responded affirmatively as well as additional users selected using an appropriate selection method (such as any of those used to select candidate users), repetition of the request, or any other appropriate action.

Figure 11:
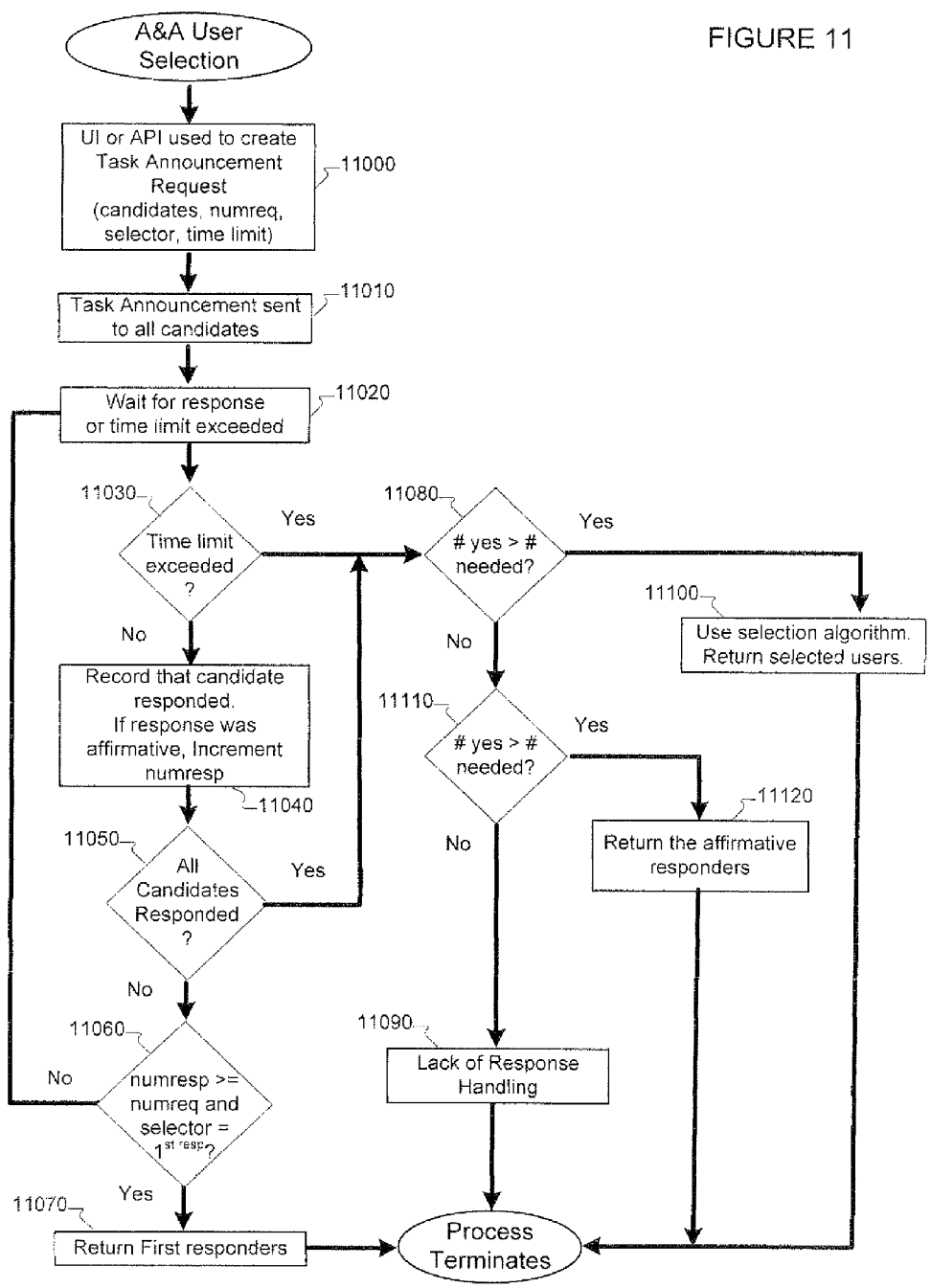
FIG. 11 comprises a flowchart depicting an exemplary illustrative non-limiting implementation of a method for collecting and processing responses to an A&A message.

As depicted in the diagram in FIG. 11, once the required information has been supplied to the server (11000), a Notify Device (type 2) message is sent to all selected candidate user devices (11010), using communication paths appropriate to the priority of the message. In preferred exemplary implementations, this message has a high priority and is sent as soon as possible by one or more available communication paths. Push mode is preferred for this; however, cooperative push mode or even pull mode are used alternatively where push mode is unavailable. The server waits for responses from the notified devices, or for the specified time limit to elapse (11020).

The Display Manager of each receiving device responds to a Notify Device command by causing a message to appear on the device's user interface requesting input from the user as to whether or not the advertised task is accepted. The Display Manager collects the user's response, and sends it back to the server using a communication path consistent with the priority of the data item being returned and the available communication paths.

When all notified devices have responded (11050), or if the specified time limit elapses prior to all the notified devices responding (11030), a check is made to see if the number of affirmative responses received is greater than the number of users required (11080). If the number of affirmative responses exceeds the number of users required, the specified selection algorithm is used to select the required number of users from among those responding affirmatively (11100). If the number of users responding affirmatively (11080) is equal to the number of users required (11110), the users responding affirmatively are selected (11120). If the number of users responding affirmatively is less than the number of users required, the specified action is performed (11090). As depicted in FIG. 10, this can comprise cancellation of the A&A procedure (10025), repetition of the request process in hopes that more users respond affirmatively when asked again (10030), selection of those users who responded affirmatively despite their number being lower than requested (10035), notification of third parties (managers or supervisors), or forcing selection of additional users by some appropriate means (10040). Other exemplary implementations can provide additional or different actions, as will be obvious to those skilled in the art. If the A&A procedure was not cancelled or repeated, the selected users are assigned the specified task (10015), and the procedure is complete.

Referring once again to FIG. 11, if the selection method specified is "first responders," or another method that relies only on the required number of users being available (11060), the server waits only until the required number of users have responded affirmatively and select them (11070). Otherwise, the server waits until all candidate users have responded (11050), until the optional maximum wait time has elapsed, or until the time to wait for has arrived (11030), and select from those that responded affirmatively (11100), if their numbers are greater than the required number of users (11080), return the users that responded affirmatively (11120) if their number is equal to the required number of users (11110), or take the specified action if an insufficient number of users responded affirmatively (11090) as above.

Once the user(s) have been selected, the task is assigned to them. This can involve using the specified FDL to create appropriate data items for each user, and queuing these data items for transmission to the users' devices if they are not pre-cached on the users' devices already. Alternatively, a message is sent that causes the users' devices to request the materials comprising the task.

Returning to FIG. 9, A&A message exchange (9000) comprises a Notify Device message from a server to a first device (9010) and from a server to a second device (9020). It will be apparent to anyone skilled in the art, that Notify Device messages can be sent to any number of devices, and that the simplest case, involving a server, a first device and a second device, is representative of all aspects involved with a larger plurality of devices. The first device and the second device send responses representing the respective device users' input to the Notify Device message to the server (9030 and 9040). In the exchange depicted, the second device responds affirmatively. In some scenarios, the first device responds negatively, or does not respond to the Notify Device message, or does not respond within the allowed time period, or responds affirmatively, but is not selected by the selection method of the server. A task assignment message, such as a Node Update command, is sent from the server to the second device (9050) and the A&A exchange is complete.

The A&A capability is used to request specific service actions ("change filters on pump #12," "cleanup on aisle six," "respond to an alarm with machine #34"), volunteers for some duty ("need someone to work overtime tonight," "Can anyone work on Saturday?"), information ("Who knows where the MIG welder is?" "Testing—Can anyone see this message?"), or any other appropriate purpose.

Exemplary Task Delegation

In some scenarios, it is advantageous to permit transfer of an assigned task to another device, with or without the intervention of a server. For example, in some exemplary implementations, a supervisor may be assigned all tasks for his group, and delegate them to subordinates as those subordinates become available, or a device with a reliable communication path to a server, such as wired Ethernet, can act as a local repository of tasks for transfer to mobile devices using a P2P communication path, or a worker who cannot complete a task for any reason can transfer the task to a co-worker who can complete it.

In some exemplary embodiments a task can require sequential assignment to a plurality of users or devices. For example, a time tracking task, such as filling out a timecard, can be assigned to a worker. Once the worker has completed the worker's portion of the task by filling in hours worked, the task is re-assigned to the worker's supervisor for verification and approval. If there is a problem, the task can be re-assigned back to the worker for correction. This pattern can be repeated a plurality of times until the supervisor approves the timecard and it is sent back to the server to complete the task. By using task delegation of the timecard task, rather than treating the process as a set of different tasks (i.e. a "worker fill out timecard" task, a "supervisor approval" task, an optional "worker correction of timecard" task, etc.) mediated by the server, the process of getting approved timecard data to the server can be done largely independent of contact with the server. When work teams spend time in areas without adequate server communication capabilities, such as those who work at remote field sites, in mines, or in secure data facilities, this capability for device-to-device task delegation can improve efficiency and reduce costs. For example, by assigning the timecard tasks for a work crew to the supervisor, who interacts with the workers until the completed tasks are ready to be sent back to the server, only the supervisor needs communication with the server. Whether establishing communication with a server requires access to special communication hardware, such as a satellite phone or hardwired Ethernet connection, or travel to a location where facilities exist, not requiring each worker to establish such a connection individually reduces time required to complete the tasks, and may avoid the need for additional communication hardware.

Tasks eligible for delegation include a "Distribution List Node," which contains information required to connect with devices to which the task can be transferred, and optionally about the users of those devices, as described above.

In some exemplary implementations, nodes that make up a task link to each other using references or node IDs that are unique to a first device. To transfer such nodes to a second device, the node references must be made relative to the task itself, rather than to the nodes existing in the first device. This is referred to as "Node Tree Packing." After the transfer, the transferred node(s) must have their node references adjusted to the unique addressing or node IDs on the second device. This is referred to as "Node Tree Unpacking." To indicate that such node tree packing has been performed on a Task's nodes, so that the receiving device can perform appropriate node tree unpacking, tasks being delegated are transferred by Task Delegation messages.

Figure 12:
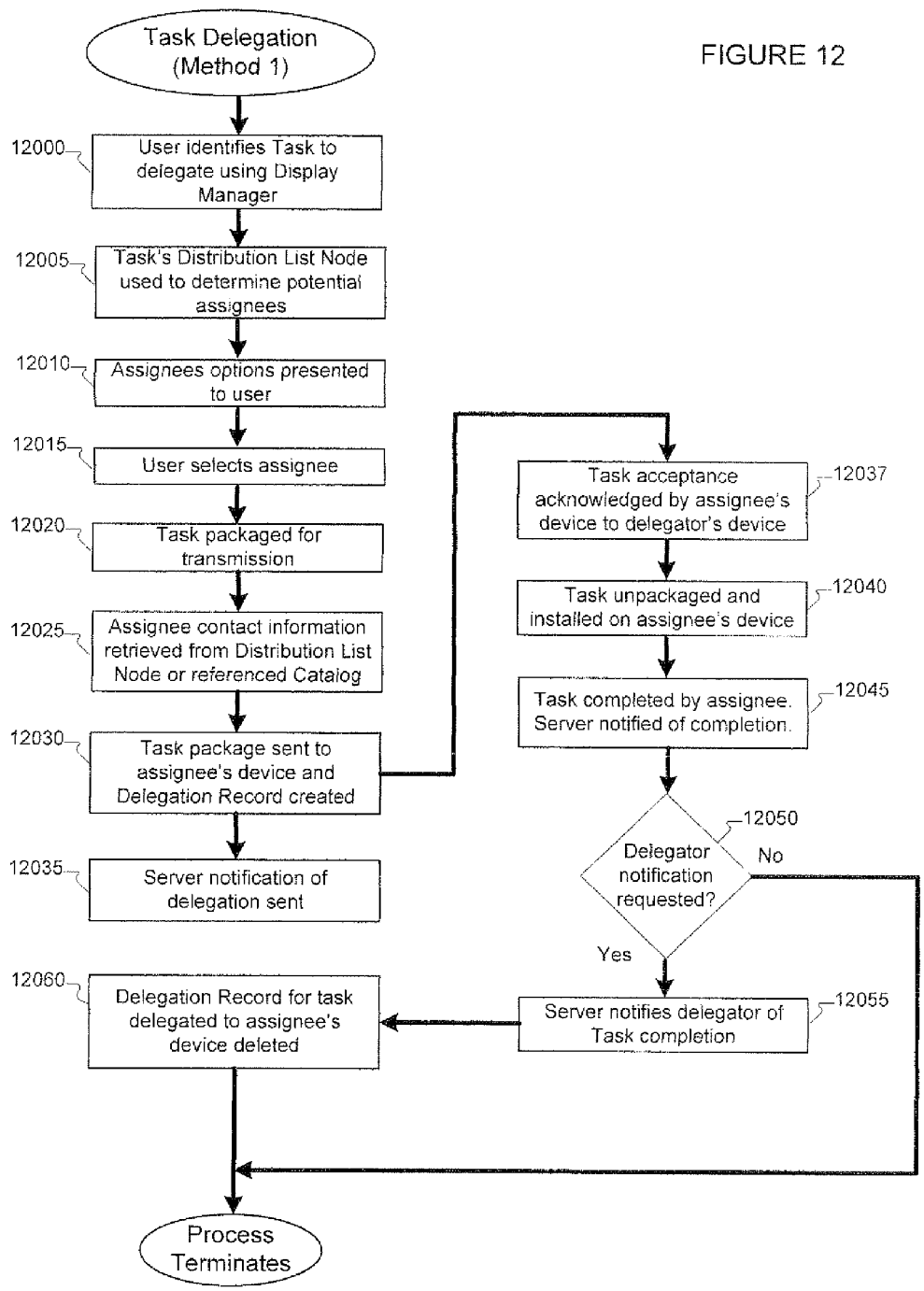
FIG. 12 comprises a flowchart depicting an exemplary illustrative non-limiting implementation of a method for delegating an assigned task from a first device to a second device (Method 1).

A first exemplary procedure for delegating a task from a first device to a second device (Method 1) is depicted in FIG. 12. The user of the first device interacts with the Display Manager of the first device to select an assigned task to delegate (12000). The method of selection in some exemplary implementations is a menu of assigned tasks to select from. In other exemplary implementations, the task is selected by presenting tasks one at a time until the desired task is located, or tasks may have to be dealt with in a specified order, or by some other means.

Once a task has been specified, the task's Distribution List Node is referenced to determine which other devices the task can be delegated to (12005). Distribution List Nodes contain data, and/or references to Catalogs containing data, that specify device and communication path information for each device that a task can be delegated to. The data is unique to a specific task, or it can be shared between a plurality of tasks; for example, when the set of devices comprises those used by a supervisor's subordinates and the supervisor routinely delegates tasks to those subordinates. The devices to which the task can be delegated are provided to the user of the first device in an appropriate manner (12010). In some exemplary implementations, the display can consist of communication path descriptions and device addresses. In other exemplary implementations, the display can consist of the user name associated with the device. In other exemplary implementations, additional data about the user is displayed, such as work shift, experience level, last known location, communication paths supported, or other information. In some exemplary implementations such other information can comprise limitations on the use of distribution information, such as specification of specific devices or sets of devices that can make use of particular task distribution information contained in the Distribution List Nodes. For example, when a task with Distribution List Nodes specifying a plurality of potential devices to assign the task to is delegated by a first device to a second device, the first device can alter the Distribution List Node content such that the only available distribution information usable by the second device specifies the first device. This restricts re-delegation of the task by the second device such that it can only re-delegate the task back to the first device, without restricting re-delegation by the first device. By disabling use by the second device of any remaining distribution information, while not removing such remaining distribution information from the Distribution List Nodes, the first device ensures that the task will be re-delegated to the first device, possibly after partial completion of the task by the second device, and that when the task is re-delegated, the Distribution List Node information will still be associated with the task for use by the first device, which is not restricted by the limitations that specify the second device.

The user of the first device selects a recipient to delegate the task to (12015), and the task is packaged for transmission (12020). Packaging a task for transmission can comprise node tree packing in some exemplary implementations. In some exemplary implementations, a Distribution List Node is added to the task package, which is different from the Distribution List Node used in the current delegation procedure (e.g. a supervisor may wish to limit or prohibit re-delegation of the task). The task package is encoded, compressed, encrypted, or has other processing performed on it in various exemplary implementations.

Using the communication path information in the Distribution List Node (12025) the task is transmitted to the second device (12030), which acknowledges acceptance of the task (12037), and the server is sent a notification of the delegation (12035). The notification sent to the server can optionally request notification to the first device by the server when the task has been completed and the server notified of the completion. In some exemplary implementations, when a task is delegated from a first device to a second device, the first device creates a persistent record, such as by use of a BLOB node, that records information sufficient to identify the task and the second device. This record is referred to herein as a "delegation record." Delegation records are useful in propagating task cancellation information to each device that has been assigned the task, whether by a server or by delegation from another device.

When the task is received by the second device, it is unpackaged and installed on the second device (12040). This can, in some exemplary implementations, comprise reversal of any compression, encryption or other operations performed on the task by the first device, converting node references from the task-relative form to a form required for processing of the task (node tree unpacking), as well as linking the task to the task list, task manager, or other such structures, systems, or procedures used by the second device for managing tasks.

When the task is completed by the user of the second device (12045), and the server is notified of the task completion, the server notifies the first device of the task's completion (12055) if such notification was requested (12050). The first device deletes the delegation record created at the time the task was delegated (12060) and the process is complete.

Figure 13:
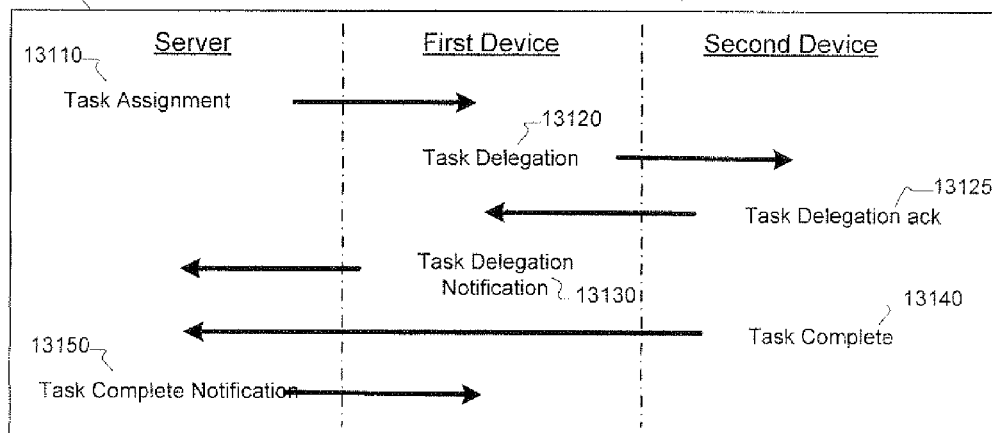
FIG. 13 depicts exemplary illustrative non-limiting message flows for Task Delegation using either Method 1 or Method 2.
Figure 13:
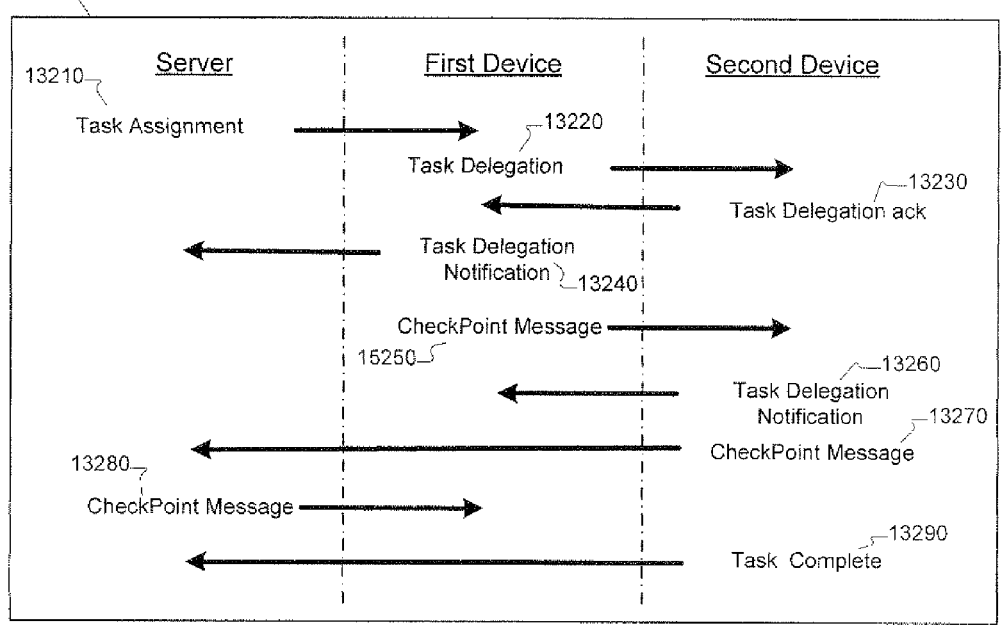

As depicted in FIG. 13, Task Delegation by the first method (13100) message exchange consists of the initial assignment of a task from a server to a first device 13110). The first device then delegates the task to a second device (13120), which acknowledges the delegation (13125), and the first device notifies the server of the task delegation (13130). When the task is complete, the second device notifies the server (13140), and the server notifies (if notification was requested) the first device (13150).

Figure 14:
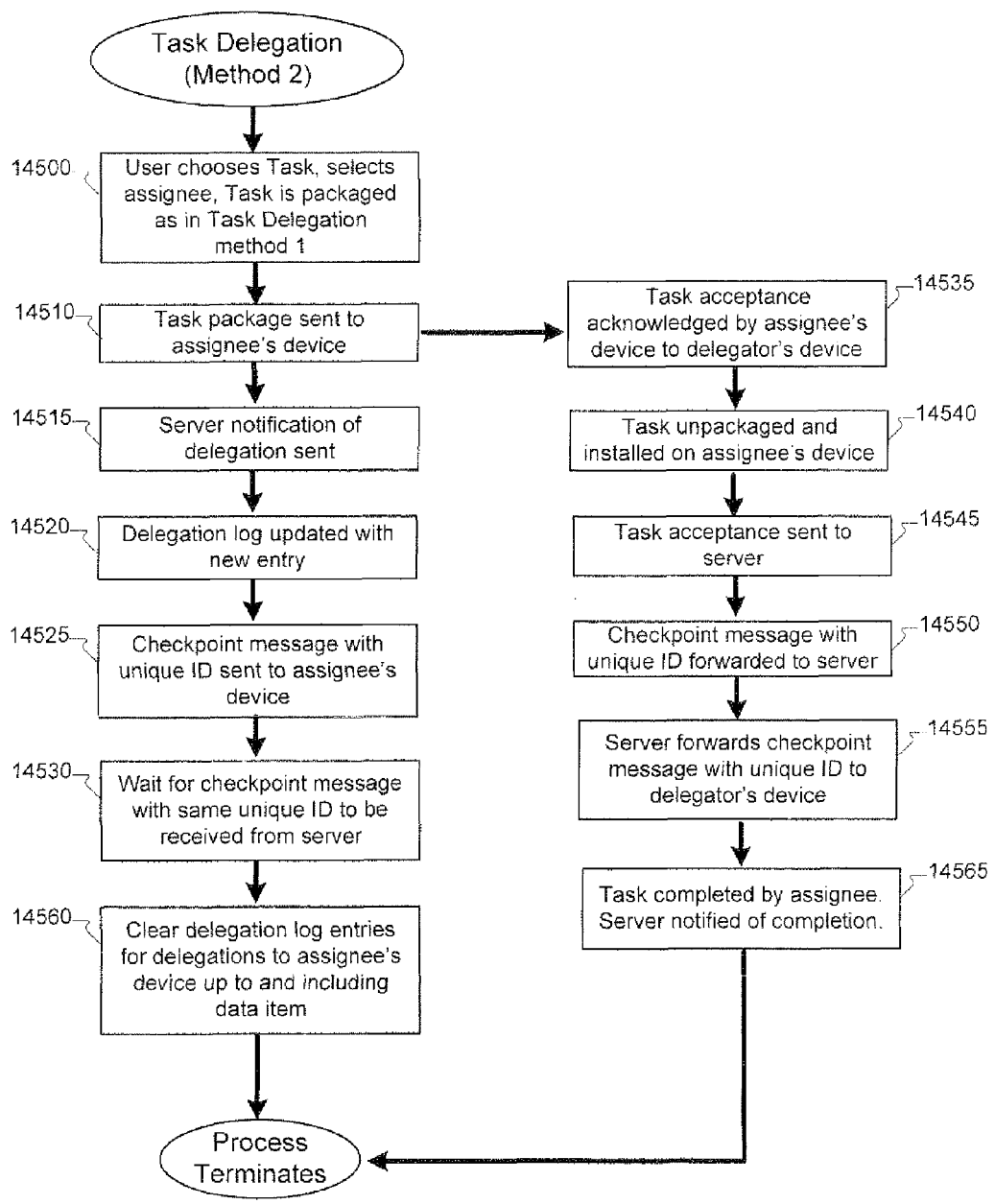
FIG. 14 comprises a flowchart depicting a exemplary illustrative non-limiting implementation of a method for delegating an assigned task from a first device to a second device (Method 2).

A second exemplary procedure for delegating a task from a first device to a second device (Method 2) is depicted in the diagram in FIG. 14. The initial steps of the user of the first device interacting with the Display Manager of the first device to select an assigned task to delegate, the task's Distribution List Node being referenced to determine devices the task can be delegated to, the user selecting a device to delegate to, and the task being packaged for transmission, of the second exemplary procedure are identical to the first exemplary procedure (14500). The task package is transmitted in the same manner as in Method 1 (14510) as well, and the assignee's device acknowledges acceptance of the task (14535), and the server is sent a notification of the delegation by the delegator's device (14515) as in Method 1. In Method 2, however, the delegator's device is not sent any notification of the assignee's completion of the assigned task as in Method 1. Instead, the delegator's device logs the assigned task as pending (14520), and sends a checkpoint message containing a unique ID to the assignee's device (14525), after which the procedure pauses until the checkpoint message with the unique ID is received from the server (14530). This pause is a conceptual pause in the illustrated steps, not a literal pause in processing on the delegator's device, which continues to process other work normally. A pending task log is maintained for each device that tasks are delegated to. These logs are logically distinct, but are implemented in any way that is determined to be appropriate by those having skill in the art, such as each log in a separate sequential or indexed file, all logs in a single sequential or indexed file, each log in a separate table in a relational database system, all logs in a single table in a relational database, logs kept in a single catalog, or a plurality of catalogs, logs kept in a BLOB node, etc.

When the task is received by the second device, it is acknowledged to the delegator's device (14535), unpackaged and installed on the second device (14540). A task acceptance message also is sent to the server (14545) along with the checkpoint message with the unique ID (14550). When the server receives the checkpoint message, it forwards it to the delegator's device (14555), which informs the delegator's device that the assignee's device has been in contact with the server, and so the server has been informed of the task delegation and the delegation log for the assignee's device is cleared up to and including the delegated task (14560). When the task is completed, the assignee's device contacts the server to report task completion (14565), as in Method 1, and the process is complete.

As depicted in FIG. 13, message exchange in Task Delegation by the second method (13200) consists of the initial assignment of a task from a server to a first device (13210). The first device then delegates the task to a second device (13220), receives the second device's acknowledgment of acceptance of the delegation (13230), and notifies the server of the task delegation (13240). The first device then sends a checkpoint message (13250) to the second device. The second device sends a task delegation notification to the first device (13260) and forwards the checkpoint message to the server (13270). When the server receives the checkpoint message, it forwards it to the first device (13280). When the task is complete, the second device notifies the server (13290), and the process is complete.

Method 1 for Task Delegation is useful when at least the first device is in communication with the server, so that it is sure that the server is notified of the task delegation to the second device. In scenarios where this is not true, Method 1 still can be used, provided that the server is willing to accept a task completion from the second device for a task assigned to the first device. This addresses situations where the second device completes the task and sends the task completion to the server prior to the first device notifying the server of the delegation of the task to the second device. In an alternate exemplary implementation, the second device sends the task completion to the first device, which then sends the task completion to the server. Such relaying of task completions back through the chain of second devices to first devices can be done for any number of devices in a task delegation chain, as will be obvious to those with skill in the art. Each first device creates a delegation record as the task is delegated to a second device, and deletes the delegation record when the task completion is returned and relayed up the chain and processing for the task is completed. The delegation record enables each first device to validate that the task completion is being sent from a second device.

If a task is canceled at a server, the cancellation is sent to the first device, or devices, that the task has been assigned to. If a first device has delegated the task to a second device, the first device, upon receiving the task cancellation, uses the delegation record created at the time the task was delegated to forward the cancellation to the second device. If a second device has delegated the task to a third device, the second device, upon receiving the task cancellation from the first device, uses its own delegation record to forward the task cancellation to the third device. As will be apparent to those of ordinary skill in the art, this process can continue for any number of delegations to a fourth, fifth, etc. device. As each delegating device completes forwarding the task cancellation, it deletes the delegation record for the task.

If a task is canceled at the device the task is assigned to, the cancellation is sent to the server, which forwards the cancellation to the first device that the task was assigned to. The first device forwards the cancellation to the second device and deletes its delegation record for the task. The forwarding process can be repeated for a third device, a fourth device, etc. if the task was re-delegated a plurality of times. In an alternate implementation, the canceling device sends the cancellation to the device that assigned the task to it . . . i.e. a second device sends the cancellation to the first device, which deletes its delegation record and forwards the cancellation to the server. This cancellation process also can be implemented for any number of delegations (e.g. from a fourth device to a third device, and then to a second device, followed by forwarding to a first device, which forwards the cancellation to the server).

Task cancellation can be required for many reasons, such as the task being a duplicate of another task (as can happen when automated equipment generates repair tasks due to faults being detected, and the same malfunction causes a plurality of fault events), a task being generated in error (e.g. when an assembly line is started, the specific sequence of machine starts can appear to indicate device failures, when in fact nothing is wrong and all will stabilize once all machines are running), or when one task is subsumed by another (e.g. a task is generated to perform maintenance on a machine, but a subsequent failure of that machine results in another task to replace it, making the maintenance task unnecessary).

Method 2 for Task Delegation is useful when at least the first device is not in communication with the server at the time of the delegation, such as can happen when the delegation is done using a P2P link between the devices while both are isolated from GPRS, Wi-Fi and other methods of communicating with the server. When the checkpoint message sent to the second device by the first device is sent to the first device from the server, it is clear that the second device has been in contact with the server, and so the server has been notified of the task delegation, even if the first device has not had an opportunity to send such notification, and that the first device no longer needs to keep track of the delegated task and can clear log entries up to and including that of the task associated with the checkpoint message received.

Thus, it will be understood from the foregoing that the exemplary illustrative non-limiting implementations provide systems, apparatuses, and software for enabling the exchange of "nodes," commands, and other data items between devices so as to provide reliable methods of interaction between a user of a first device and a user of a second device that can establish a local wireless connection even when communications between the wireless network and other more robust network devices are unreliable, intermittent, have limited bandwidth, or when one or more of the devices have limited resources. Using the methods, systems, and apparatuses described herein, more efficient communications, assignment of resources, and delegation of tasks can be accomplished.

While the technology herein has been described in connection with exemplary illustrative non-limiting embodiments, the invention is not to be limited by the disclosure. The invention is intended to be defined by the claims and to cover all corresponding and equivalent arrangements whether or not specifically disclosed herein.

We claim:

1. A method for communicating with mobile or portable devices while increasing the likelihood of successfully communicating when communication path availability lacks continuity, varies from location to location, and/or is made available using different means at different times or places, the method comprising:
    enabling communication with a mobile or portable device over a first communication path;
    enabling communication with the mobile or portable device over a second communication path that is at least in part not co-extensive with said first communication path;
    communicating signals representing at least a first portion of a node structure over said first communication path;
    communicating signals representing at least a second portion of said node structure over said second communication path; and
    using said signals sent over said first path and said signals sent over said second path to reconcile redundant information conveyed over said first and second communication paths.

2. The method of claim 1 further including selecting between said first and second paths to provide contextual use of preferred communication paths over less preferred communication paths for different parts of the same node structure.

3. The method of claim 1 further including dynamically switching between said first and second communication paths.

4. The method of claim 1 further comprising using said first and second communications paths one at a time.

5. The method of claim 1 further comprising using both said first and second communications paths at the same time to said the same or different parts of the node structure.

6. The method of claim 1 wherein said first and second communications paths have differing characteristics.

7. The method of claim 6 wherein said first and second communications paths have different speed/bandwidth characteristics.

8. The method of claim 6 wherein said first and second communications paths have different reliability.

9. The method of claim 6 wherein said first and second communications paths have different usage cost.

10. The method of claim 6 wherein said first and second communications paths use different communications protocols.

11. The method of claim 6 wherein said first and second communications protocols use different transmission media.

12. The method of claim 1 further including using out of band transmission to send data items at times, in orders, and/or by means other than a preferred communication path.

13. The method of claim 1 further including providing priority messaging, where transmission methods are determined in part by characteristics of the data items to be sent.

14. The method of claim 1 further including detecting and eliminating duplicate node structures and data items, whether duplicates occur accidentally or intentionally.

15. The method of claim 1 further including using a push mode transmission model wherein a sender contacts a receiver and initiates transfer of node structures.

16. The method of claim 1 further including using a cooperative push mode transmission model wherein a sender contacts a receiver and sends a node structure containing a command that requests that the receiver initiate a pull mode session.

17. The method of claim 16 wherein the sender's request and the receiver's pull mode session occur over different communication paths.

18. The method of claim 1 further including using a Peer-to-Peer (P2P) node structure transmission model for sending node structures between said device and another device wherein said devices where either can initiate communication, and either or both can transmit node structures to the other.

19. The method of claim 1 further including using an Announcement and Acceptance (A&A) mechanism for identifying one or more users willing to accept assignment of one or more identified tasks, and then providing the tasks to them.

20. The method of claim 1 further including using task delegation for transferring a task from a first device to a second device, with or without the assistance of a server.

21. The method of claim 1 further including using a flexible security model that permits limitation of access to, use or modification of a data item, a set of data items, a device or server.

22. The method of claim 1 further including identifying and resolving differences between catalogs of a first device and catalogs of a second device.

23. A mobile or portable device that includes an arrangement which increases the likelihood of successfully communicating when communication path availability lacks continuity, varies from location to location, and/or is made available using different means at different times or places, the device comprising:
   a first communications interface that enables communication over a first communication path;
   a second communications interface that enables communication over a second communication path that is at least in part not co-extensive with said first communication path;
   a communications controller that communicates signals representing at least a first portion of a node structure over said first communication path and communicates signals representing at least a second portion of said node structure over said second communication path; and
   a processor that uses said signals sent over said first path and said signals sent over said second path to reconcile redundant information conveyed over said first and second communication paths.

24. The device of claim 23 further including means for selecting between said first and second paths to provide contextual use of preferred communication paths over less preferred communication paths for different parts of the same node structure.

25. The device of claim 23 further including a switch that is configured to dynamically switch between said first and second communication paths.

26. The device of claim 23 wherein said first and second communications interfaces are configured to use said first and second communications paths one at a time.

27. The device of claim 23 wherein said first and second communications interfaces are configured to use both said first and second communications paths at the same time to said the same or different parts of the node structure.

28. The device of claim 23 wherein said first and second communications paths have differing characteristics.

29. The device of claim 28 wherein said first and second communications paths have different speed/bandwidth characteristics.

30. The device of claim 28 wherein said first and second communications paths have different reliability.

31. The device of claim 28 wherein said first and second communications paths have different usage cost.

32. The device of claim 28 wherein said first and second communications paths use different communications protocols.

33. The device of claim 28 wherein said first and second communications protocols use different transmission media.

34. The device of claim 23 wherein said first and second communications interfaces are configured to use out of band transmission to send data items at times, in orders, and/or by means other than a preferred communication path.

35. The device of claim 23 further including a node structure prioritizer that provides priority messaging by determining transmission techniques in part by characteristics of data items to be sent.

36. The device of claim 23 wherein said processor detects and eliminates duplicate node structures and data items, whether duplicates occur accidentally or intentionally.

37. The device of claim 23 wherein said communications controller uses a push mode transmission model wherein a sender contacts a receiver and initiates transfer of node structures.

38. The device of claim 23 wherein said communications controller uses a cooperative push mode transmission model wherein a sender contacts a receiver and sends a node structure containing a command that requests that the receiver initiate a pull mode session.

39. The device of claim 38 wherein the sender's request and the receiver's pull mode session occur over different communication paths.

40. The device of claim 23 wherein said communications controller uses a Peer-to-Peer (P2P) node structure transmission model for sending node structures between said device and another device wherein any of said devices can initiate communication, and any can transmit node structures to the other.

41. The device of claim 23 further including an Announcement and Acceptance (A&A) mechanism for identifying one or more users willing to accept assignment of one or more identified tasks, and then providing the tasks to them.

42. The device of claim 23 further including a task delegator that transfers a task from a first device to a second device, with or without the assistance of a server.

43. The device of claim 23 further including a flexible security arrangement that permits limitation of access to, use or modification of a data item, a set of data items, a device or server.

44. The device of claim 23 further including a cataloger that identifies and resolves differences between catalogs of a first device and catalogs of a second device.

45. A handheld portable messaging/tasking device comprising:
   a handheld housing; a display disposed on said housing; a processor disposed in said housing and coupled to said display;
   a wireless communications arrangement disposed within said housing and coupled to said processor, said wireless communications arrangement including a first wireless communications interface for communicating over a first wireless pathway using a first wireless protocol, and
   a second wireless communications interface for communicating over a second wireless pathway using a second wireless protocol different from said first wireless protocol; and
   a node processor that communicates messaging associated with synchronizing nodes via said wireless communications arrangement, said node processor causing said wireless communications arrangement to communicate, over said first communications path, node information that is redundant to information communicated over said second communications path to thereby increase the likelihood of successful synchronized node communication, and causes said display to display tasking or messaging information at least in part that is responsive to said synchronized nodes.

46. The device of claim 45 wherein said node processor reconciles redundant information conveyed over said first and second communication paths.

47. The device of claim 45 wherein said first protocol comprises cellular and said second protocol comprises Bluetooth.

48. The device of claim 45 wherein said first protocol comprises 802.11 and said second protocol comprises Bluetooth.

* * * * *